(12) United States Patent
Hirsch

(10) Patent No.: US 7,882,037 B2
(45) Date of Patent: Feb. 1, 2011

(54) OPEN, NEUTRAL ELECTRONIC DISTRIBUTION SYSTEM FOR DIGITAL CONTENT PROVIDING DISTRIBUTION CHANNEL SUPPORT TO PUBLISHERS AND RETAILERS AND ABSTRACT FULFILLMENT FOR PUBLISHERS

(75) Inventor: Karl Hirsch, Sammamish, WA (US)

(73) Assignee: Arvato Digital Services Canada, Inc., Kitchener, Ontario (CA)

( * ) Notice: Subject to any disclaimer, the term of this patent is extended or adjusted under 35 U.S.C. 154(b) by 356 days.

(21) Appl. No.: 11/976,432

(22) Filed: Oct. 24, 2007

(65) Prior Publication Data

US 2008/0162307 A1 Jul. 3, 2008

Related U.S. Application Data

(60) Provisional application No. 60/853,766, filed on Oct. 24, 2006.

(51) Int. Cl.
*G06Q 20/00* (2006.01)

(52) U.S. Cl. .............................. 705/67; 705/26; 705/51; 705/54; 705/57; 380/4; 380/5; 380/281; 380/284; 709/219

(58) Field of Classification Search ............. 705/51–67, 705/26; 380/4, 5, 281, 284; 709/219
See application file for complete search history.

(56) References Cited

U.S. PATENT DOCUMENTS

| | | | |
|---|---|---|---|
| 5,539,735 A * | 7/1996 | Moskowitz ................. | 370/420 |
| 5,883,954 A | 3/1999 | Ronning | |
| 5,883,955 A | 3/1999 | Ronning | |
| 5,887,060 A | 3/1999 | Ronning | |
| 5,903,647 A | 5/1999 | Ronning | |
| 5,907,617 A | 5/1999 | Ronning | |
| 6,418,421 B1 * | 7/2002 | Hurtado et al. ............... | 705/54 |
| 7,047,411 B1 | 5/2006 | DeMello et al. | |
| 7,051,004 B2 | 5/2006 | Nuttall et al. | |
| 7,117,167 B2 * | 10/2006 | Seal et al. ..................... | 705/26 |
| 7,124,302 B2 | 10/2006 | Ginter et al. | |
| 7,133,845 B1 | 11/2006 | Ginter et al. | |
| 7,133,846 B1 | 11/2006 | Ginter et al. | |
| 7,149,722 B1 | 12/2006 | Abburi | |
| 7,165,174 B1 | 1/2007 | Ginter et al. | |
| 7,209,892 B1 | 4/2007 | Galuten et al. | |
| 7,373,317 B1 * | 5/2008 | Kopelman et al. ............ | 705/27 |
| 2007/0038931 A1 * | 2/2007 | Allaire et al. ............... | 715/526 |
| 2007/0233580 A1 | 10/2007 | Pike et al. | |
| 2008/0109363 A1 * | 5/2008 | Fassett ........................ | 705/52 |
| 2008/0250120 A1 * | 10/2008 | Mick et al. ................... | 709/219 |
| 2008/0319953 A1 * | 12/2008 | DeShan et al. ................ | 707/3 |

* cited by examiner

*Primary Examiner*—Pierre Eddy Elisca
*Assistant Examiner*—Shahid Kamal
(74) *Attorney, Agent, or Firm*—Roylance, Abrams, Berdo & Goodman, LLP

(57) ABSTRACT

An online service and system are provided through which digital content publishers can package, protect, market and sell their content through on-line retailers, and through which on-line retailers can both build a unique inventory of digital content with all associated marketing metadata to sell through their on-line stores and seamlessly integrate the digital content into their on-line shopping cart. The system provides publishers with abstract fulfillment such that they only.

14 Claims, 66 Drawing Sheets

MAP

TO FIG. 12B

FROM FIG. 12A

- 07.05.2007
  Protexis to Participate in 17th Annual Software Industry Conference

- 05.30.2007
  Protexis to Participate in Internet Retailer 2007 Conference & Exhibition Enroll your p...
reach millions of online consumers at high profile retail sites.

Getting Started

Step 1: Enroll your Product in RED
RED enrollment is quick and easy. Watch a demo to learn more. Or just click on Product Management to get started. More>

Step 2: Create an Offer for a retail channel
After you've enrolled your product, you'll need to create and submit a retail offer. It takes less than a minute, so watch the demo to get started. More>

Retail Channels

Reach over 17 million online shoppers each month, through our participating retailers. Find new customers, generate new revenue.

Windows Marketplace | RED went live with Windows Marketplace in August 2007. Simply create a new offer for your existing products, or add...

TO FIG. 12C    FIG. 12B

MAP

MAP

TO FIG. 14B

FROM FIG. 14A

Retailer: Windows Marketplace

Status: Published

Offer Name: CA Anti-Spam Plus Website Inspector 2008_MWM

Notes:

Submit Date: 10/5/2007 10:32:24 PM

Start Date: 10/5/2007 12:00:00 AM

End Date: Not Configured

MSRP: USD 49.99

Min Advertised Price: USD 49.99

Offer Price: USD 49.99

⊟ Product Name, Version & Price

Product Name: CA Anti-Spam Plus CA Website Inspector 2008

Product ID: ASPMORECANA

FROM FIG. 14B

Offer Price: USD 49.9900

Version Number: 2.0.0.8

Version String: 2008

Release Date (Optional): Not Configured

⊟ Keywords and Category

Search Engine Keywords: Anti-Spam

Category: Security & Privacy / Anti-Spam & Anti-Spy Tools

⊟ Product Description

45 Character max Effective protection from Spam, Phishing etc

80 Character max Effective Protection from Spam, Phishing and Dangerous Websites

FIG. 14C

MAP

TO FIG. 15B

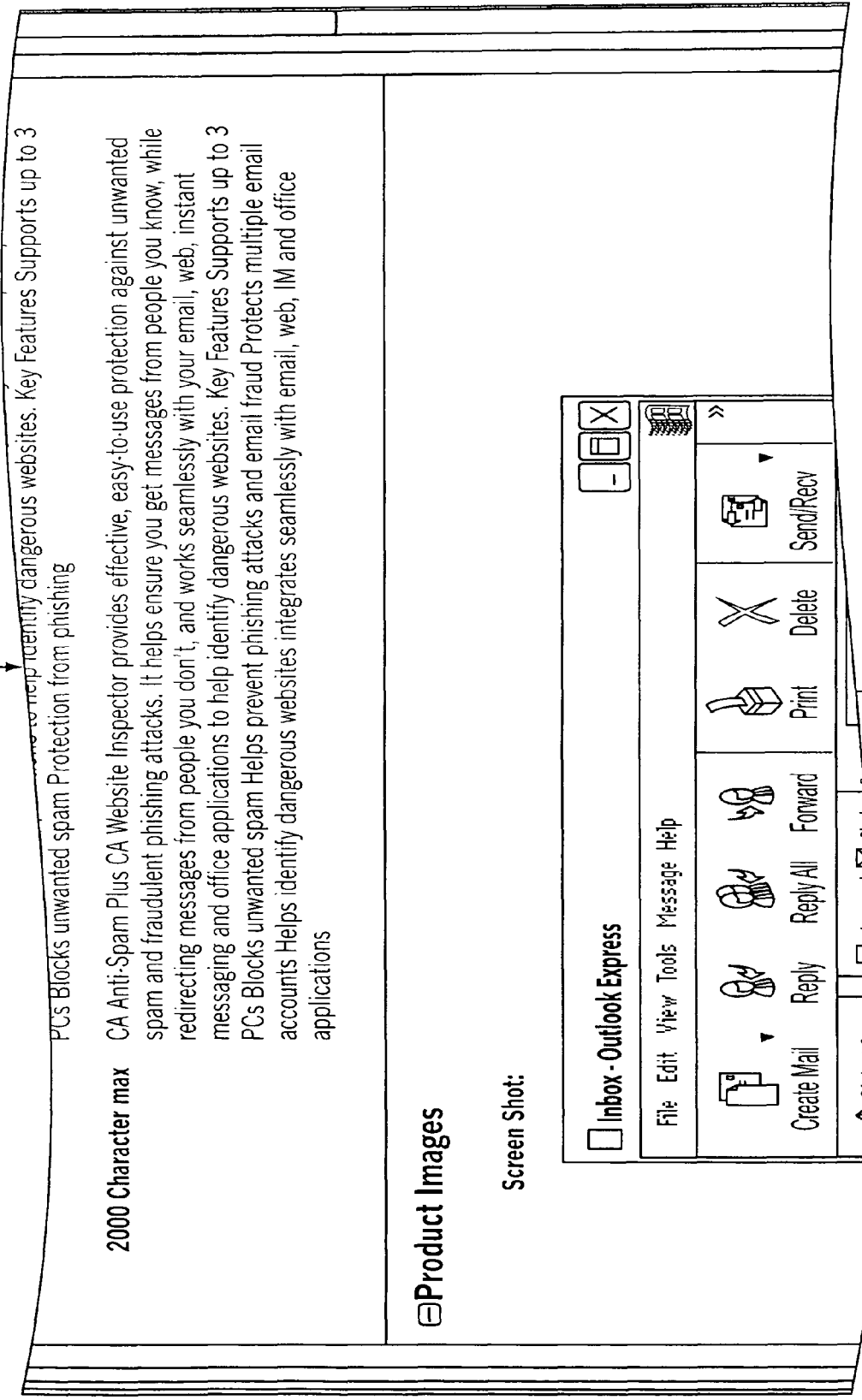

MAP

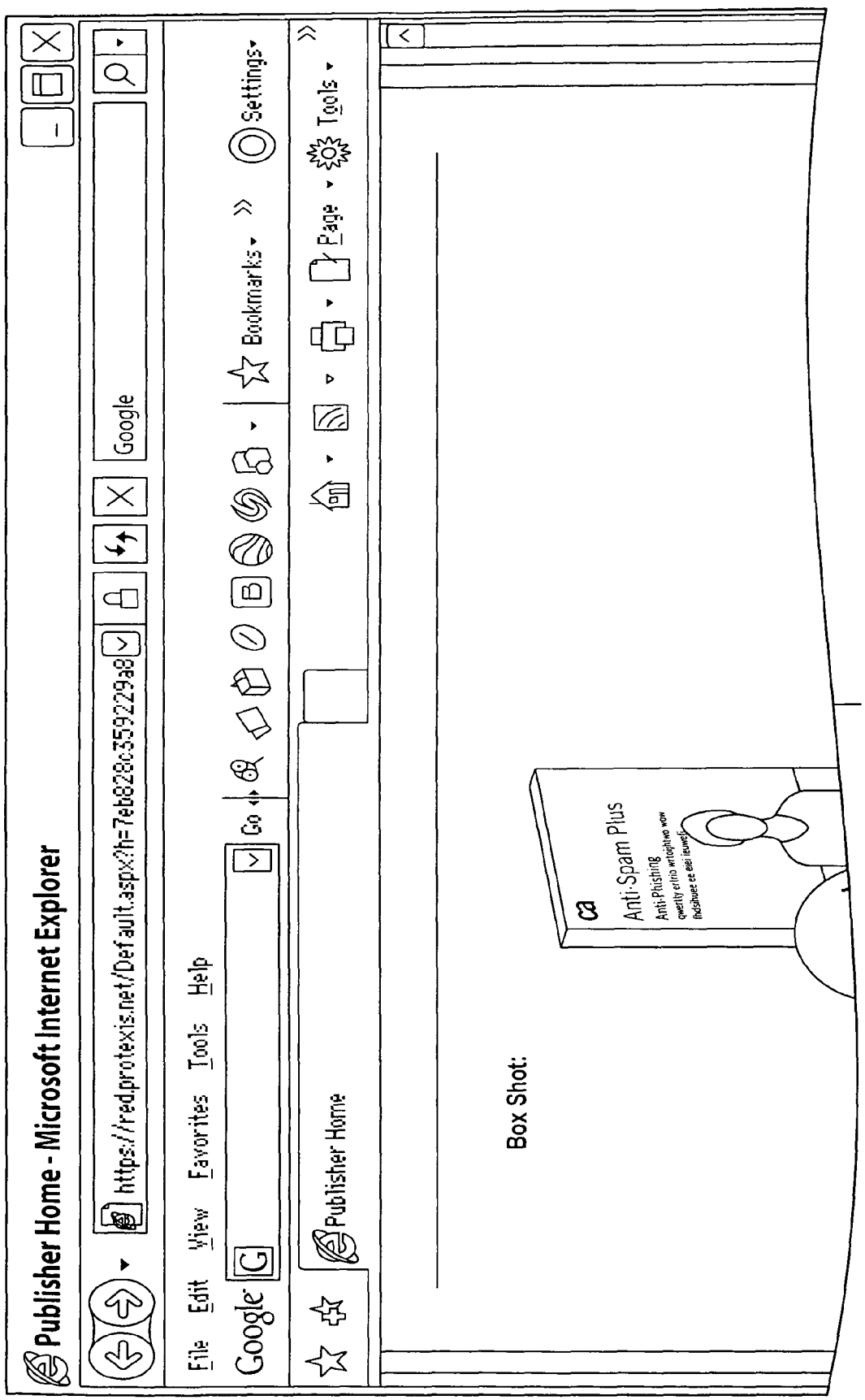

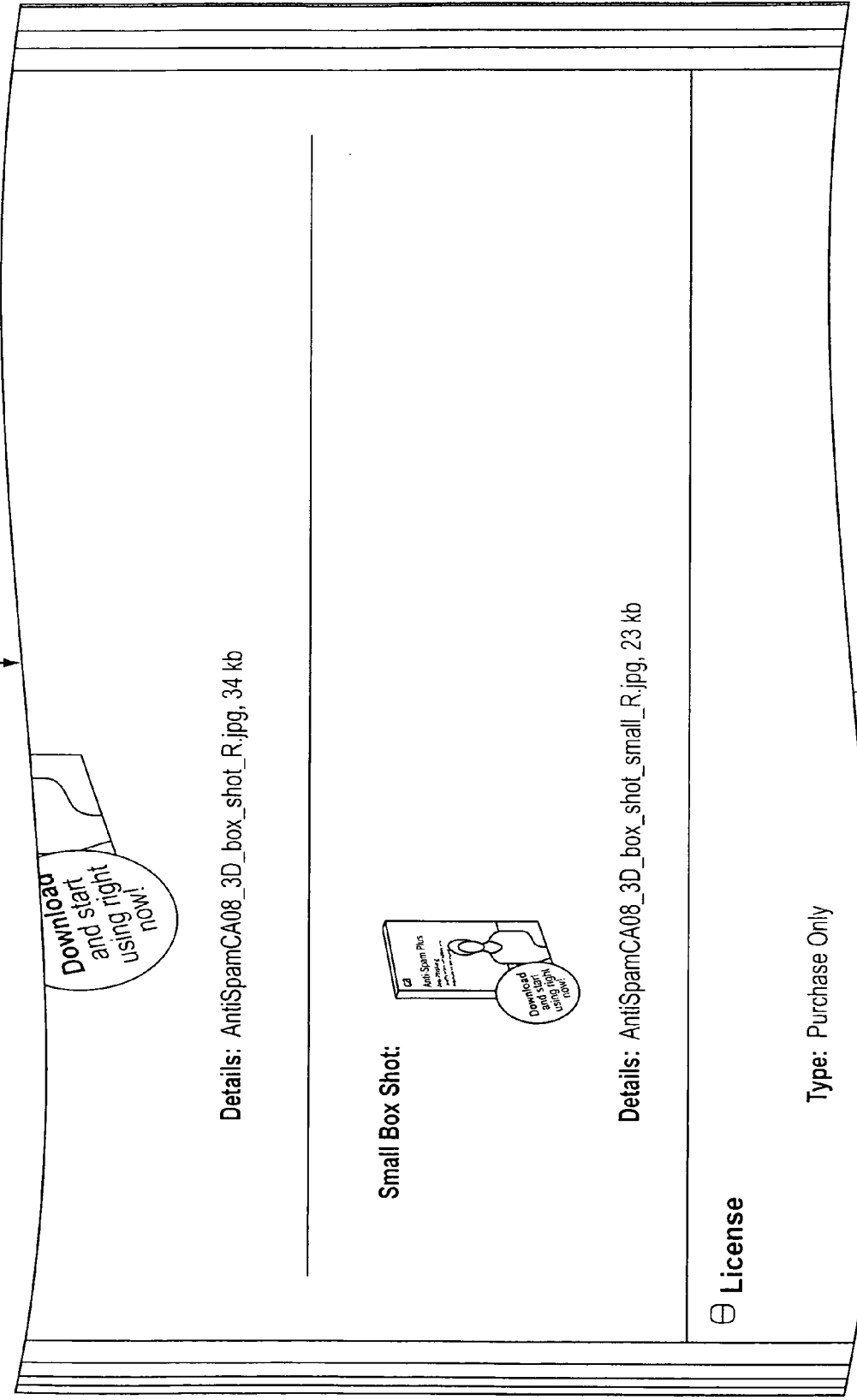

MAP

FIG. 18
MAP

TO FIG. 18B

| Product | Retailer | Offer | Start | End | Status |
|---|---|---|---|---|---|
| ▼ CA Anti-Spam 2007 3-User | | | | | |
| ☐ ☑ CA Anti-Spam 2007 3... | TigerDirect | CA_ASpam20... | 3/22/2007 | Not Configured | *Published* |
| Version: 2007 | | | | | |
| ▼ CA Anti-Spam Plus CA Website Inspector 2008 | | | | | |
| ☐ ☑ CA Anti-Spam Plus C... | Windows Marke... | CA Anti-Sp... | 10/5/2007 | Not Configured | *Published* |
| Version: 2008 | | | | | |
| ☐ ☑ CA Anti-Spam Plus C... | TigerDierct | CA Anti-Sp... | 10/5/2007 | Not Configured | *Published* |
| Version: 2008 | | | | | |
| ▼ CA Anti-Spyware 2007 10-User | | | | | |

FIG. 18B

FROM FIG. 18B

| | | | | | |
|---|---|---|---|---|---|
| ☐ ▢ ☑ CA Anti-Spyware 200... | TigerDirect | CA_ASpy200... | 3/23//2007 | Not Configured | *Published* |
| Version: 2007 | | | | | |

▼ CA Anti-Spyware 2007 Home Protection Pack 3-U...

| | | | | | |
|---|---|---|---|---|---|
| ☐ ▢ ☑ CA Anti-Spyware 200... | TigerDirect | CA_ASpy200... | 3/22//2007 | Not Configured | *Published* |
| Version: 2007 | | | | | |

▼ CA Anti-Spyware 2008

| | | | | | |
|---|---|---|---|---|---|
| ☐ ▢ ☑ CA Anti-Spyware 200... | Windows Marke... CA Anti-Sp... | | 10/5/2007 | Not Configured | *Published* |
| ☐ ▢ ☑ CA Anti-Spyware 200... | TigerDirect | CA Anti-Sp... | 10/5/2007 | Not Configured | *Published* |
| Version: 2008 | | | | | |

CA Anti-Virus 2007 10-User License

FIG. 18C

FIG. 19
MAP

FIG. 19B

Package-File Name: CA Anti-Spam Plus CA Website Ins

Manufacturer Part Number: ASPM08ECANA

MSRP: 49.99 USD

Min Advertised Price: 49.99 USD

Offer Price: 49.99 USD

Version Number: 2 0 0 8

Version String: 2008  *This is the version number as it will be displayed.*

Release Date (optional): Month ▽ Day ▽ Year ▽

⊖ Product Link

☐ Connect to an existing Try & Buy  Select Product ▽

⊖ Language & Operating System Support

FROM FIG. 19A

TO FIG. 19C

FROM FIG. 19B

Language:
- Afrikaans (af)
- Afrikaans South Africa (af-ZA)
- Albanian (sq)
- Albanian Albania (sq-AL)
- Arabic (ar)
- Arabic Algeria (ar-DZ)

*To select more than one item in a list, hold down the CTRL (Windows) or Apple (MacOS) key while clicking.*

OS Support:
- Windows NT
- Windows 95
- Windows 98
- Windows ME

Installation Instructions:
(optional - 200 character max)

⊖ System Requirements

FIG. 19C

System Requirements

*Please enter all relevant specific system requirements. Add additional software requirements to the "Other System Requirement" field. At least one system requirement field is required.*

Processor (CPU): `300 MHz or higher processor (800 MHz for Windows Vista)`
(250 character max)

Minimum Memory (RAM): `256 MB RAM (512 MB for Windows Vista)`
(250 character max)

Minimum Hard Drive Space: `40 MB hard disk space`
(250 character max)

Display (Screen Resolution):
(250 character max)

Video Card:
(250 character max)

Internet Access:
(250 character max)

Web Browser:
(250 character max)

Other System Requirements: `Microsoft Internet Explorer 5.5 or higher (7.0 for Windows Vista); Microsoft Outlook 2000 or higher,`
(250 character max) *Separate the Other System Requirements with the pipe character '|'. (Example:"_NET Framework 2.0|Sound Card")*

Region Applicability

Regions Selected: `Regions Selected Below Are Applicable`

Regions:
- UNITED STATES
- CANADA
- UNITED KINGDOM
- AFGHANISTAN
- ALAND ISLANDS
- ALBANIA

*To select more than one item in a list, hold down the CTRL (Windows) or Apple (MacOS) key while clicking.*

Keywords and Category

Search Engine Keywords (500 character max): `Anti spam` — *Separate words with a comma (,)*

Category:
- Audio & Multimedia
- Audio & Multimedia / Audio Encoders/Decoders
- Audio & Multimedia / Audio File Players
- Audio & Multimedia / Audio File Recorders

FIG. 20
MAP

TO FIG. 20B

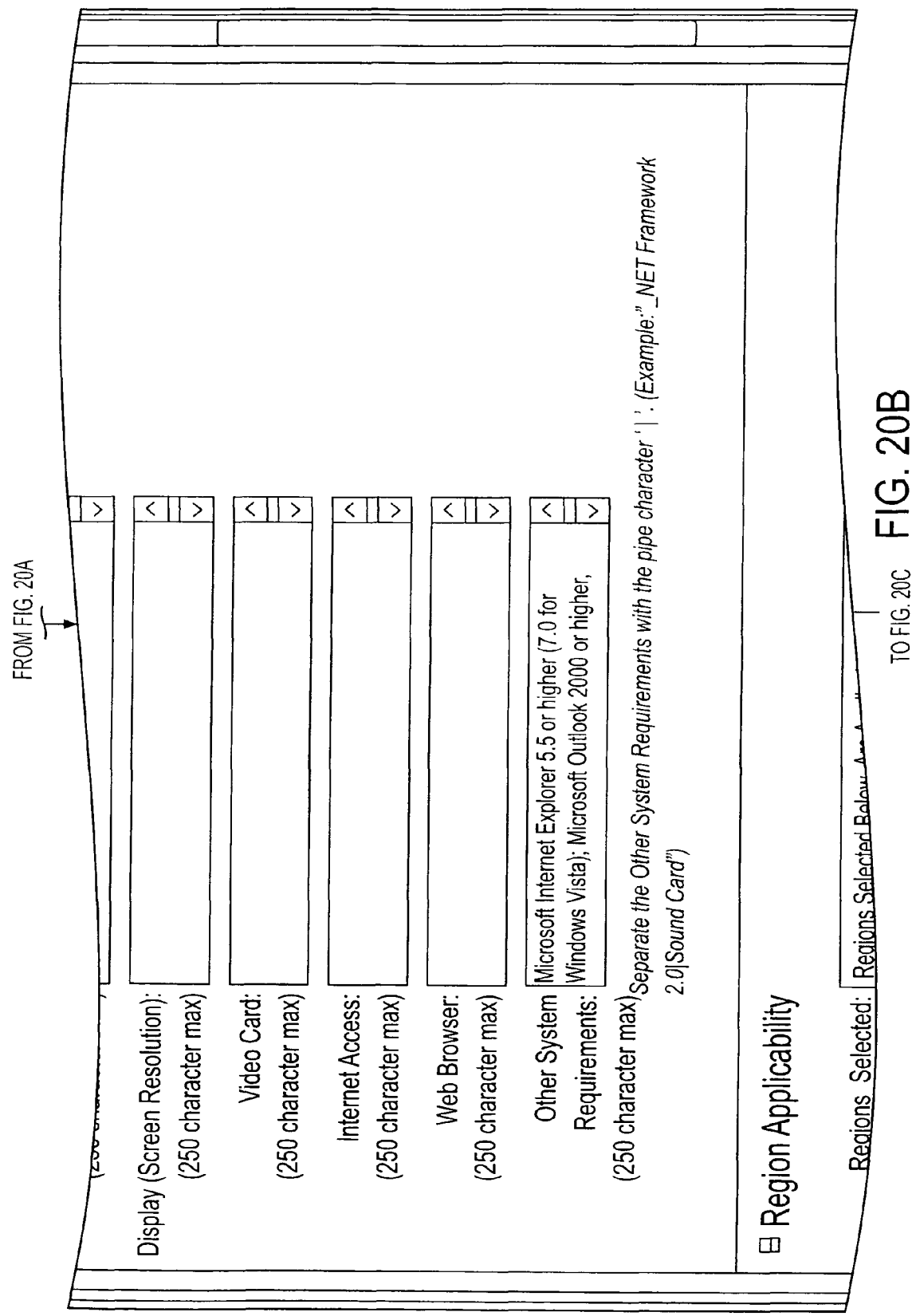

MAP

FIG. 21B

MAP

MAP

Application Files

Please note that once you have submitted an offer related to this product file, you will not be able to upload updates to this product file. If you need to update the product file, you will be required to create a new product profile.

⦿ Product File Location

Use this option if there is only a single file to upload. The file must be an executable or msi installer. Maximum file size is 125MB.

[_____] [Browse...]

○ Upload a Zip File a. Use this option if you have a multi-part installer. All nested directories and files must be included in the zip file. Maximum file size is 125MB.

[_____] [Browse...]

b. Enter the name of the primary setup or installer file within the above zip file. This file must be in the root of the zip file.

FROM FIG. 23A

MAP

TO FIG. 24B

CA Anti-Spam 2007 3-User requires Product Keys:

◉ Yes
○ No

*If your product requires keys, enter your low inventory alert limit. When your key inventory drops below this number, you with receive a notification email.*

Inventory Alert Limit: `10`

Email address to send alert to: `Julio.Somohano@ca.com`

Serial Number Dispense Court: `3`

Upload Key File

The serial numbers are being uploaded in packs? `No ▾`

*Locate the file that contains your serial numbers. This must be a .txt file with one serial number per line. Do not use comma or tab delimited formats.*

FROM FIG. 24A

![Publisher Home - Microsoft Internet Explorer screenshot showing Protexis CA, Inc. Product Management page]

PROTEXIS                                                   Help | Sign Out

| Home | Company Profile | Product Management | Offer Management | Reports |

CA, Inc. Product Management

Group by: [Product Name ▼] then [Version ▼] (Update View)

Checked Items: (Delete)                                    (Create New Product)

| | Product | Version | Part Number | Configuration | Status |
|---|---------|---------|-------------|---------------|--------|

▼ CA Anti-Spam 2007 3-User
  ▼ 2007
    ☐ 🔍 ✏ CA Anti-Spam 2007 3-U...  2007  ASP2007E...  Purchase Only  Active
    Offer Counts | Create Offer | Product Key Configuration- Remaining Keys 81: | File Management ▼ CA Anti-Spam Plus CA Website Inspector 2008
  ▼ 2008
    ☐ 🔍 ✏ CA Anti-Spam Plus CA...  2008  ASPMOBEC...  Purchase Only  Active
    Offer Counts | Create Offer | Product Key Configuration- Remaining Keys 199:| File Management ▼ CA Anti-Spyware 2007 10 User
  ▼ 2007
    ☐ 🔍 ✏ CA Anti-Spyware 2007...  2007  ASP2007LT...  Purchase Only  Active
    Offer Counts | Create Offer | Product Key Configuration- Remaining Keys 100:| File Management ▼ CA Anti-Spyware 2007 Home Protection Pack 3-User
  ▼ 2007
    ☐ 🔍 ✏ CA Anti-Spyware 2007...  2007  ASP2007LT...  Purchase Only  Active
    Offer Counts | Create Offer | Product Key Configuration- Remaining Keys 105:| File Management ▼ CA Anti-Spyware 2008
  ▼ 2008
    ☐ 🔍 ✏ CA Anti-Spyware 2008  2008  AS08ECAN...  Purchase Only  Active
    Offer Counts | Create Offer | Product Key Configuration- Remaining Keys 199:| File Management ▼ CA Anti-Virus 2007 10 User License
  ▼ 2007
    ☐ 🔍 ✏ CA Anti-Virus 2007 10...  2007  AV2007LT...  Purchase Only  Active

FIG. 25
MAP

TO FIG. 25B

Group by: Product Name ▽ then Version ▽  
FROM FIG. 25A → [Update View]

Checked Items: [Delete]   [Create New Product]

| | Product | Version | Part Number | Configuration | Status |
|---|---|---|---|---|---|
| ▼ CA Anti-Spam 2007 3-User | | | | | |
| ▼ 2007 | | | | | |
| | ☐ ☑ CA Anti-Spam 2007 3-U... | 2007 | ASP2007E... | Purchase Only | Active |
| | Offer Counts \| Create Offer \| Product Key Configuration- Remaining Keys 81:\| File Management | | | | |
| ▼ CA Anti-Spam Plus CA Website Inspector 2008 | | | | | |
| ▼ 2008 | | | | | |
| | ☐ ☑ CA Anti-Spam Plus CA... | 2008 | ASPMOBEC... | Purchase Only | Active |
| | Offer Counts \| Create Offer \| Product Key Configuration- Remaining Keys 199:\| File Management | | | | |
| ▼ CA Anti-Spyware 2007 10 User | | | | | |
| ▼ 2007 | | | | | |

TO FIG. 25C   FIG. 25B

OPEN, NEUTRAL ELECTRONIC DISTRIBUTION SYSTEM FOR DIGITAL CONTENT PROVIDING DISTRIBUTION CHANNEL SUPPORT TO PUBLISHERS AND RETAILERS AND ABSTRACT FULFILLMENT FOR PUBLISHERS

This application claims the benefit of U.S. provisional application Ser. No. 60/853,766, filed Oct. 24, 2006, which is incorporated herein by reference.

BACKGROUND OF THE INVENTION

1. Field of the Invention

The present invention relates to a system and method of digital content distribution that provides a unique business model by which publishers and retailers can select, respectively, retailer product channels and content titles. The present invention also relates to a system and method of abstract fulfillment of a product request at a retailer from a consumer that is transparent to a publisher, allowing for dynamic retailer-specific rebranding of the product and only a one-time upload of the product by a publisher to an open, neutral electronic distribution platform that can provide third party verification to the publisher of a transaction between the retailer and the consumer for that publisher's product.

2. Description of the Related Art

Consumers have come to expect the immediate gratification of downloading digital content. Today's $3 billion electronic software distribution (ESD) market is expected to triple by the end of the decade. But until now, publishers have not had a trusted or efficient way of fully leveraging this growing ESD market. Publishers might be selling digital content directly to consumers, but they are missing out on the 80% of consumers shopping at online retailers. A need exits for ways publishers can provide digital content to retailers to extend their reach and increase sales that overcomes existing problems with trust, management and scalability.

More specifically, there currently exists a massive untapped opportunity to leverage multi-channel distribution networks online. ESD can bring significant benefits to consumers, software publishers and online retailers including: increased product reach and availability, quicker time to value, and lower cost of transaction. The value of ESD is not being realized, however, because ESD is not efficiently integrated into indirect, efficient retail channels.

Publishers want to provide digital content to retailers to extend their reach and increase sales. They can send a "gold master" to each reseller, but there are issues with trust, management and scalability. Alternatively, the publisher can host its own bits, but it is difficult for retailers to scale to multiple publishers and products. Publishers do not have a trusted, open, efficient, ESD solution to reach the aggregate of consumers shopping at online retailers that also provides them with technology-based, third party transaction verification. Retailers do not have a non-competitive, integrated, broad-inventory solution to offer ESD as part of their customer's shopping experience. Current outsourced ESD options are not satisfactory for the retailer or the publisher. Neither party has the opportunity to differentiate their product to enhance sales. In addition, ESD is competitive to the retail channel and not integrated into retail customers' purchasing experience, which means the retailer loses the ability to manage the customer relationship and to up-sell/cross-sell. Consumers may also be more likely to abandon their shopping carts, since they have to make separate purchases for digital content. For the publisher, since the outsourced option is also the merchant of record, they do not have technology-based trusted third party verification for their digital transactions. Thus, a need exists for open, neutral and efficient online digital content distribution that connects content publishers with online retailers, fosters stronger working relationships, and provides a non-competitive, hosted platform that offers real-time inventory management, extended reach, and neutral third party verification for the secure packaging and delivery of digital content.

Publishers currently do not have choices for fully leveraging the internet for content distribution and are therefore limiting their reach and revenue opportunities. Bits are replicated on each sale which necessitates a trusted, technology based audit trail or transaction verification for digital content to ensure that publishers are paid for what is sold. Today, it is not cost-effective, scalable, manageable or efficient for publishers to prepare and manage different versions of their gold masters for each title and for each retailer. Publishers are paying much heavier margins and/or fees, in excess of 50%, through e-commerce service providers and affiliates or by fulfillment of traditional boxed goods. Publishers only have access to a small percentage of online buyers for their digital content. 80% or software sold online is through indirect retail channels who are not participating in ESD today. Thus, a need exists for a system to overcome such disadvantages experienced by publishers.

Retailers currently do not have a way to fully participate in ESD other than plugging into a separate store and disrupting their customer experience or building it themselves. Retailers have and want to maintain their customer relationships and offer an integrated shopping experience. For example, a need exists to maintain control and loyalty of customers at all times. Further, retailers want to leverage up-sell and/or cross sell opportunities. It is currently difficult for retailers to build inventory of digital content. For example, they desire to be able to plug into a maintained catalog of inventory and need to have current product-level merchandising information. Retailers want to take advantage of the extra touch points provided by the 'try before you buy' environment. Thus, a need exists for a system to provide retailers such advantages and opportunities and more.

SUMMARY OF THE INVENTION

Exemplary embodiments of the present invention address at least the above problems and/or disadvantages and provide at least the advantages described below.

Accordingly, an aspect of an exemplary embodiment of the present invention is to provide an open, neutral (e.g., an exemplary retail electronic distribution (RED) in accordance with an embodiment of the present invention is not an online store or outsourced distribution catalog) and efficient content distribution system or platform that can reach masses of consumers shopping at online retailers, using trusted transaction verification and build-once efficiency.

A system in accordance with an exemplary embodiment of the present invention enables networks for open, neutral and efficient online digital content distribution, connects content publishers with online retailers and fosters stronger working relationships. This non-competitive, hosted platform offers real-time inventory management, extended reach, and neutral third party verification for the secure packaging and delivery of digital content.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

In accordance with an aspect of an exemplary embodiment of the present invention, an online service and system 10 is provided through which digital content publishers can package, protect, market and sell their content through on-line retailers, and through which on-line retailers can both build a unique inventory of digital content with all associated marketing meta-data to sell through their on-line stores and seamlessly integrate the digital content into their on-line shopping cart.

Figure 1:
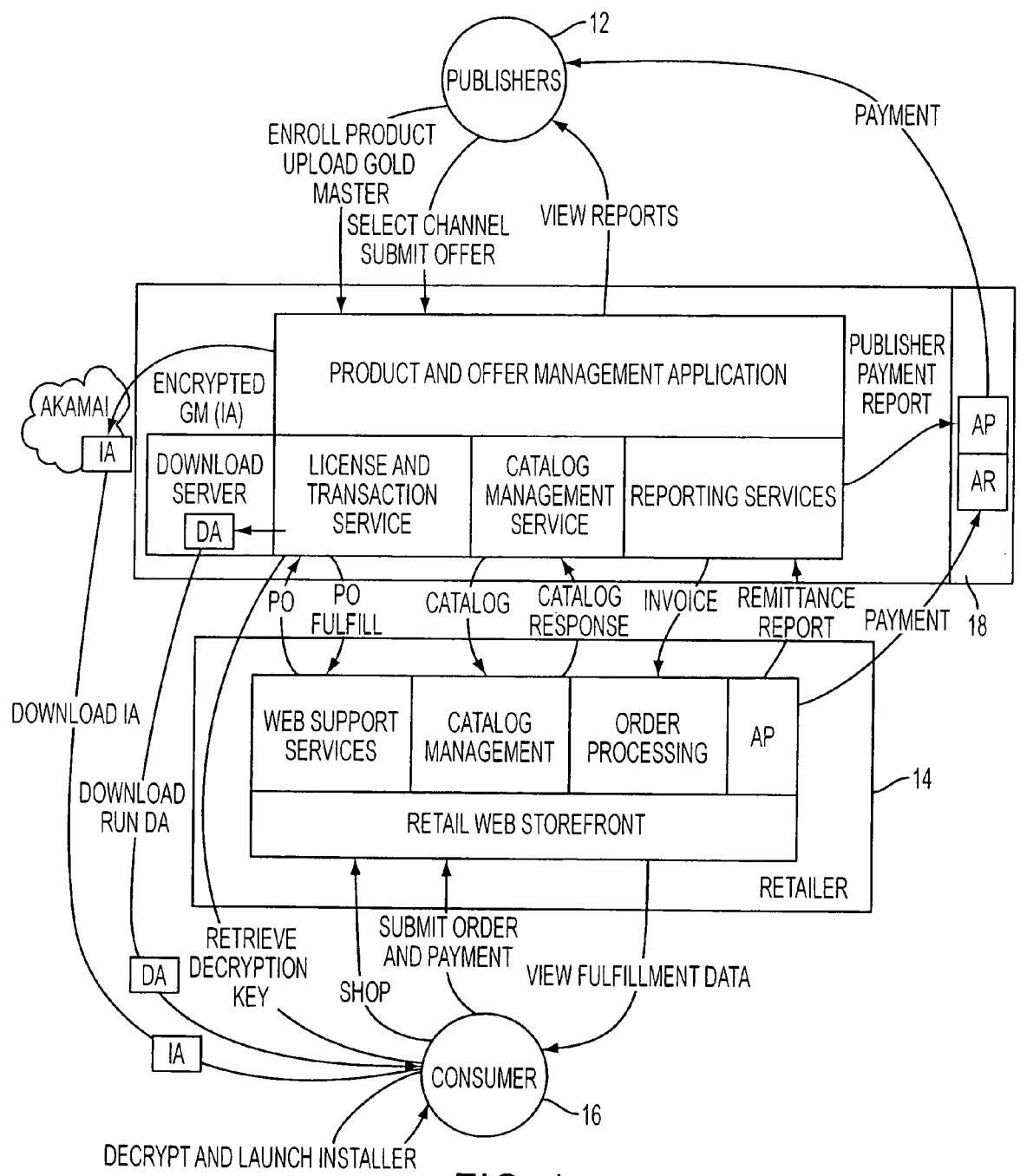
FIGS. 1, 2, 3, 4, and 5 illustrate different commerce partners in a retail electronic distribution (RED) system according to an exemplary embodiment of the present invention.

FIGS. 1 through 5 each depict different commerce partners in connection with the present invention such as publishers 12, a Retail Electronic Distribution platform (RED) 18, a retailer 14 and a consumer 16. FIG. 1 is an overview depicting the combined flows of information between these partners that are described separately in FIGS. 2 through 5.

Figure 2:
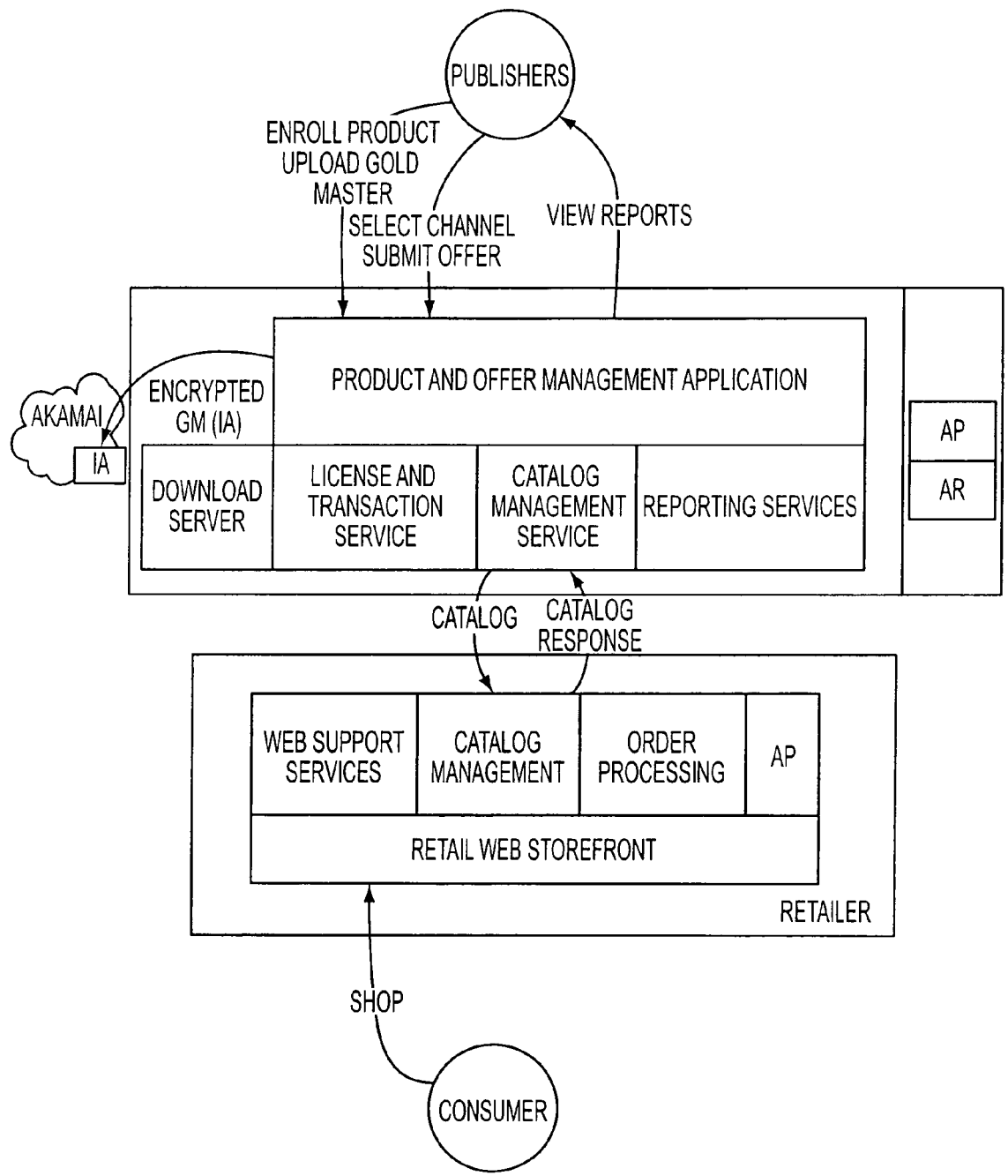
Figure 3:
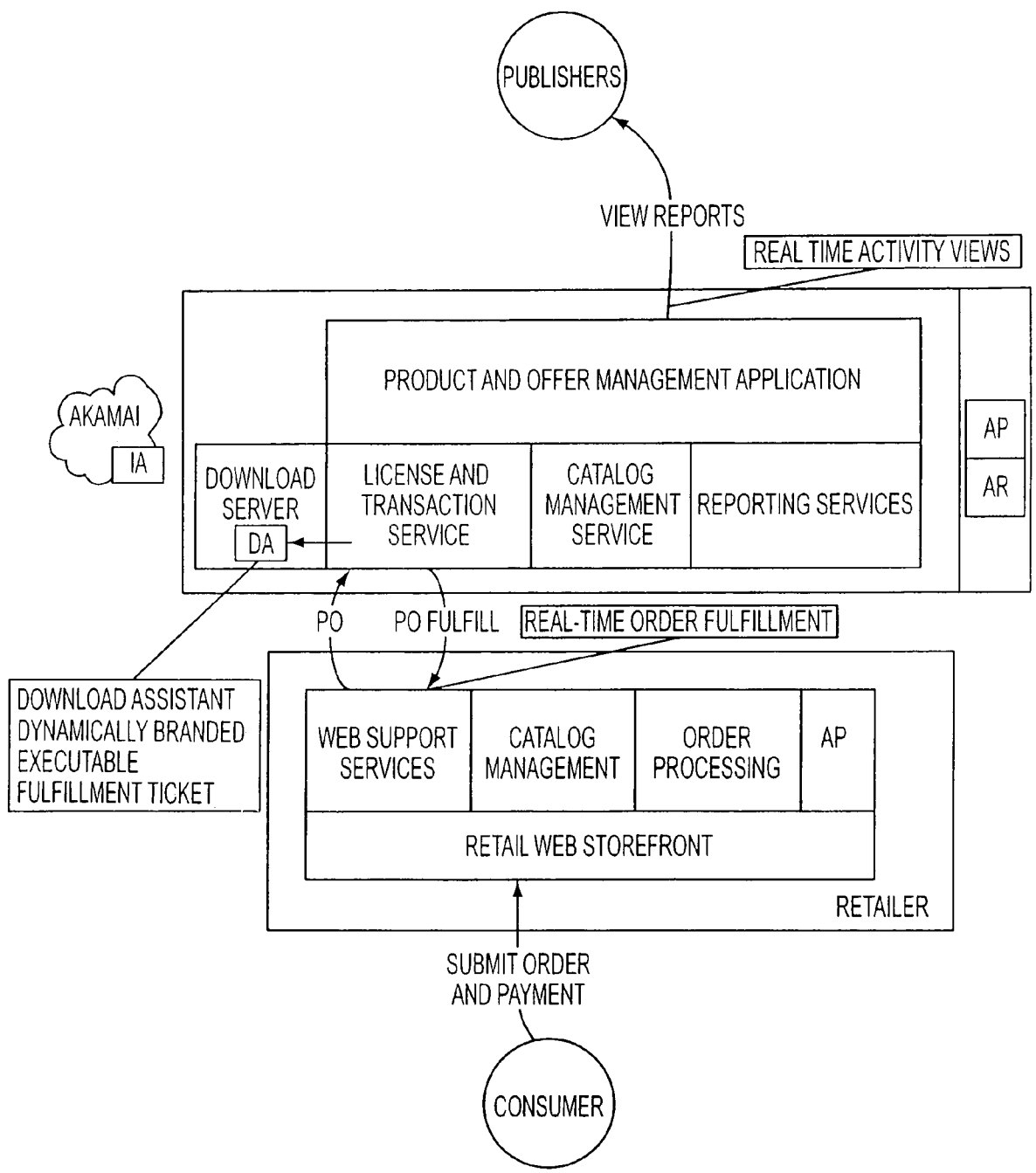
Figure 4:
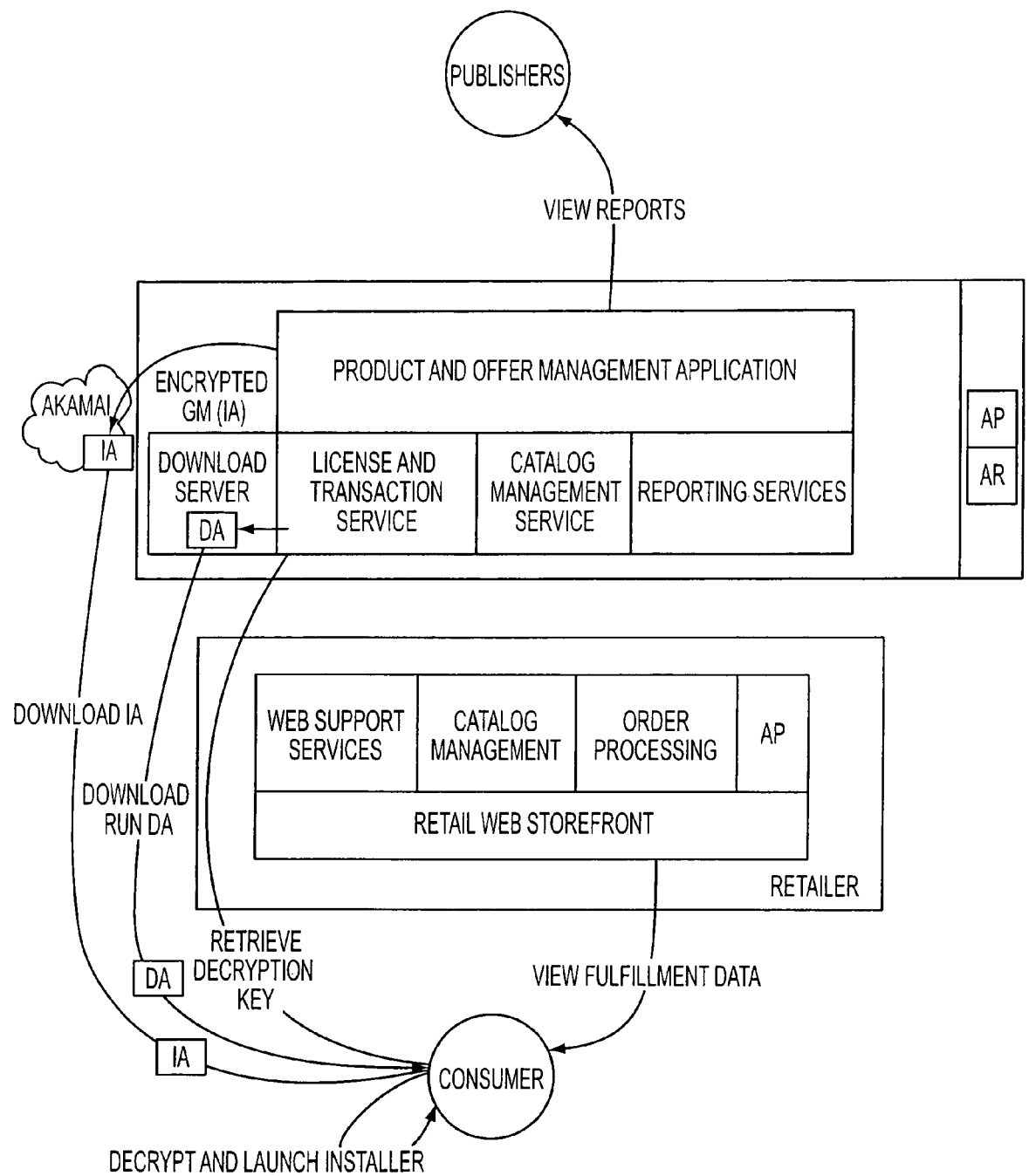
Figure 5:
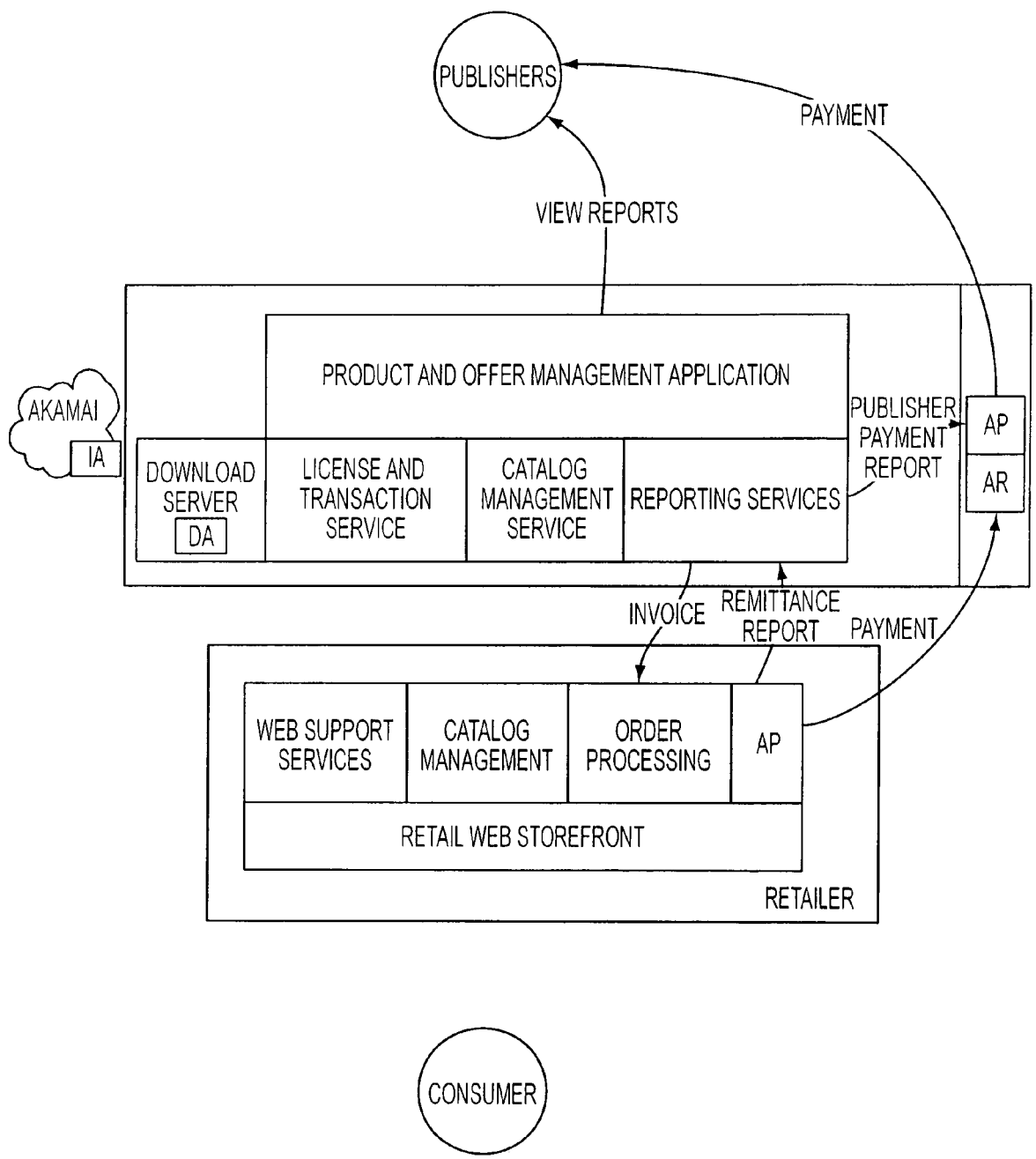

Product preparation for catalog delivery is depicted in FIG. 2 whereby publishers 12 can upload content (e.g., music, video, software) to the RED system 10. The content can be digitally encrypted. The publishers 21 then enroll the content with the RED system 10 by providing any merchandising and product information that is to be offered with the content to consumers 16 via retailers 14 using the RED system 10. After enrollment, a Gold Master is uploaded to the RED system 10. Retailers 14 can then receive (e.g., nightly) a catalog feed from which to select publisher content that is to be branded (see FIG. 7 and accompanying text) for that retailer 14 and sold through that retailer's on-line site.

At a point of sale (FIG. 3), the consumer 16 is authenticated and product activation can be used. Commonly-owned U.S. Pat. Nos. 5,809,145, 7,010,697 and 7,124,437 describe various preferred aspects of activation and are incorporated by reference herein. A Download Assistant brands the product order item with an ID of the retailer and images and injects encryption. The consumer 16 receives a secure link to download the software through the order confirmation page received from the retailer 14. See also FIGS. 7 and 8 which describe product preparation, delivery and purchase in more detail.

During product fulfillment (FIG. 4), the branded and encrypted content is sent directly to the consumer 16 and is described in further detail below in connection with FIG. 9.

Figure 6:
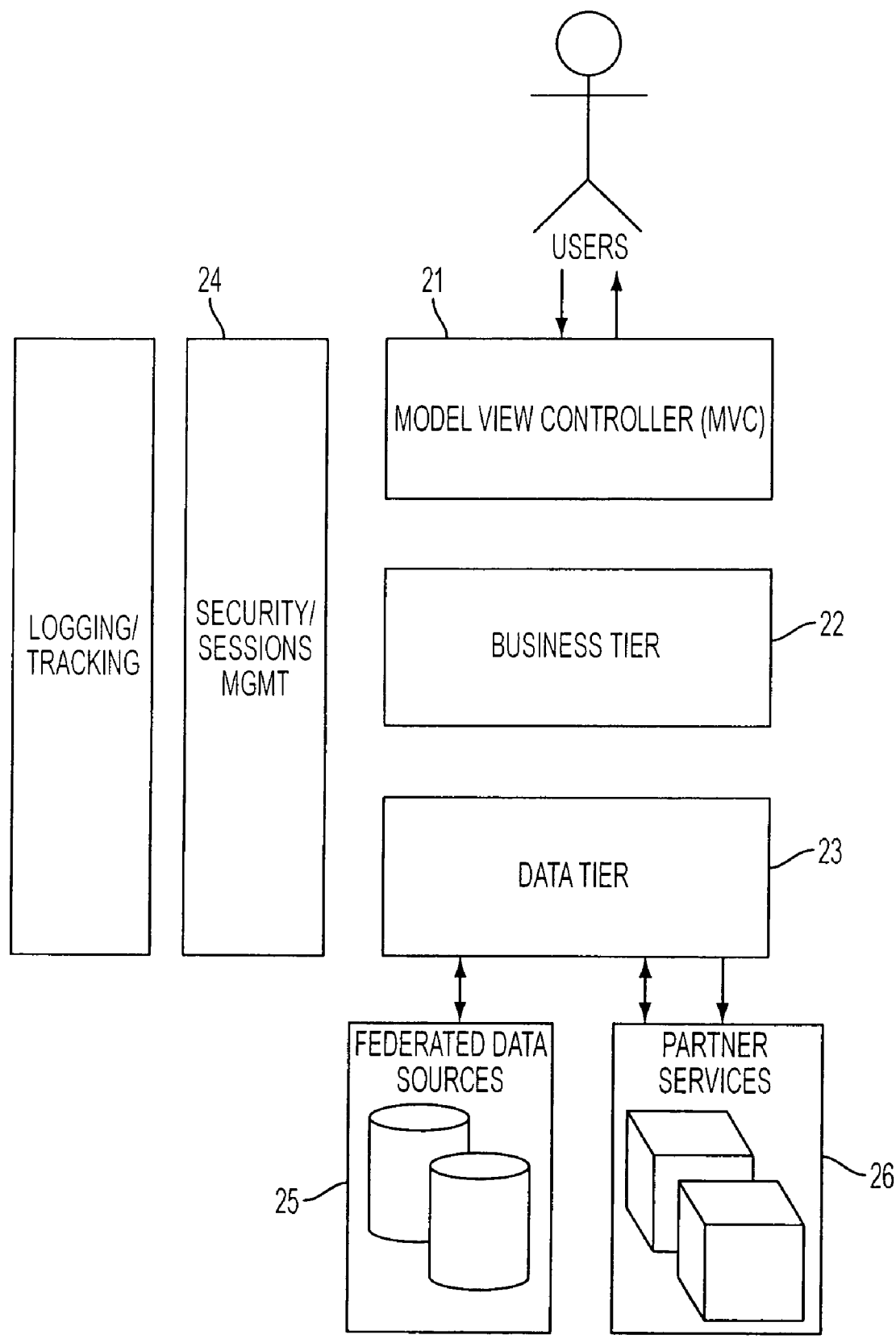
FIG. 6 illustrates a architecture for implementing the RED system in accordance with an exemplary embodiment of the present invention.

An illustrative architecture for implementing an RED platform 18 in accordance with exemplary embodiment of the present invention is depicted in FIG. 6. A model view controller (MVC) architecture is preferably implemented to build a user interface (UI) tier 21. The RED system 10 is preferably a web-based environment, and the views (e.g., publisher and retailer screens) are implemented as aspx web pages.

With continued reference to FIG. 6, a business tier 22 implements business logic. The business tier 22 can be implemented using the .NET 2.0 framework using C#. The business tier 22 is preferably consumed by the MVC 21.

The data tier 23 is preferably consumed by the business tier 22. Business tier 22 objects generally do not have a one-to-one relationship with data tier 23 objects. The data tier code is preferably generated and based upon a schema design stored within XML files that describe the database entities, their interrelationships and required stored procedures.

Core services indicated at 24 in FIG. 6 provide user security, session management, server event logging and application tracing. These services cross preferably all three tiers 21, 22 and 23. The security and session management is preferably custom developed, whereas the logging and tracing use built in .NET 2.0 features.

The RED system 10 scalability is achieved using, for example, a federated database 25. The code generated database can be federated by both subject area and customer. The customer federation utilizes unique URLs, whereas the subject federation utilizes unique physical and logical data stores.

Partner services (e.g., retailer and publisher services) are implemented, for example, using a Services Oriented Architecture (SOA) utilizing both SOAP and Restful APIs.

The federated database-type RED system is a type of meta-database management system (DBMS) which transparently integrates multiple autonomous database systems into a single federated database. The constituent databases are interconnected via local computer network or can be geographically decentralized.

The RED system 10 preferably implements the federated model at the application data layer and supports this model at the physical layer through a MS SQL 2005 server, for example. Implementation of the federated model at the application data layer allows data-requests to be dispatched based on subject to the appropriate data-server. This allows mission critical subjects such as purchasing to be hosted on dedicated boxes. At the physical layer, the federation can be further divided arbitrarily at the table level to alleviate bottlenecks such as index intensive writes. The RED system 10 also supports the federated model at the URL allowing customer specific information to be partitioned and secured on a separate site.

Illustrative process and work flows for the RED system 10 will now be described with reference to FIGS. 7-9 in accordance with exemplary embodiments of the present invention.

Figure 7:
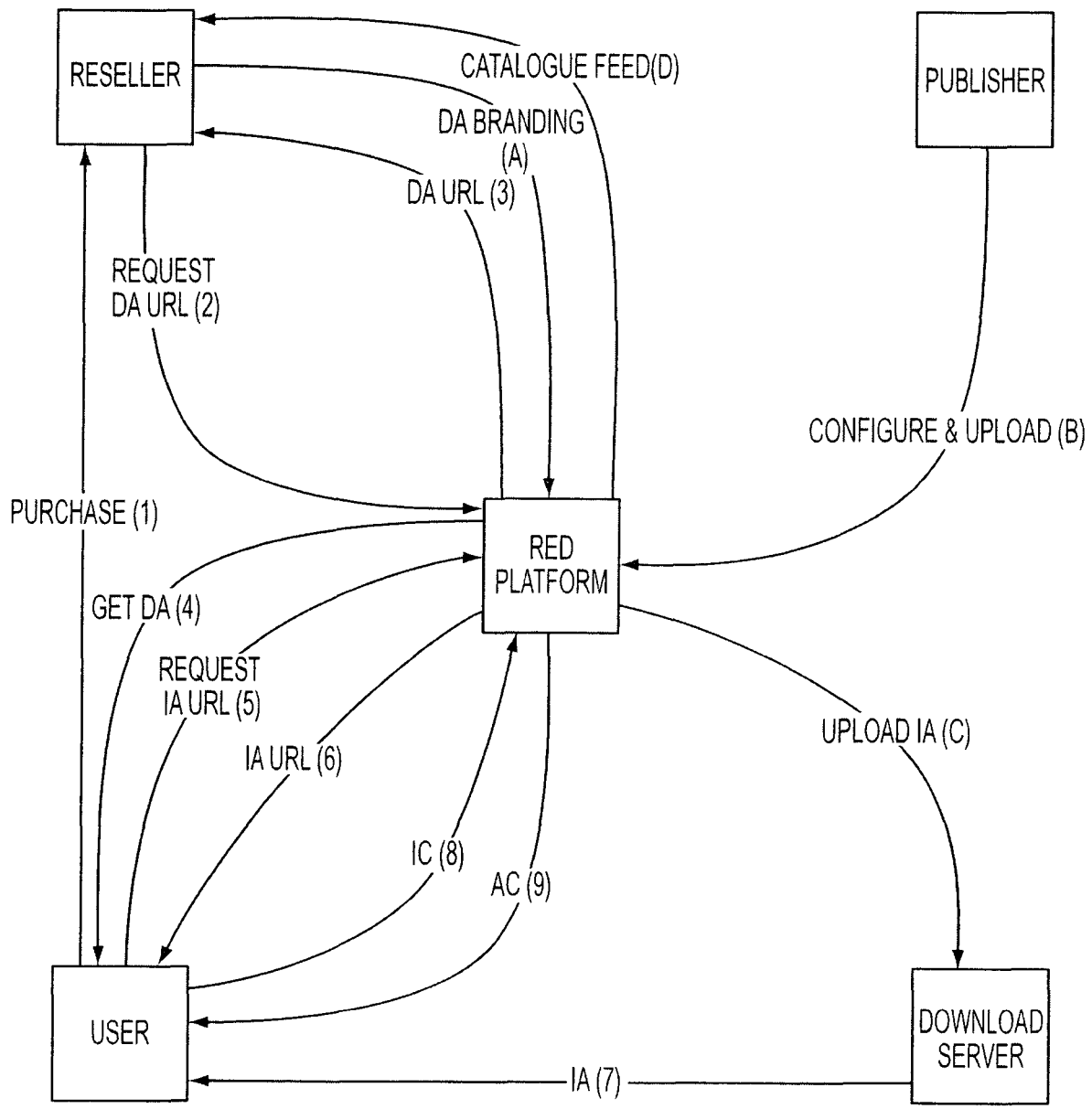
FIG. 7 illustrates basic product preparation and delivery via the RED system in accordance with an exemplary embodiment of the present invention.
Figure 8:
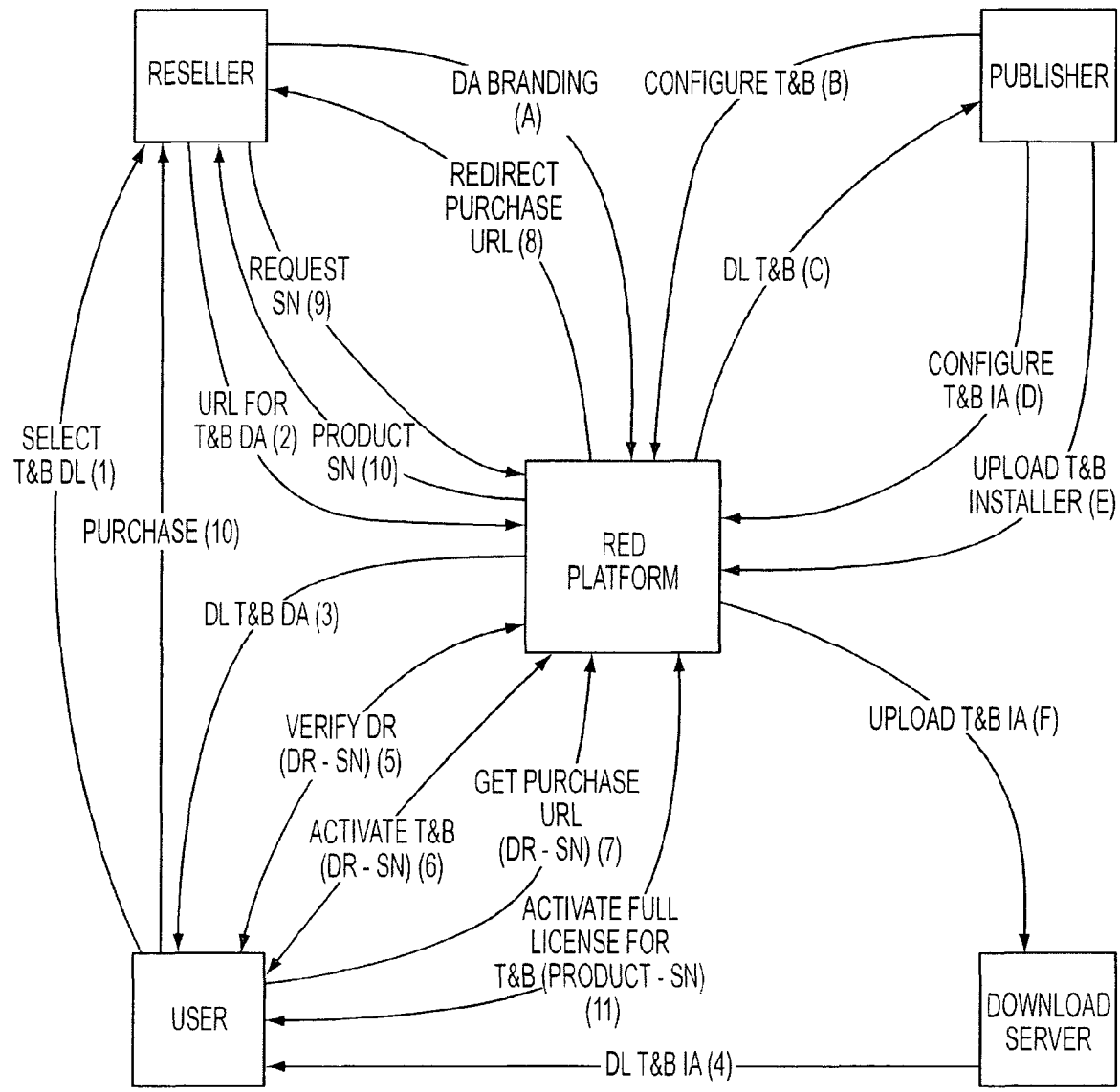
FIG. 8 illustrates trial product preparation, delivery and purchase of a product according to an exemplary embodiment of the present invention.

FIG. 7 provides a basic product preparation and delivery diagram in accordance with an exemplary embodiment of the present invention. FIG. 7 illustrates the basics of getting a product from the publisher 12 to the consumer or end user 16. There are details about setting up an account and preparing product offerings and approval at the EED platform that are not provided here.

Product Preparation is described with reference to the paths labeled A through D in FIG. 7.

(A) The Reseller 14 provides the branding options that will apply to all of the products in their catalog. Eventually, these get pushed into the Download Assistant.

(B) The Publisher 12 configures its product and uploads their product binary.

(C) The Publisher's product is encrypted, wrapped with an Installation Assistant and uploaded to a download server. The product can also be subjected to a quality review by the RED platform operator at this point.

(D) Information about the Publisher's product is added to a periodic feed of catalog data, and it is added to the Reseller's web-store.

Purchasing is described with reference to the paths labeled 1 through 9 in FIG. 7.

(1) The Customer 16 purchases the product from the Reseller's web-store.

(2) The Reseller 14 processes the payment and requests a download URL for the product. The URL request represents a billable event for a RED platform operator so there is a brief exchange between the RED platform 18 (hereinafter referred to as a "server" 18 for illustrative purposes and conciseness) and the Reseller 12 to guarantee the integrity of the exchange. The publisher requests a transaction identifier from the server 18, and this is returned to the server 18 in the final URL request along with the same basic information that would usually be found on a paper receipt.

(3) The RED platform 18 prepares a Download Assistant and returns the download URL to the reseller that includes a unique sale identifier. The format of the Download Assistant URL is: Http://download.ntitles.net %20download<Product Name>&<Sales ID>. The RED platform 18 prepares a Download Assistant unique for the sale by embedding a digital receipt, digital license, reseller id, product id and serial number in it. This is used later as proof of purchase and to verify that the Customer 16 is entitled to install the product.

(4) The Customer 16 clicks on the URL and either saves or runs the download assistant. The Download Assistant will be generated when the Reseller requests the URL so that it is available the moment the Customer clicks it on the purchase page. These prepared files will be purged after some reasonable timeout but they can be regenerated on-demand using the Sales ID to find the original configuration.

(5) The Download Assistant requests the download URL for the Installation Assistant from the server 18.

(6) The server 18 returns either the URL for the Installation Assistant or a URL for a web page explaining why the Installation Assistant is not available at this time. Any period of time may have passed since the Customer 16 saved the Download Assistant and when they run it so there are a number of reasons why the Installation Assistant might not be available These could range from a temporary service outage to the product being permanently removed from production.

(7) Using the URL returned in the previous step, the Download Assistant streams the Installation Assistant to the Consumer's system.

(8) When the download is complete the Installation Assistant takes over. All of the information embedded in the Download Assistant is preferably burned into the Installation Assistant at this point. An Installation Code is generated and sent to the server along with the serial number and various identifiers. This information is used on the server 18 to find this specific sale. The server 18 verifies that the product is within the installation tolerance specified (e.g., by the Publisher or Reseller). If so, this installation is recorded and an Activation Code is returned.

(9) The Activation Code returned in the previous step is used to decrypt the secure section of the digital license. The product key embedded in the digital license is used in turn to verify the digital receipt and decrypt the product wrapped in the Installation Assistant. The Installation Assistant can now launch the Publisher's installer (or save the file to disk).

Trial product preparation, deliver and purchase are described with reference to FIG. 8 with an exemplary embodiment of the present invention. Product preparation is illustrated by paths A through F in FIG. 8. Trial and purchase are illustrated by paths (1) through (2) in FIG. 8.

Product Preparation

A. The Reseller or Retailer 14 configures the branding options for the Download Assistant.

B. The Publisher 12 configures a post compile trial. In this example, a Try and Buy scenario is shown.

C, The Publisher 12 downloads its trial-enabled software created in the previous step and creates an Installer.

D. The Publisher 12 configures the trial-enabled software for distribution through the Resellers 14.

E. The Publisher 12 uploads the Installer for the trial-enabled software to the RED platform 18 where it is subjected to the approval process.

F. Once approved, the software is sent to the server 18 and made available to the Reseller's catalog.

Trial and Purchase

1. The Customer 16 selects to download the trial through the Reseller's web store.

2. The Reseller 14 requests a download link from the RED platform 18, a Download Assistant is prepared and the URL returned to the Reseller 14.

3. The Customer 16 clicks on the URL from the previous step and gets the Download Assistant.

4. The Download Assistant brings down the Installation Assistant for the Publisher's product.

5. The Digital Receipt is activated and verified.

6. The Trial is registered and activated. But unlike the usual method, the Serial Number for the Download Assistant is supplied to the server 18. The server records this Serial Number against the trial.

7. The Customer 16 decides to purchase a full license for the Try and Buy product. The purchase URL is links to the server 18, but a Serial Number that references the Download Assistant is also supplied. This creates a link between the trial and the Reseller 14.

8. The server 18 redirects to the Reseller 14 so it can service the purchase. The server 18 can use this an opportunity to share the purchase revenue with the Reseller 14.

9. The Customer 16 completes the purchase on the Reseller's web store.

10. The Reseller 14 requests a serial number from the server 18 to complete the purchase.

11. The server 18 serves a serial number to the Reseller 14 and recognizes revenue from the sale.

12. The Customer 16 activates the full license.

Order Fulfillment Sequence

Figure 9:
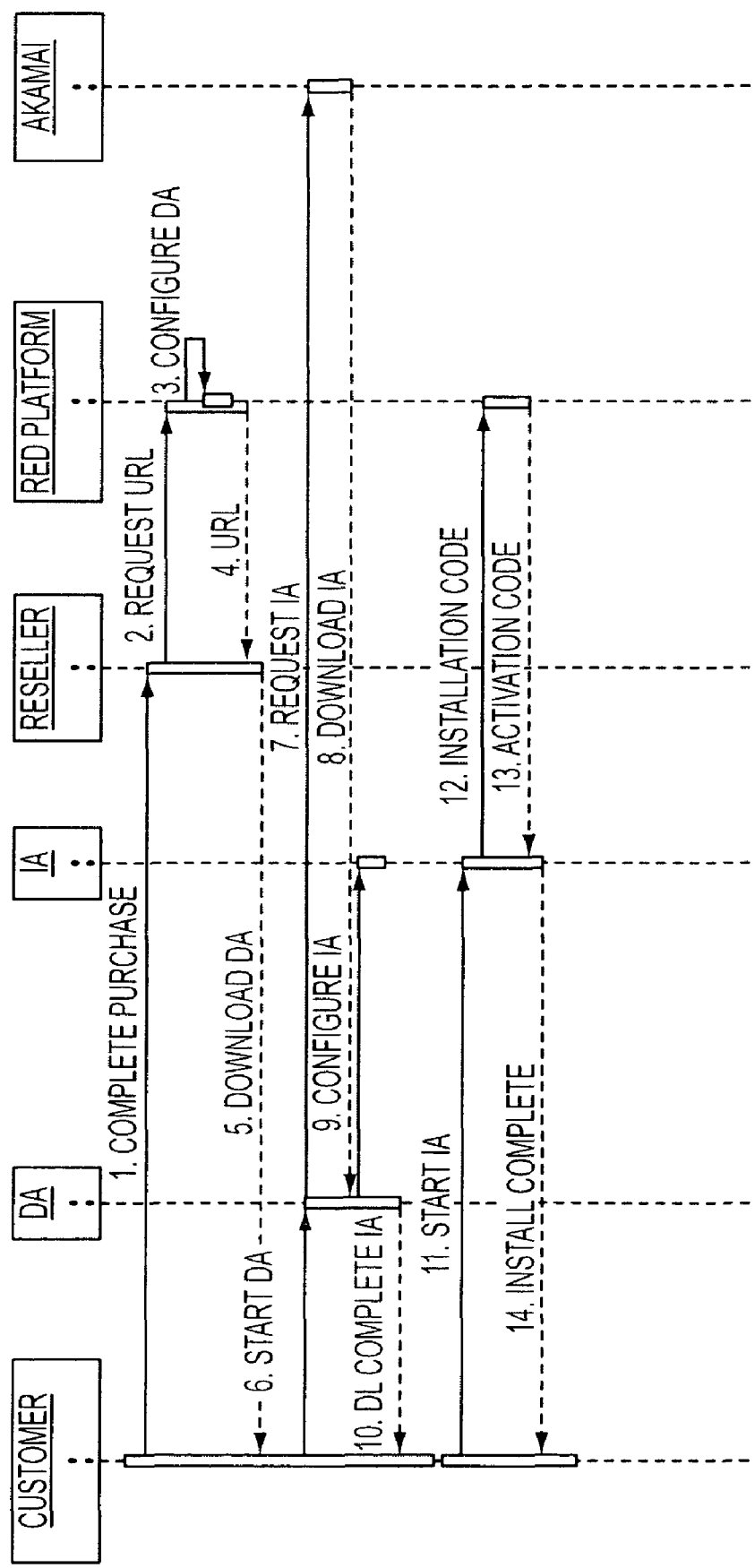
FIG. 9 illustrates an order fulfillment sequence according to an exemplary embodiment of the present invention.
Figure 10:
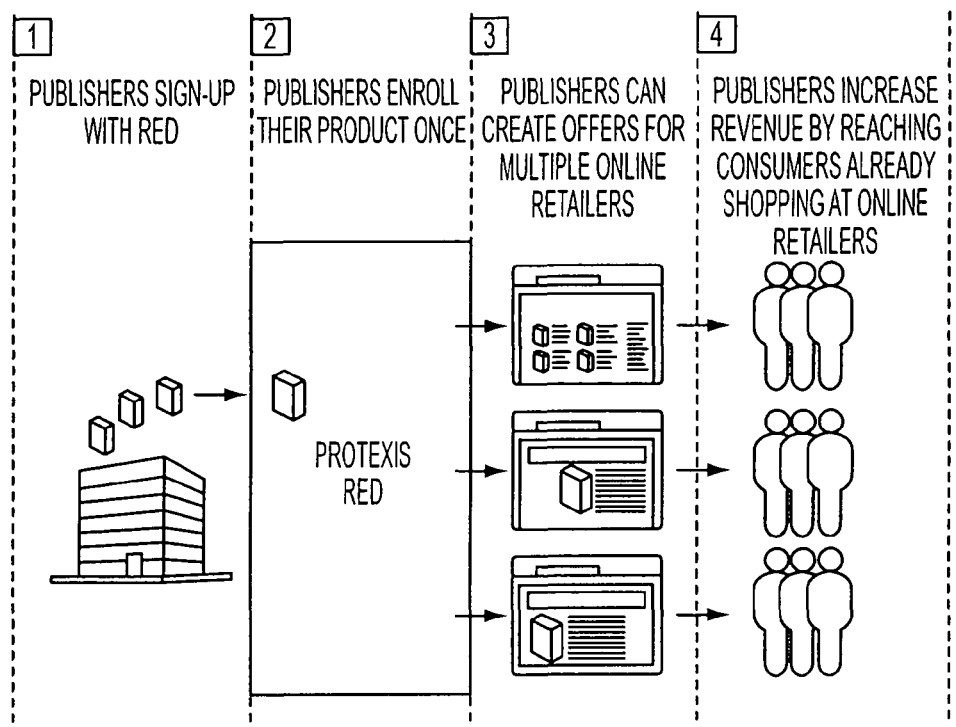
FIGS. 10 and 11 illustrate, respectively, basic publisher and retailer operations in a RED system according to exemplary embodiments of the present invention.
Figure 11:
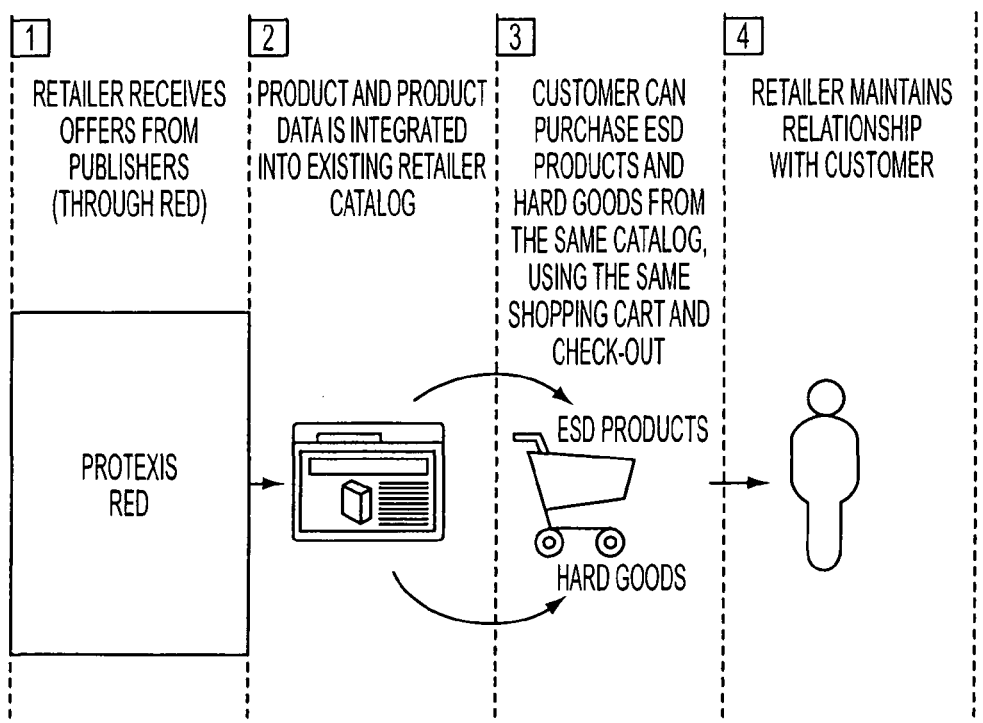

FIG. 9 shows the fulfillment process from a purchase up to a completed installation in accordance with an exemplary embodiment of the present invention.

1. The Customer 16 completes a purchase on the Reseller site 14.

2. The Reseller 14 issues a purchase order via SOAP call for the download URL.

3. The RED platform (e.g., server) 18 configures the Download Assistant applying the Reseller's branding, setting the serial number needed to activate a digital license and applying any additional information needed by the system 10.

4. The server 18 returns a URL specific to this branded and configured copy of the Download Assistant.

5. The Customer 16 downloads the Download Assistant.

6. The Customer 16 starts the Download Assistant.

7. The Download Assistant requests the Installation Assistant from an Akamai edge server, for example, using the URL embedded in the Download Assistant.

8. The Installation Assistant download is completed.

9. The moment the download is complete, the Download Assistant brands the installation assistant, and copies its configuration over.

10. The Customer 16 is notified that the Installation Assistant is completely downloaded.

11. The Customer 16 starts the Installation Assistant at their convenience (e.g., immediately or at any time in distant future).

12. The Installation Assistant sends an installation code to the RED server 18 as the first step in activating the digital receipt.

13. The RED server 18 returns an activation code that is used to activate the digital receipt.

14. The Installation Assistant installs a digital receipt and launches the publisher installation program and terminates.

Figure 12:
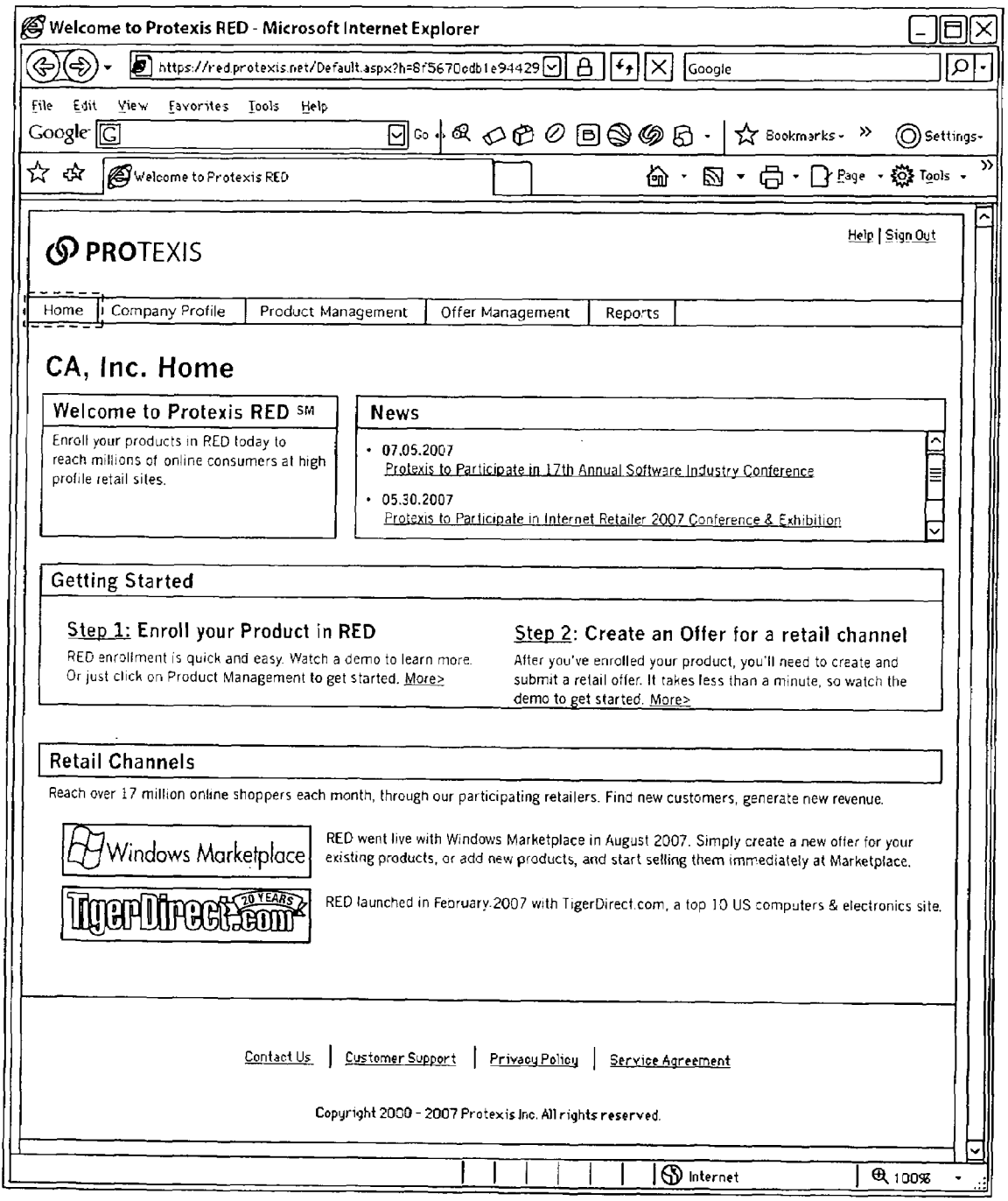
FIGS. 12 through 25 are exemplary screens for product offer creation whereby a publisher selects retailers for selling a product, and product management according to exemplary embodiments of the present invention.
Figure 12A:
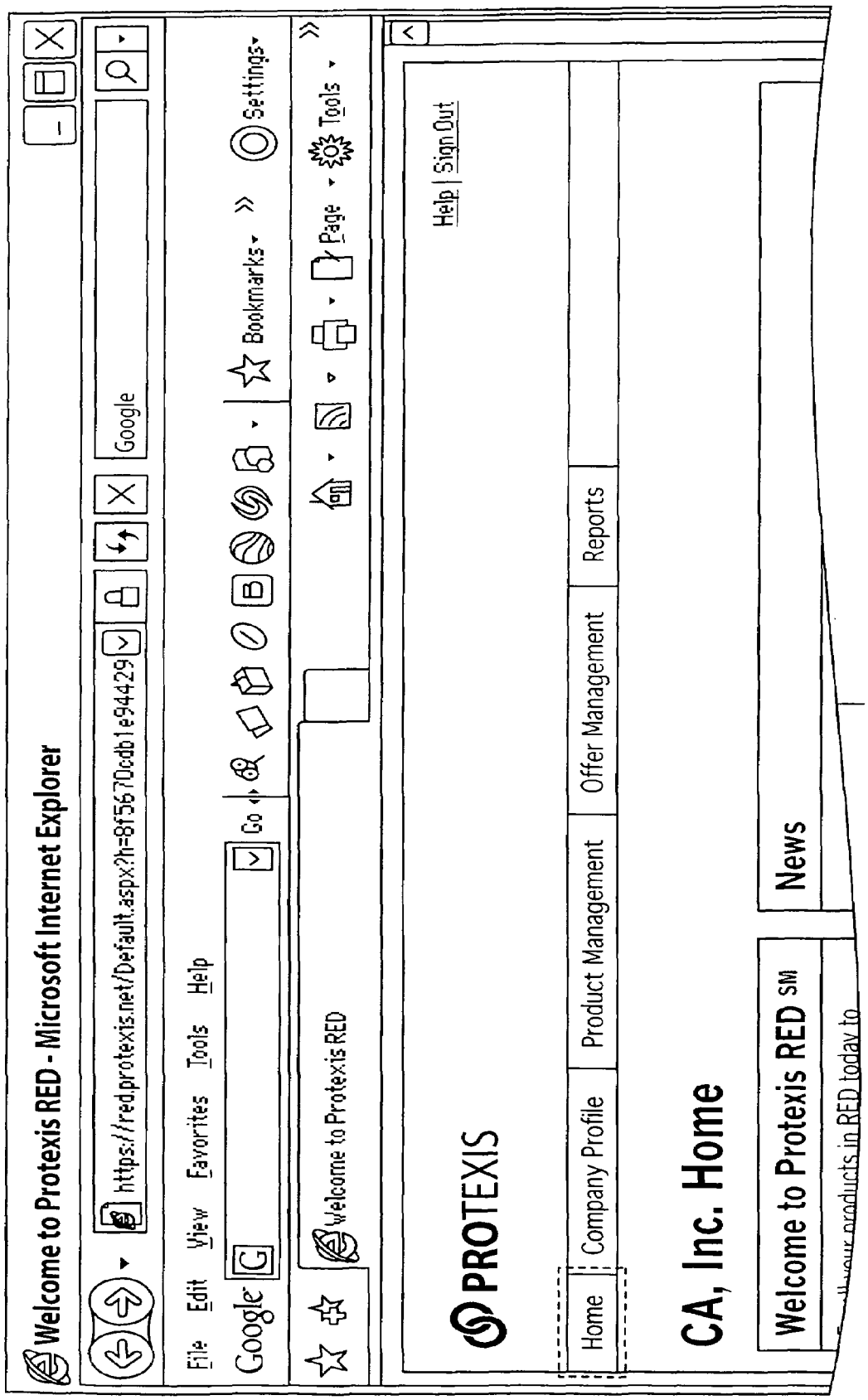
Figure 12C:
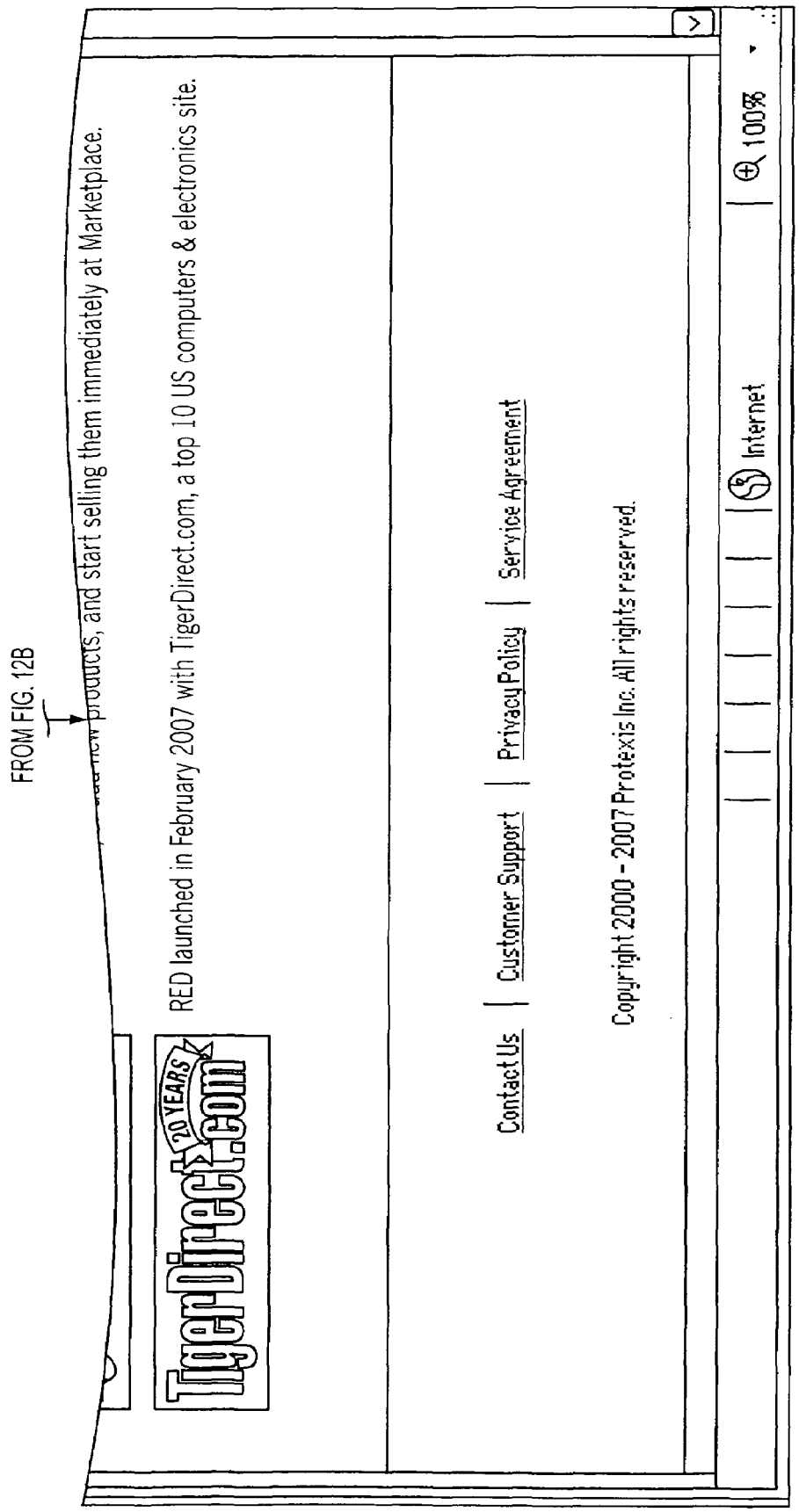

FIGS. 12 through 25 are exemplary screens for product offer creation whereby a publisher selects retailers for selling a product, and for product management according to exemplary embodiments of the present invention. FIG. 12 is an exemplary publisher 12 home page.

Figure 13:
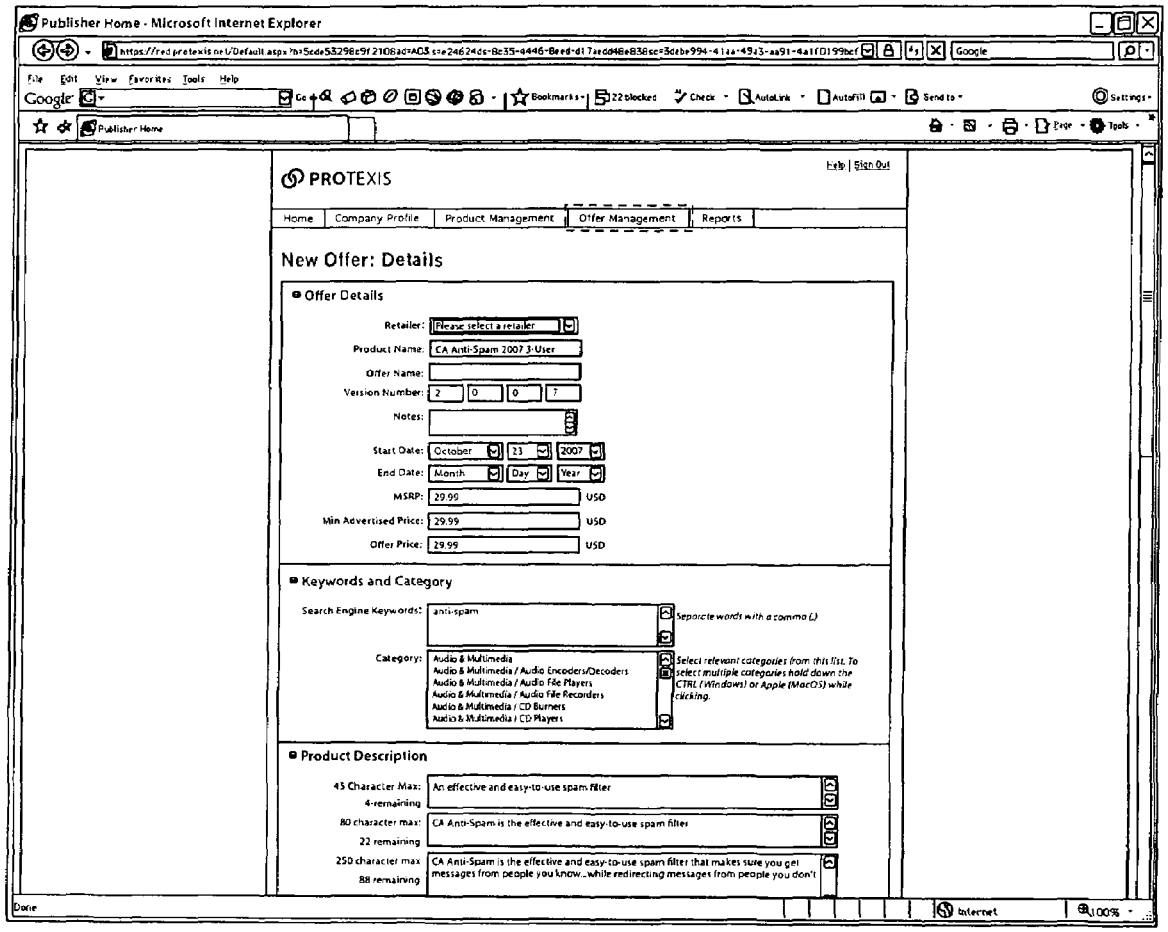
Figure 13A:
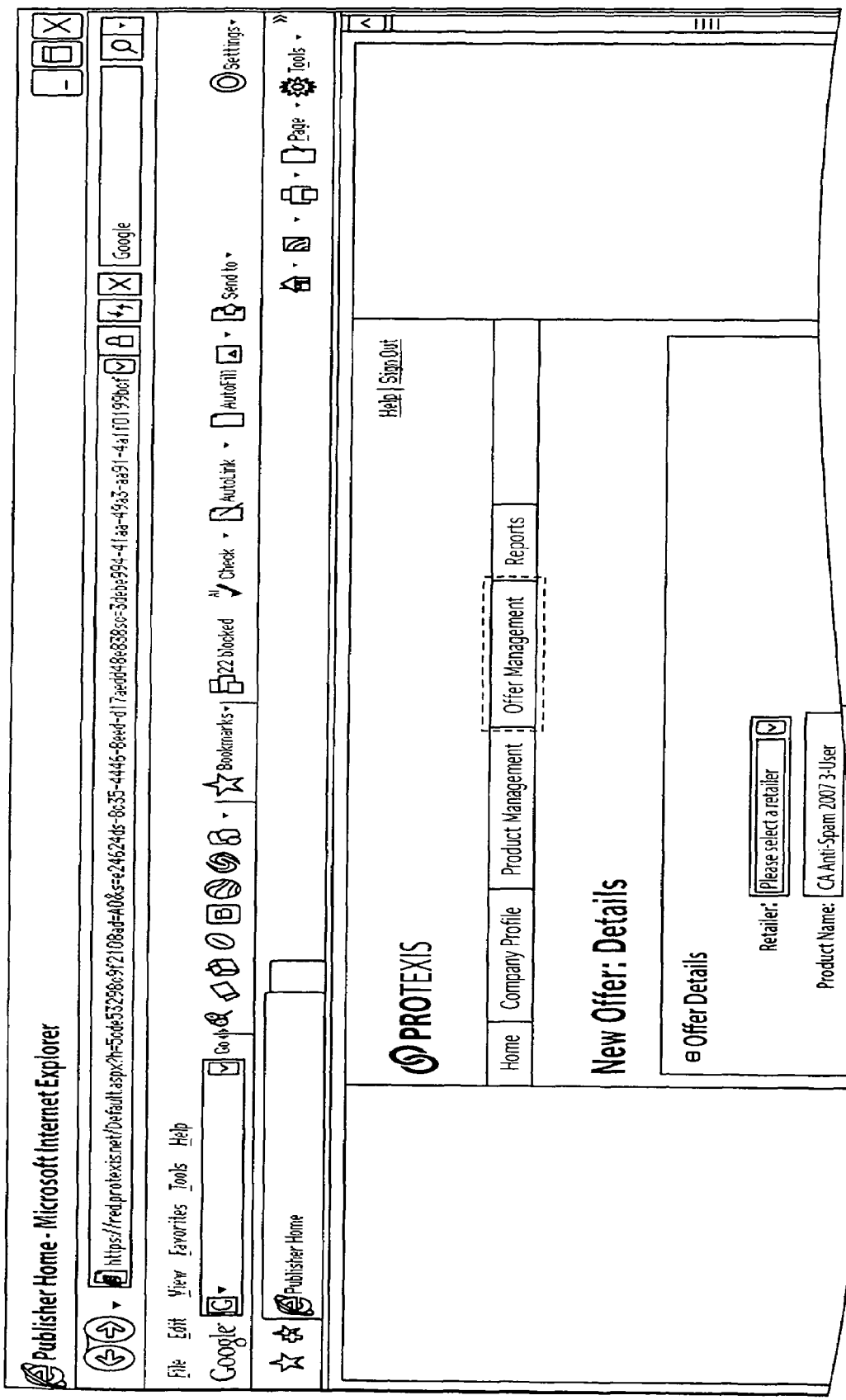
Figure 13B:
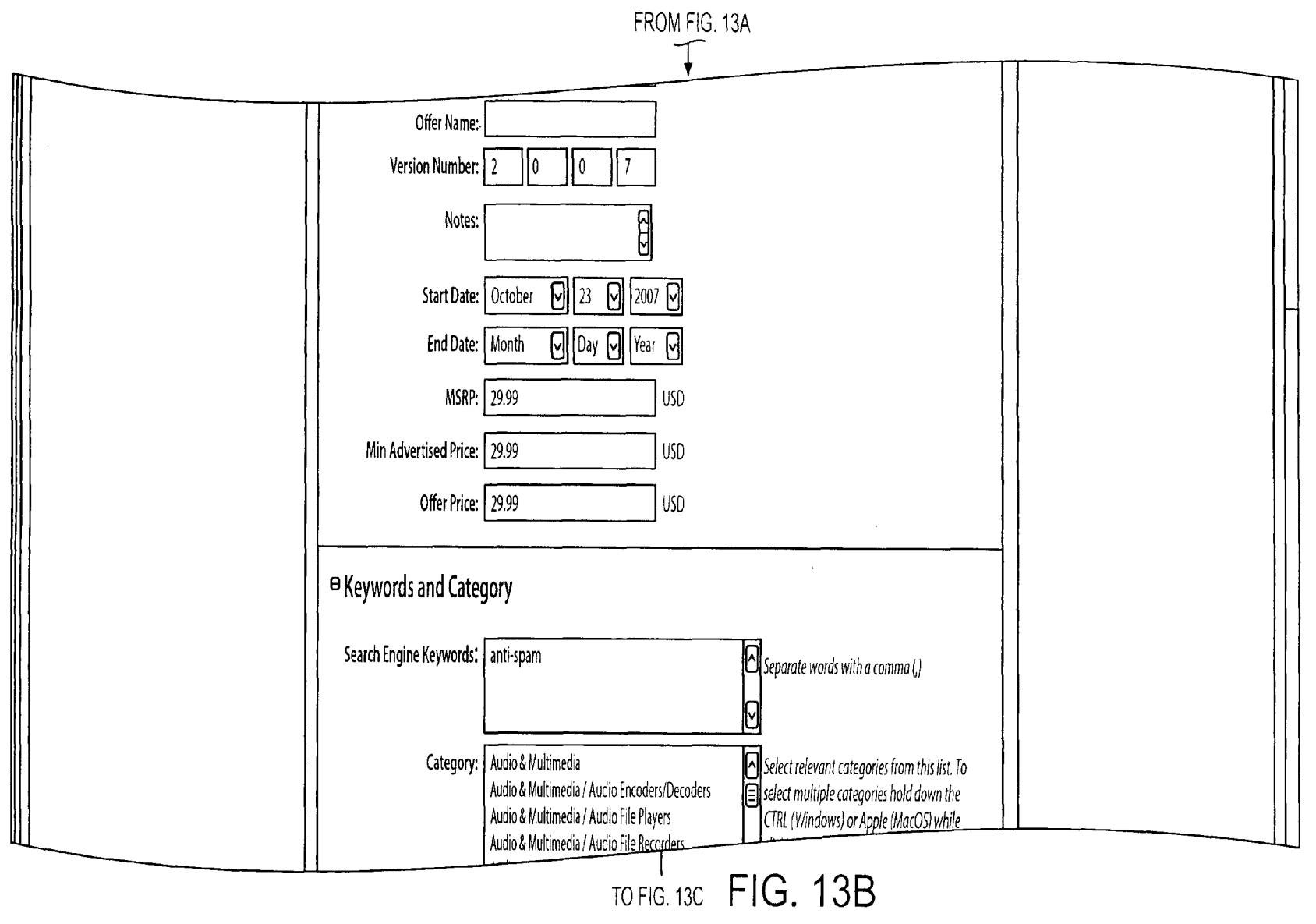
Figure 13C:
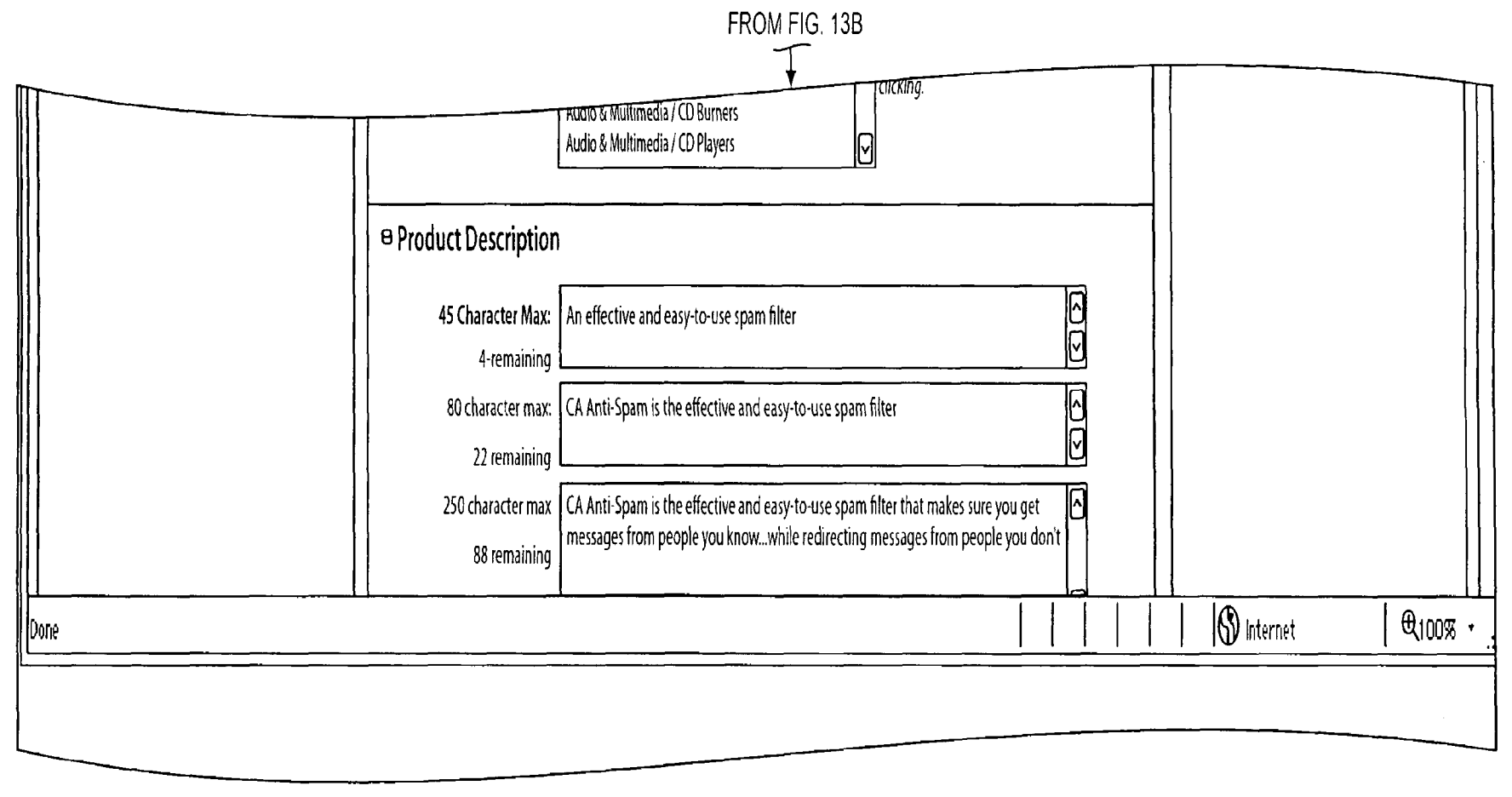

FIG. 13 is an exemplary web page employed when a publisher 12 creates an offer for a retailer 14. This page demonstrates how the platform 18 begins the product-offer creation process by requiring the publisher to select a retailer first. Offers can be customized for each retailer 14. In most cases, retailers require some offer data that is different from, or not included in, a default product record. An example of this is a product screen shot. Retailers 14 often have slightly different needs for images (e.g., some retailers want a JPEG file with specific size limitations, while others want multiple sizes of the same image). Another example is product category selection. One retailer may have a category called "Photo Managers", and another may have a category called "Photo and Image Editing/Storage". Rather than put the burden on the retailer 14 to figure out how to map a stock product category (e.g. "Photo Management") into their own categories, the platform requests this selection from publisher 12 via a screen or web page.

As the platform 18 enrolls a new retailer, the platform 18 gathers that retailer's unique data requirements and sets up the offer form that publishers use to prepare an offer for that retailer. Data from the default product record is used to the extent that it is applicable, and then the publisher 12 need only focus on gathering or entering the unique data elements that a retailer requires. An advantage of the present invention is its processing to ensure that the offer data and all the merchandising information that is fed to retailers is as meaningful. and easy to consume, as possible for each retailer.

Figure 14:
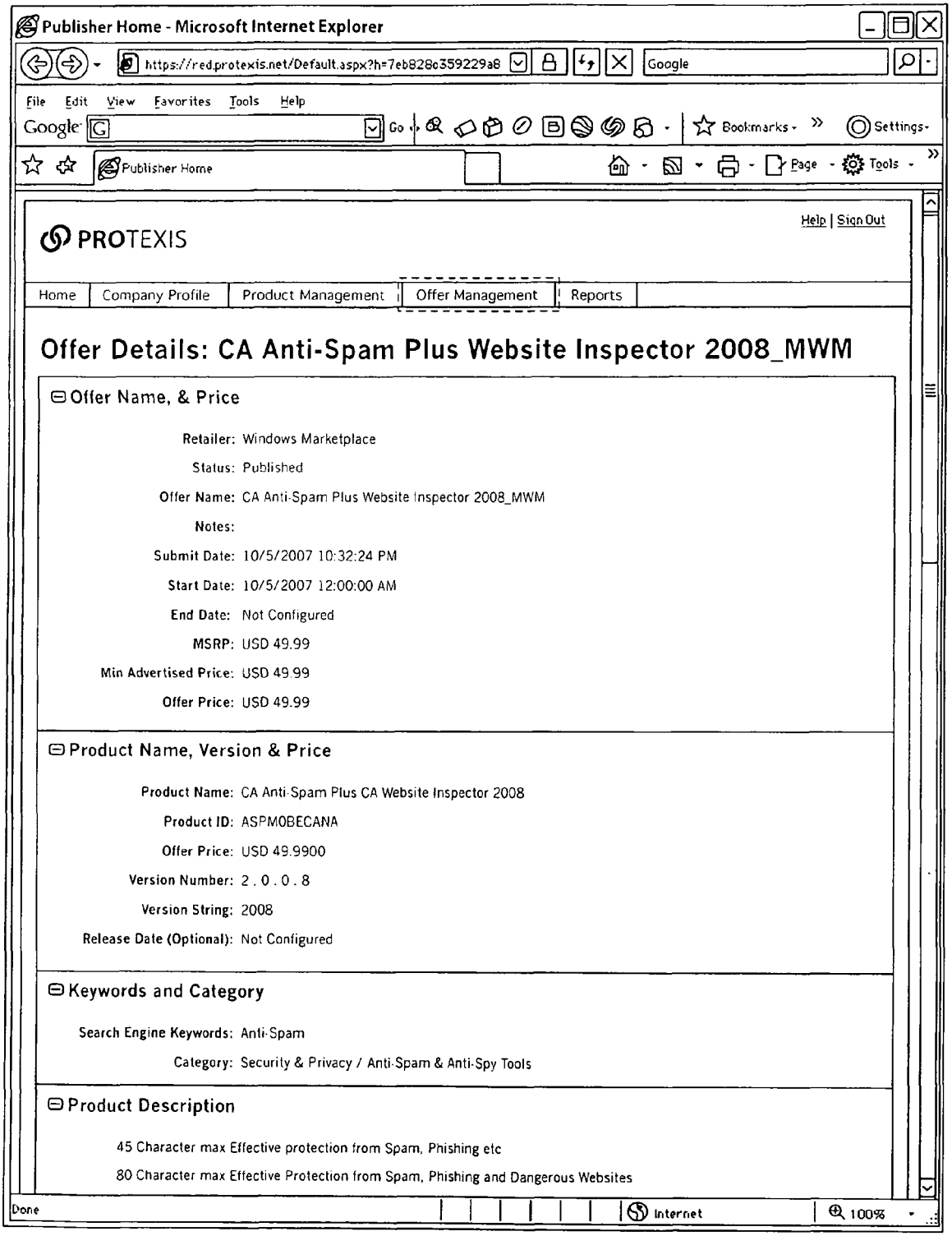
Figure 14A:
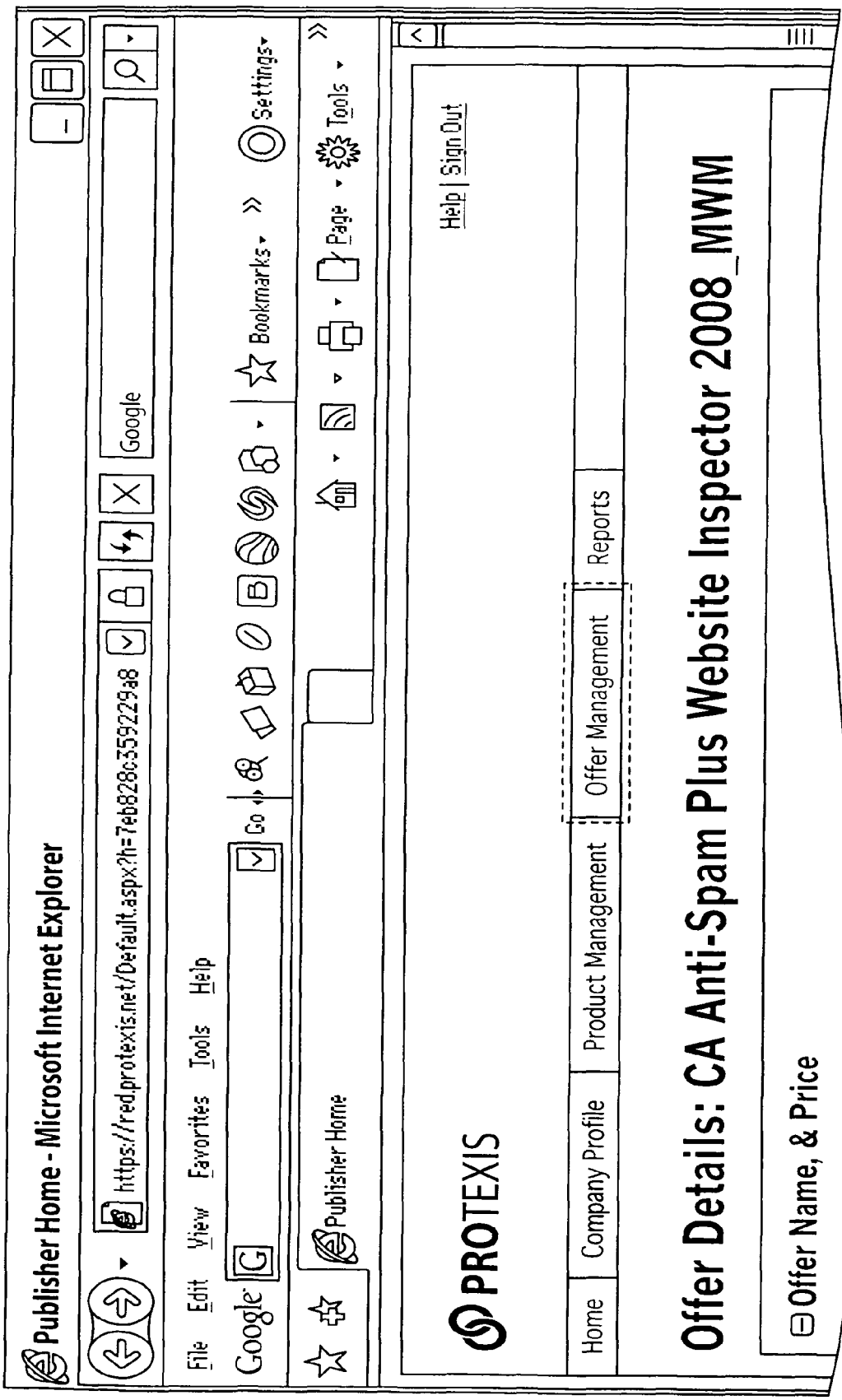
Figure 15:
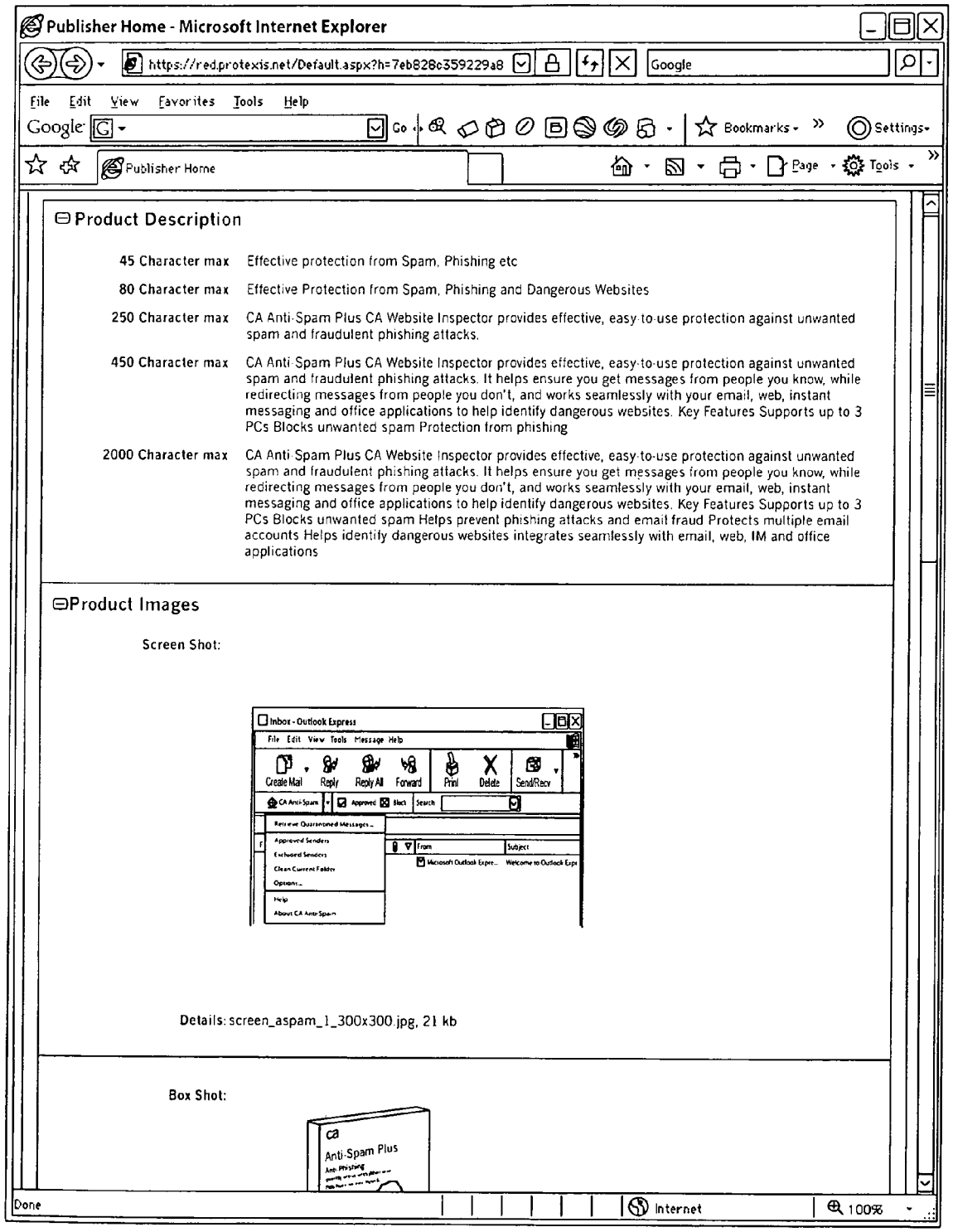
Figure 15A:
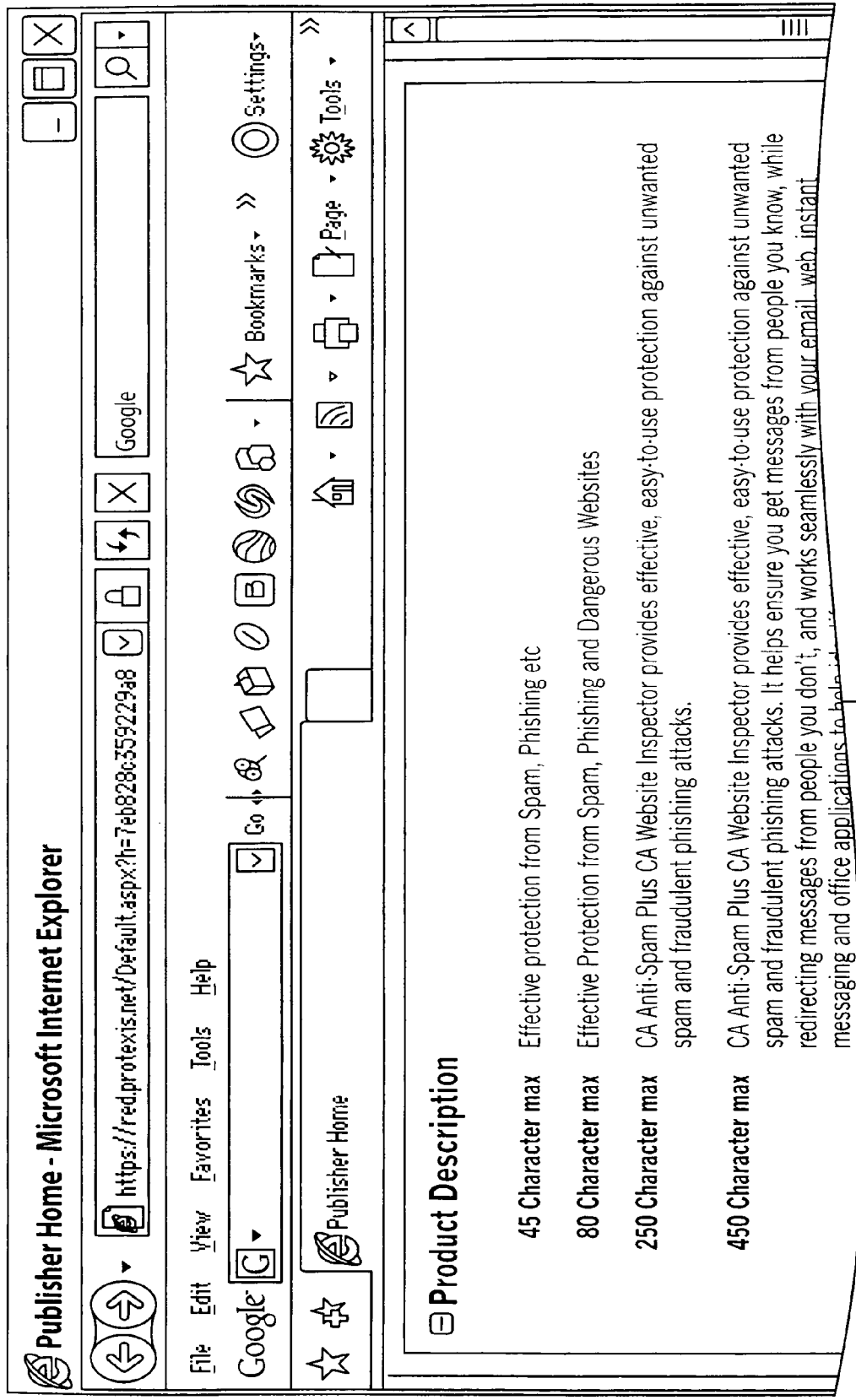
Figure 15C:
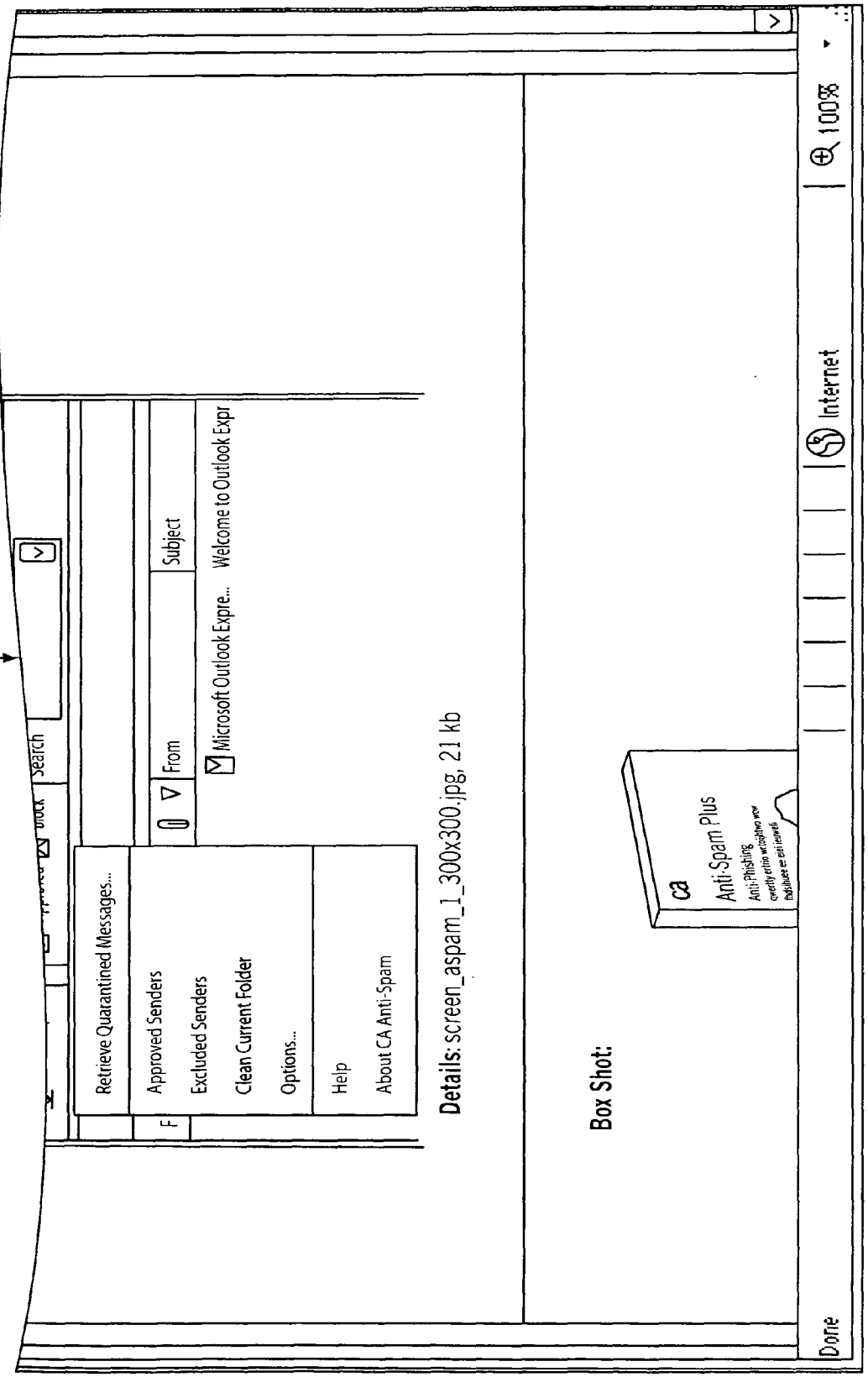
Figure 16:
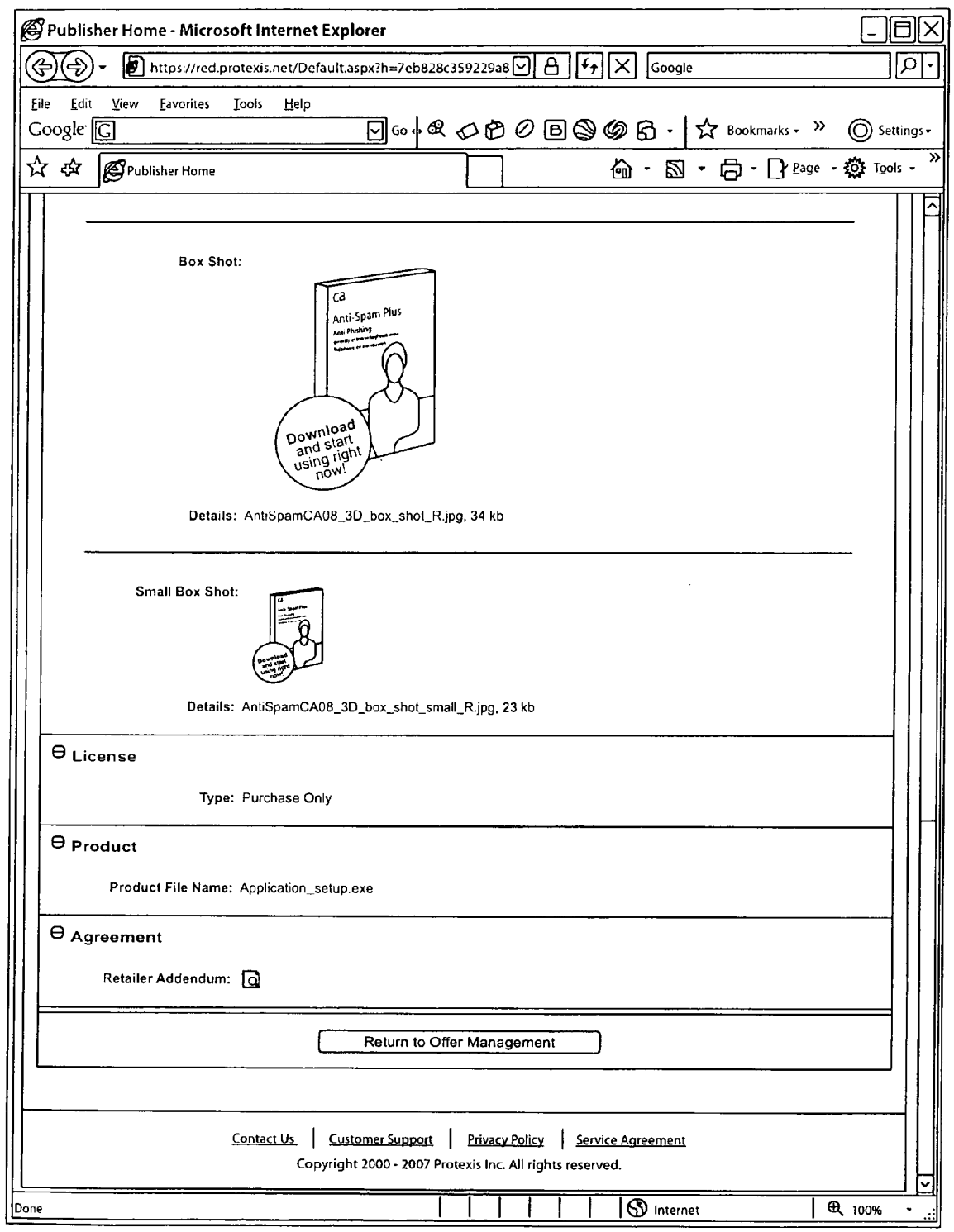
Figure 16C:
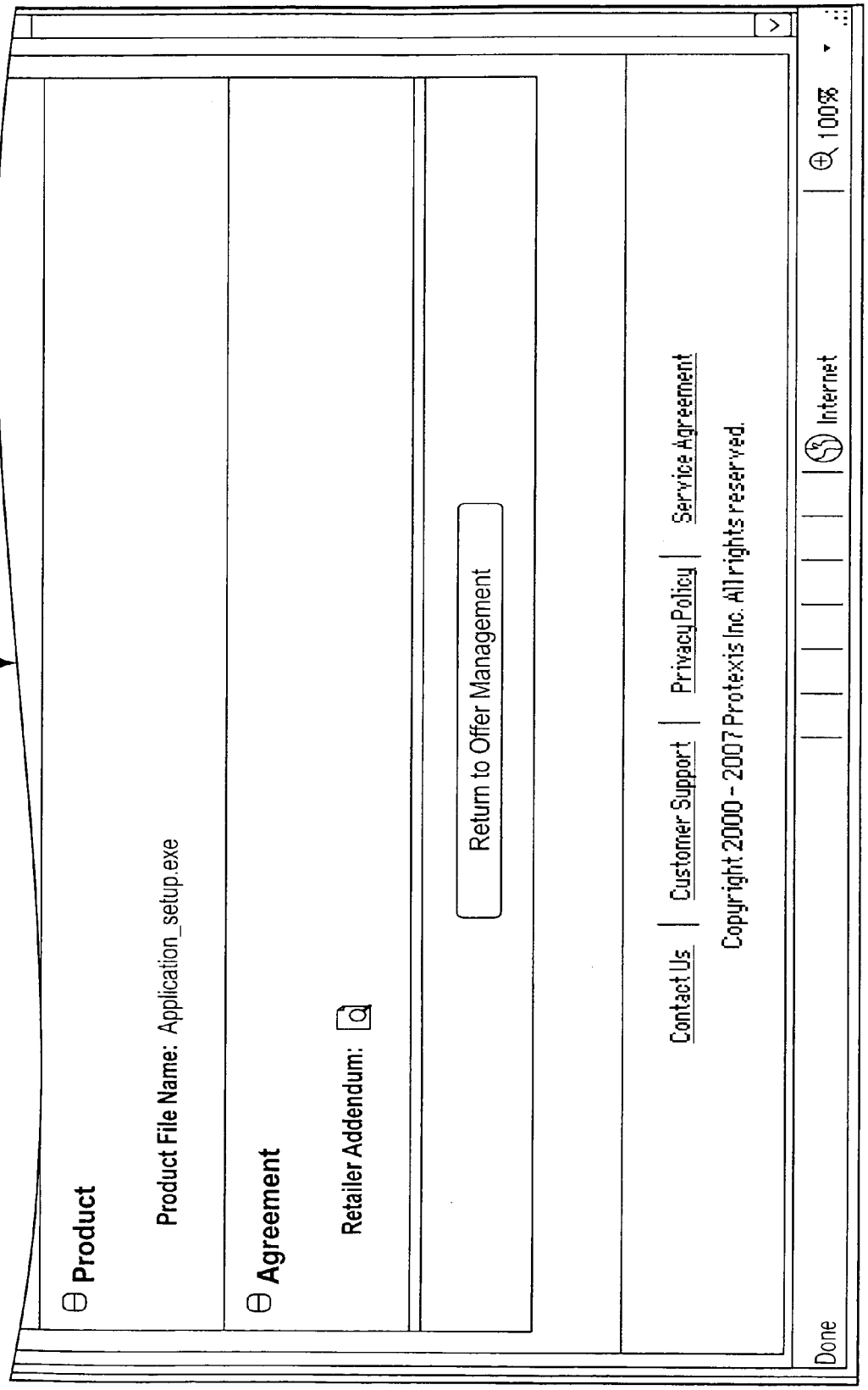
Figure 17:
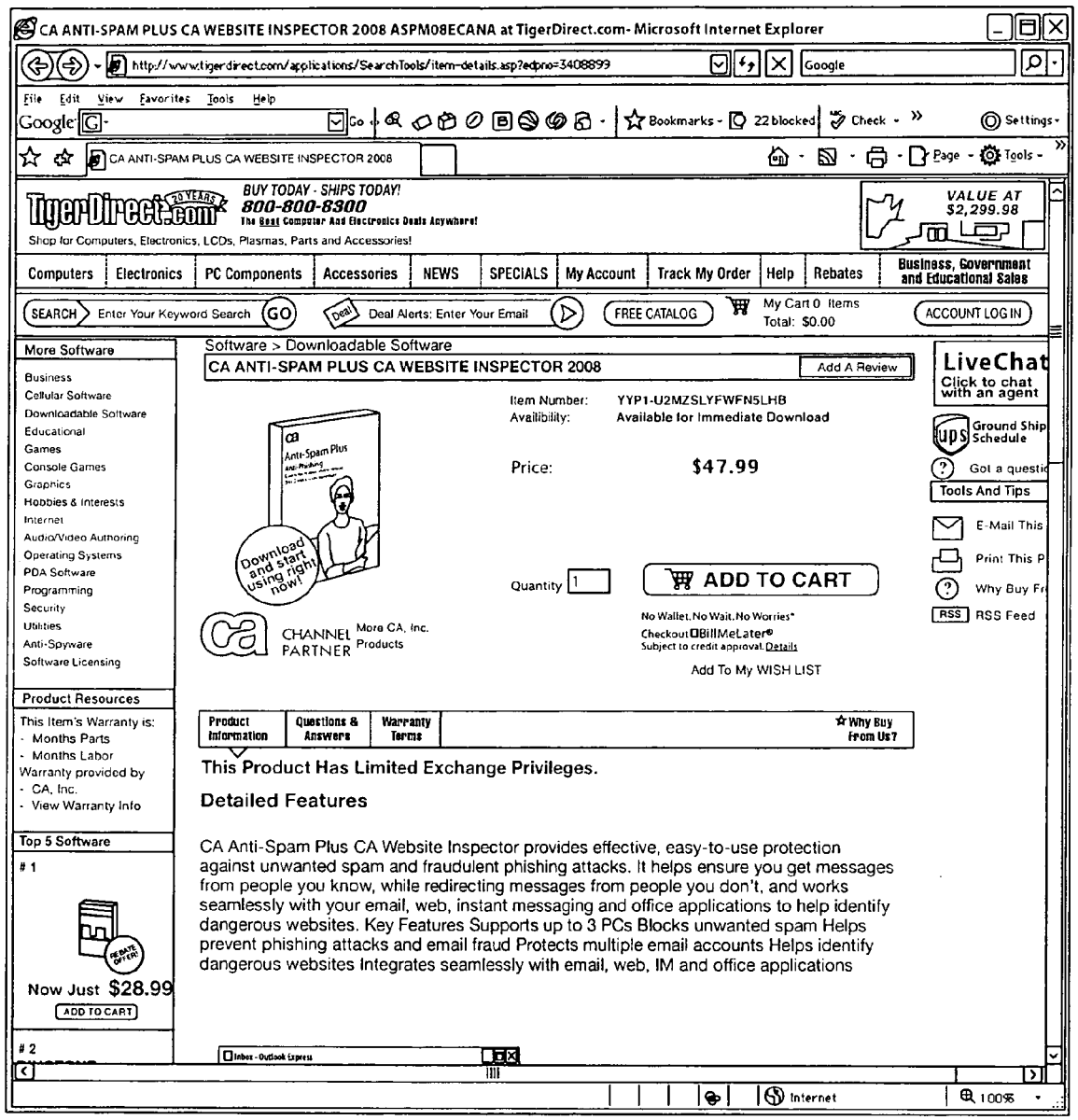
Figure 17A:
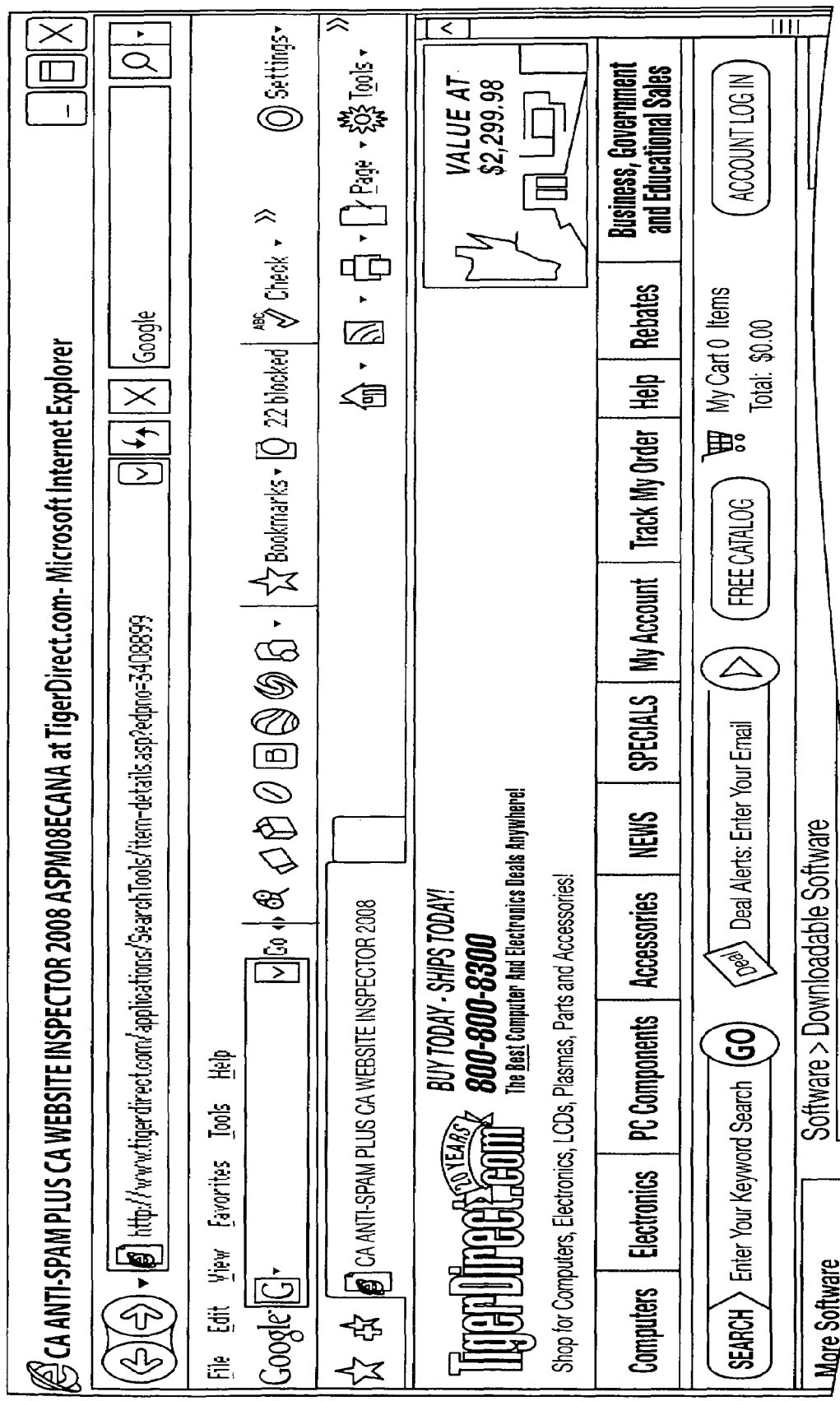
Figure 18A:
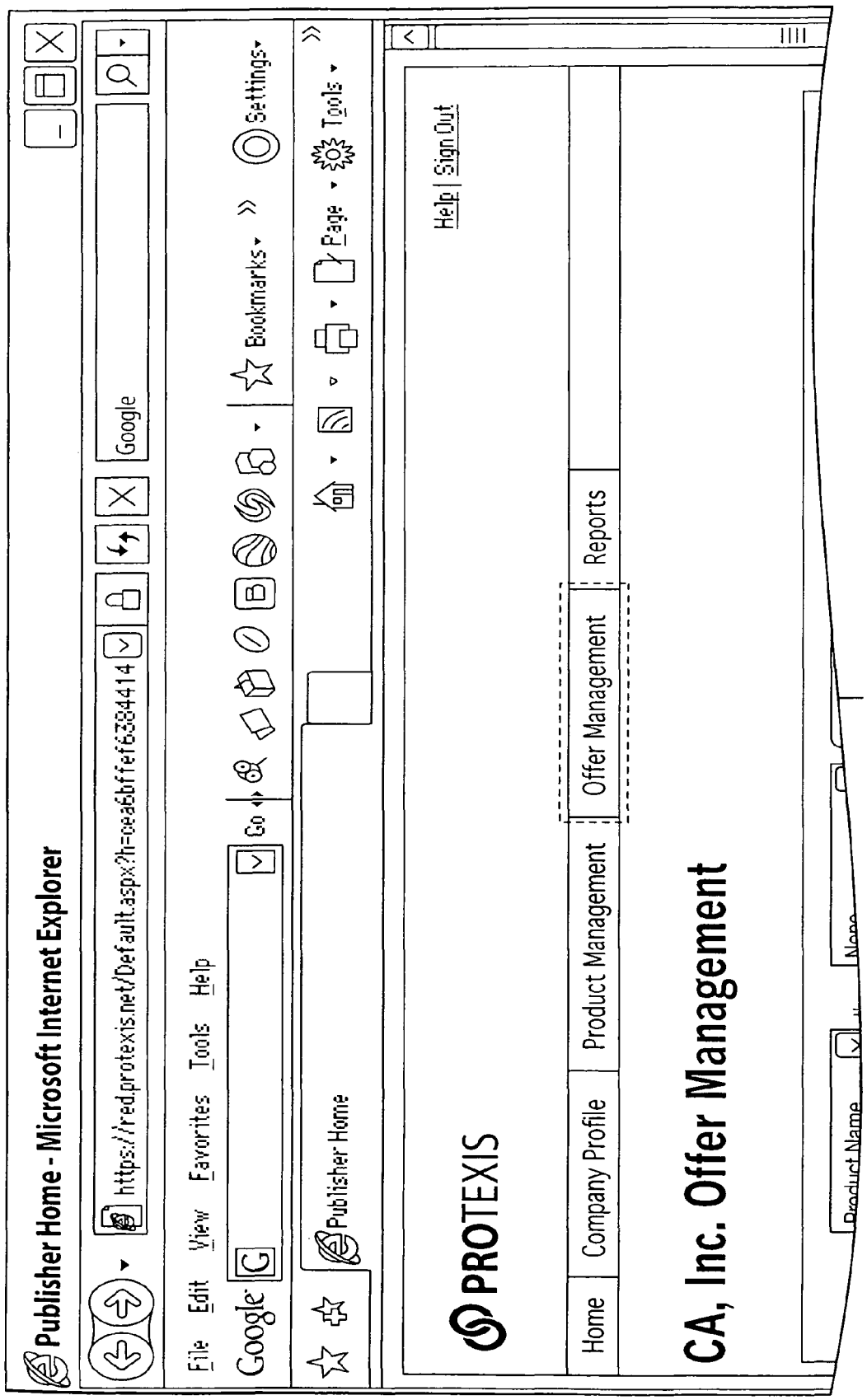
Figure 19A:
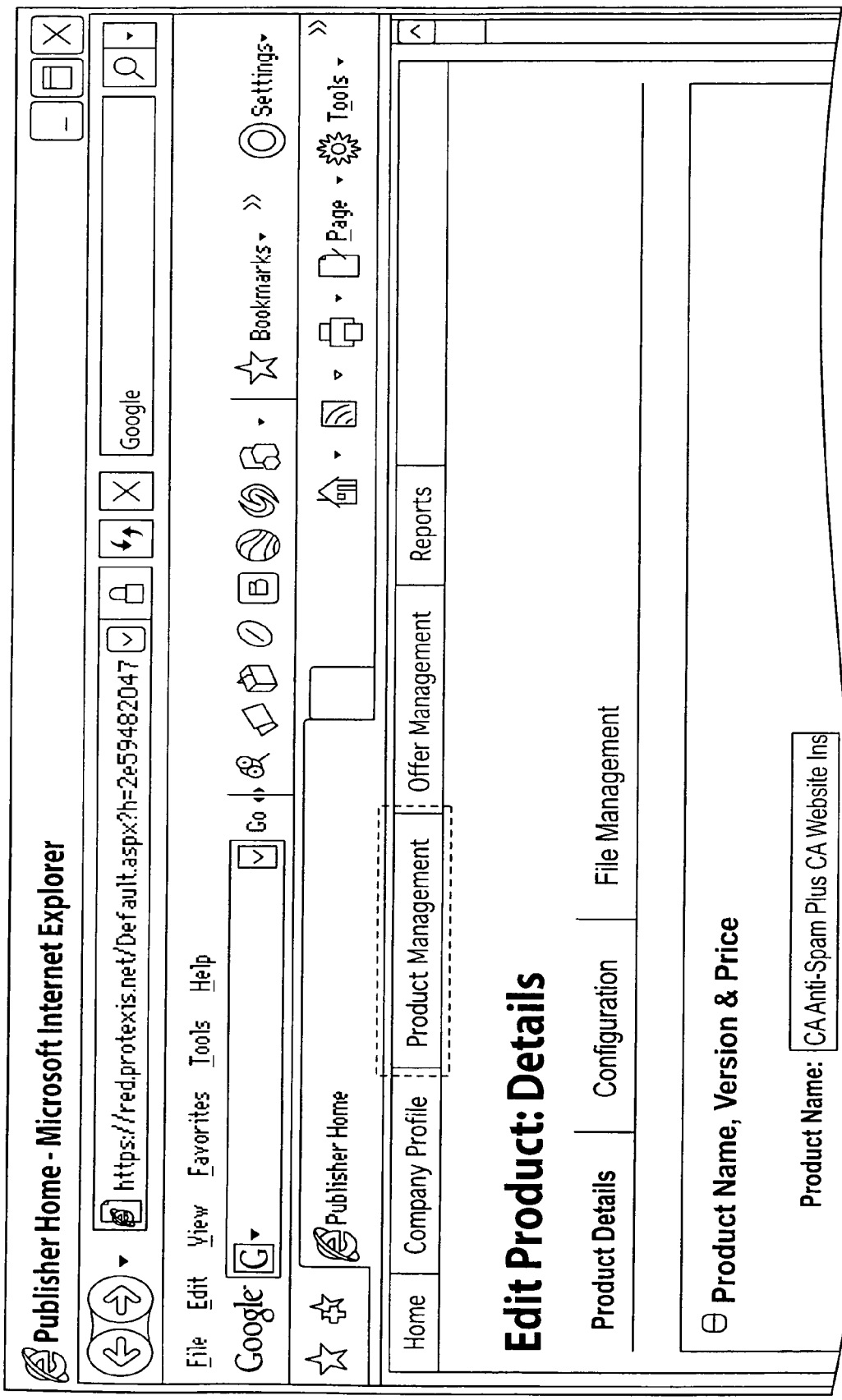
Figure 20A:
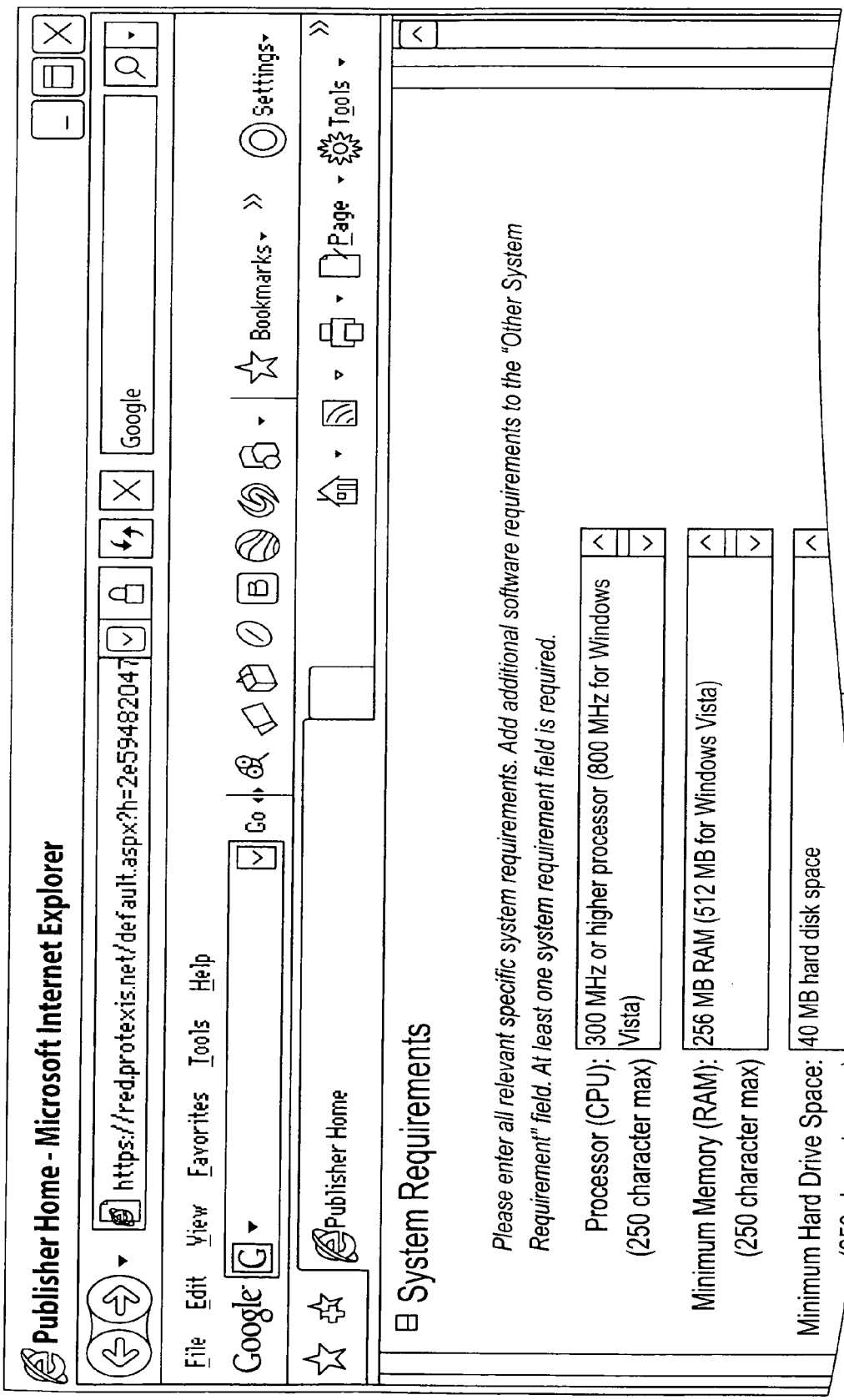
Figure 20C:
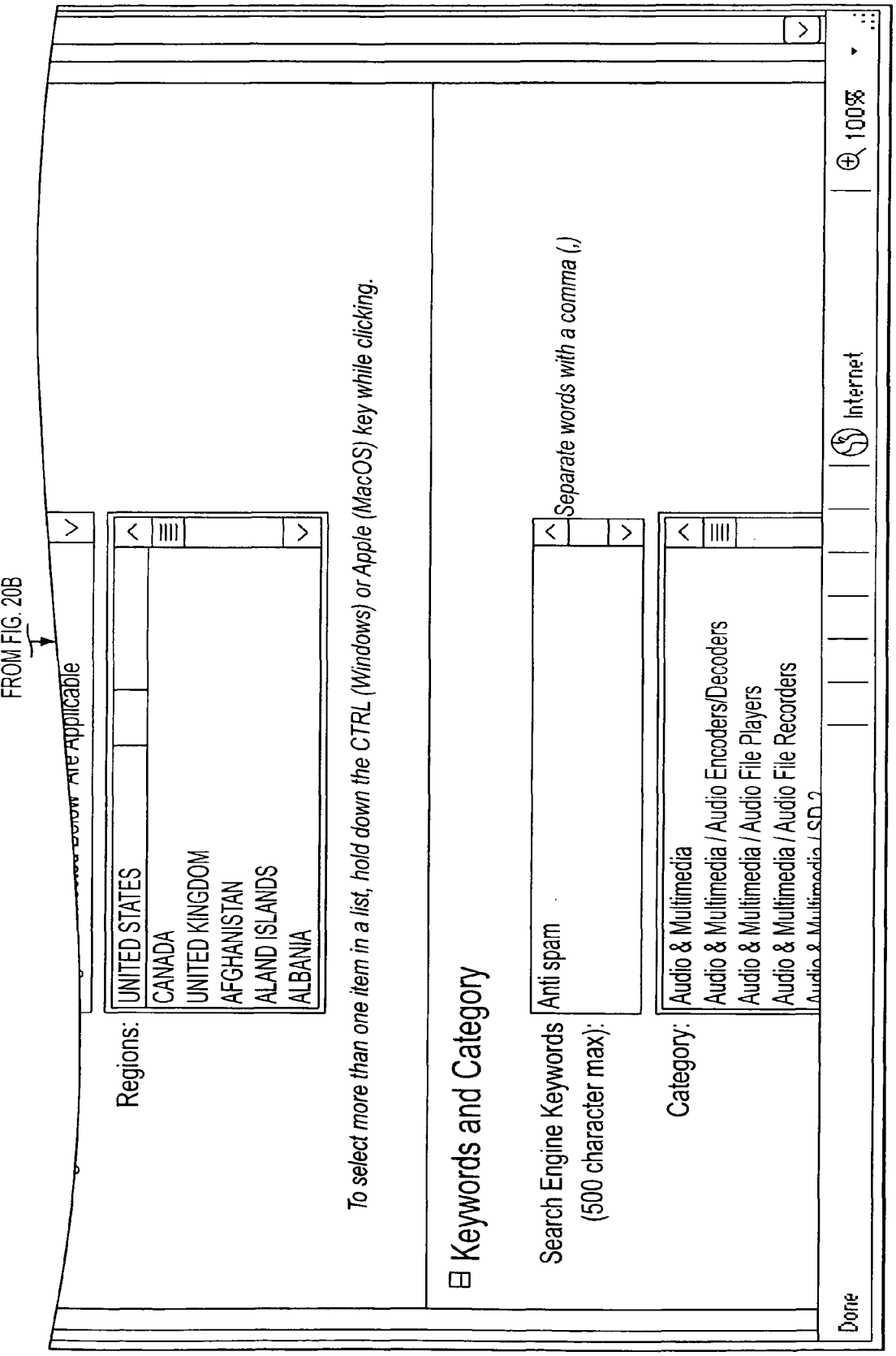
Figure 21:
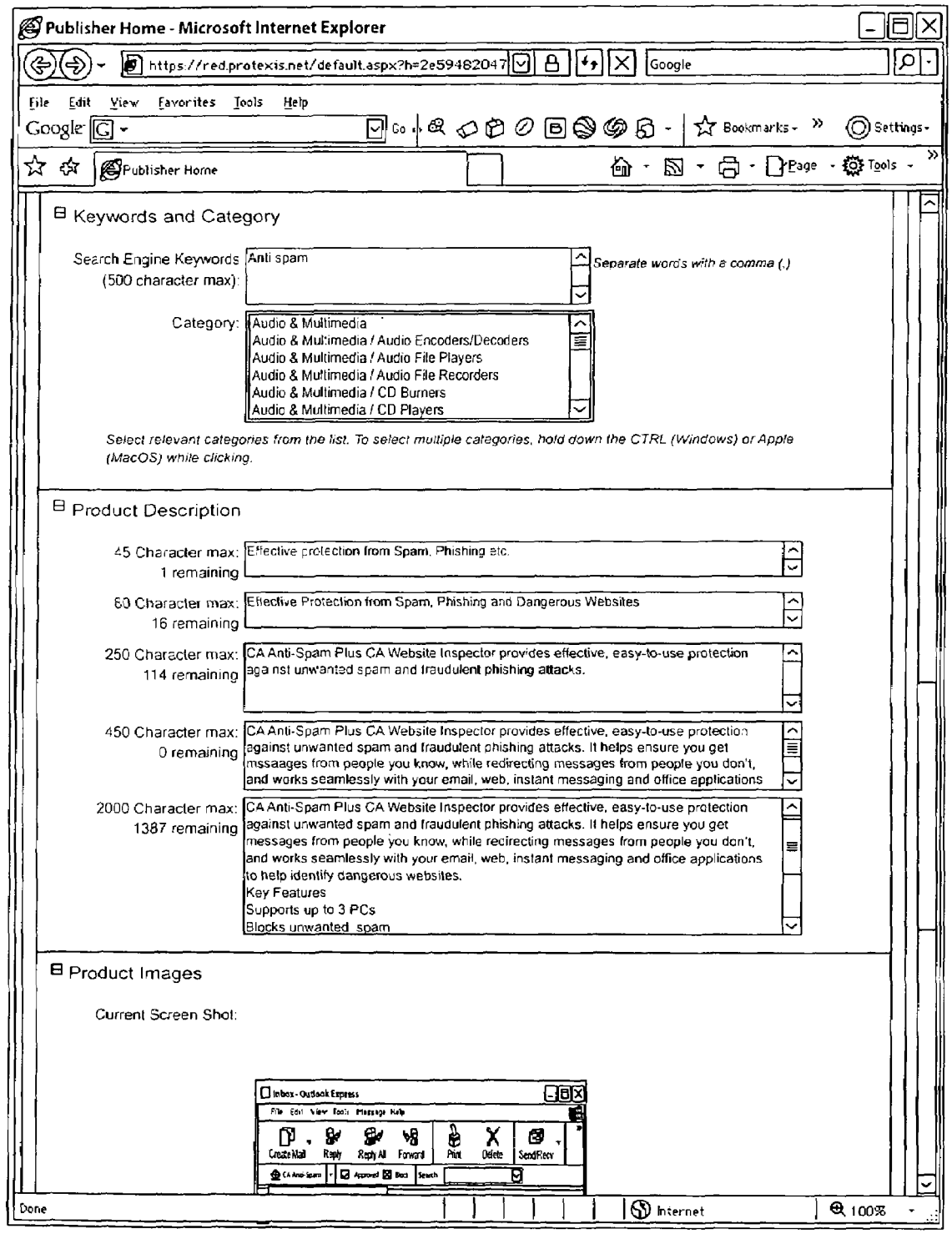
Figure 21A:
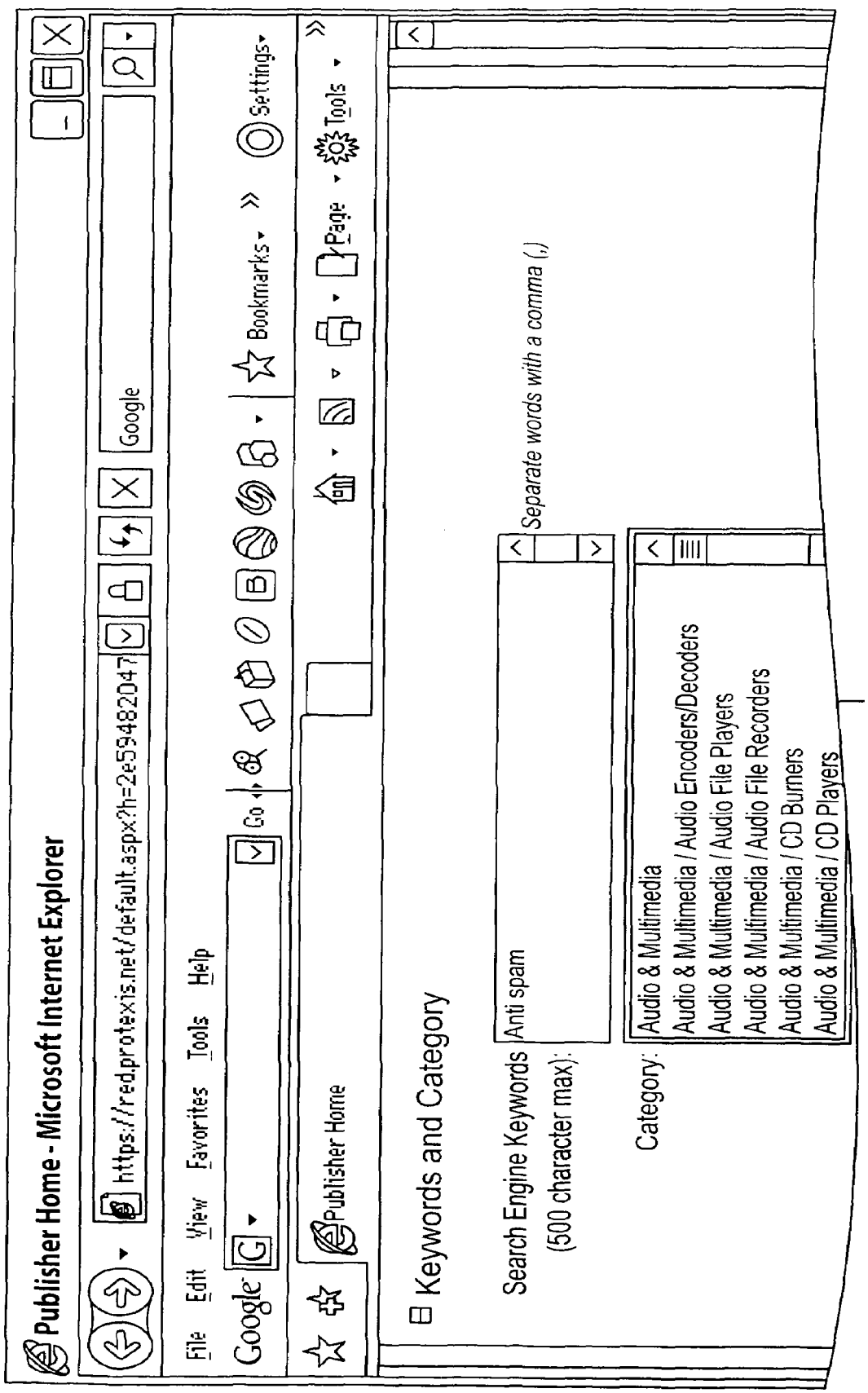
Figure 21C:
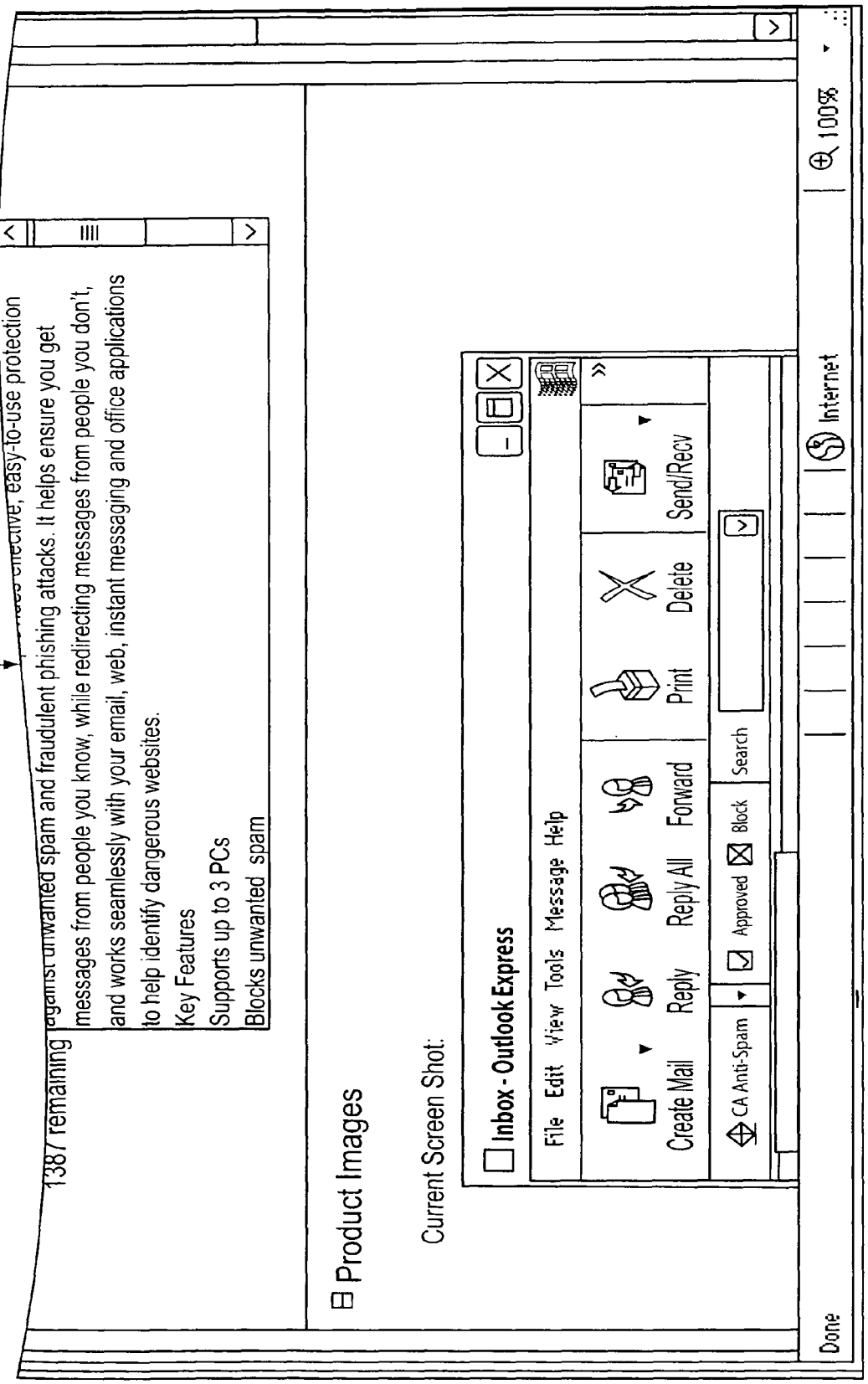
Figure 22:
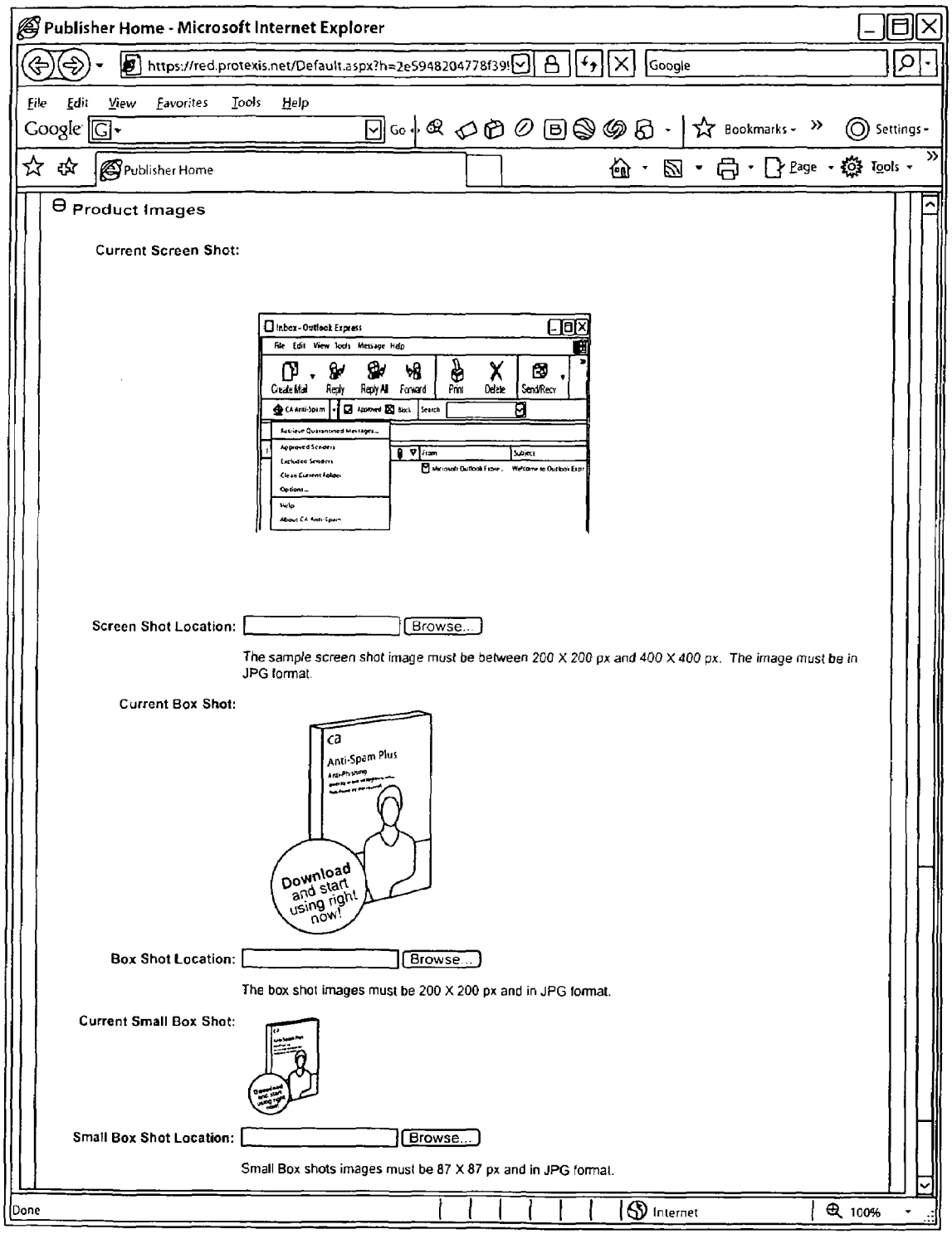
Figure 22A:
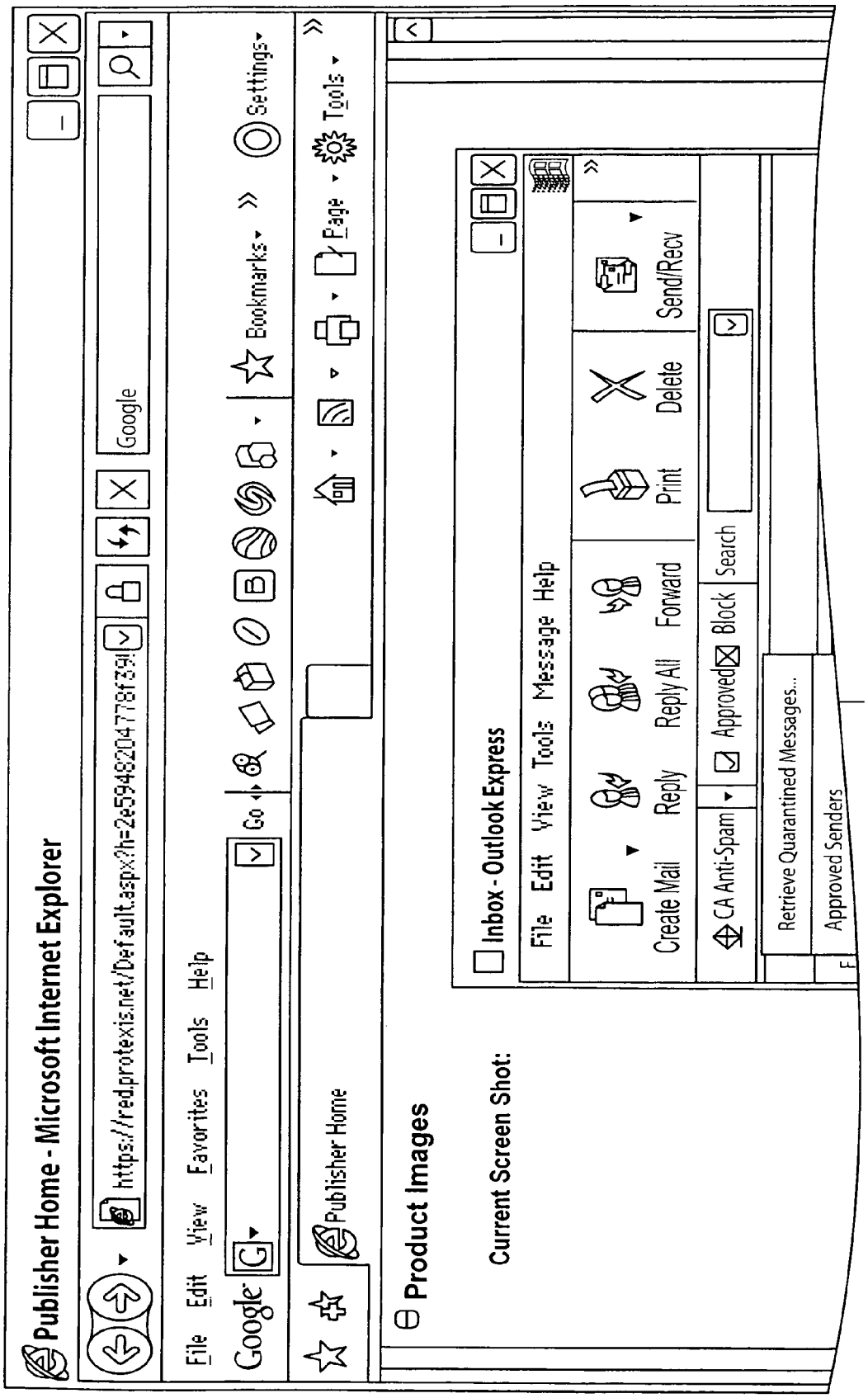
Figure 22B:
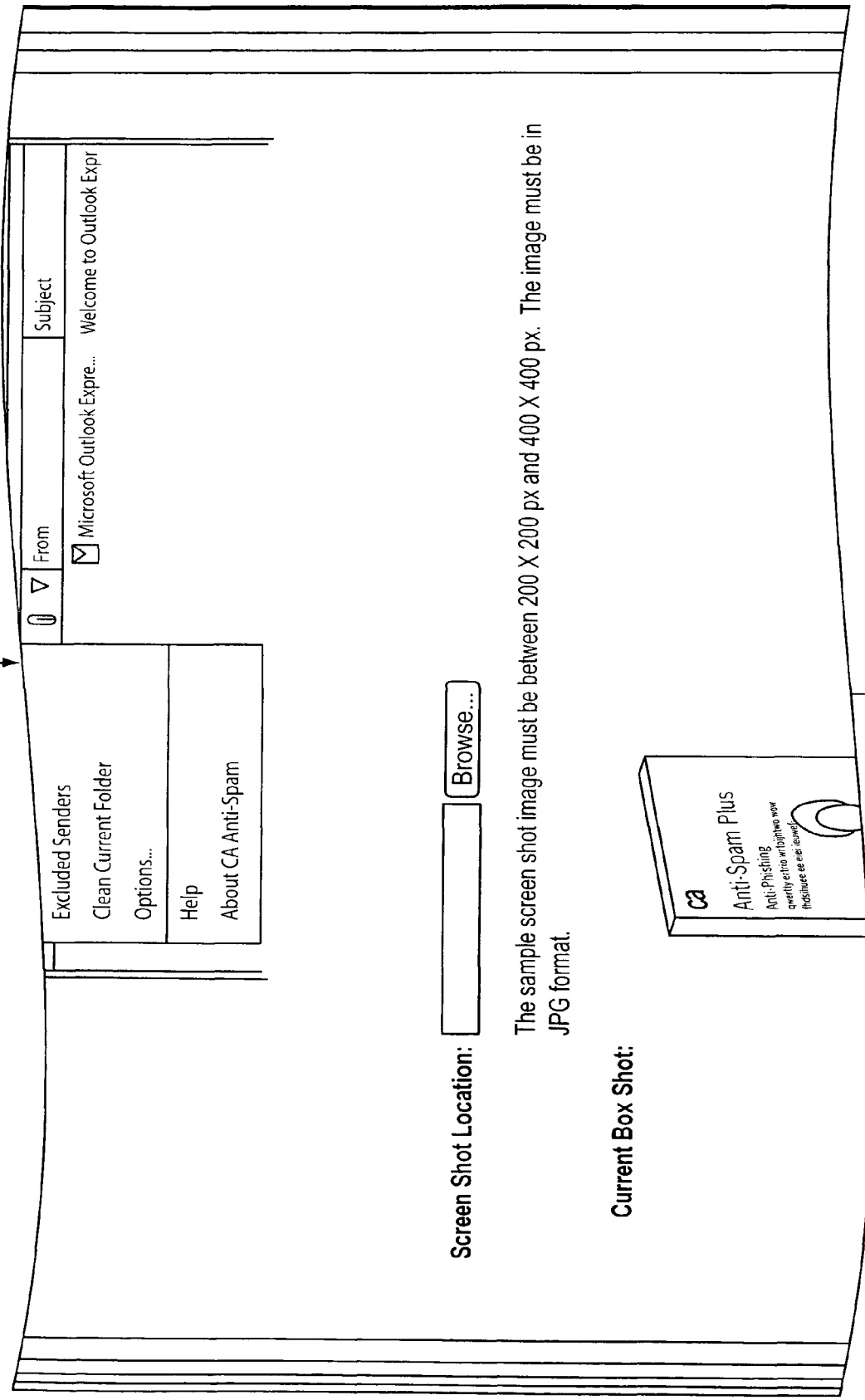
Figure 22C:
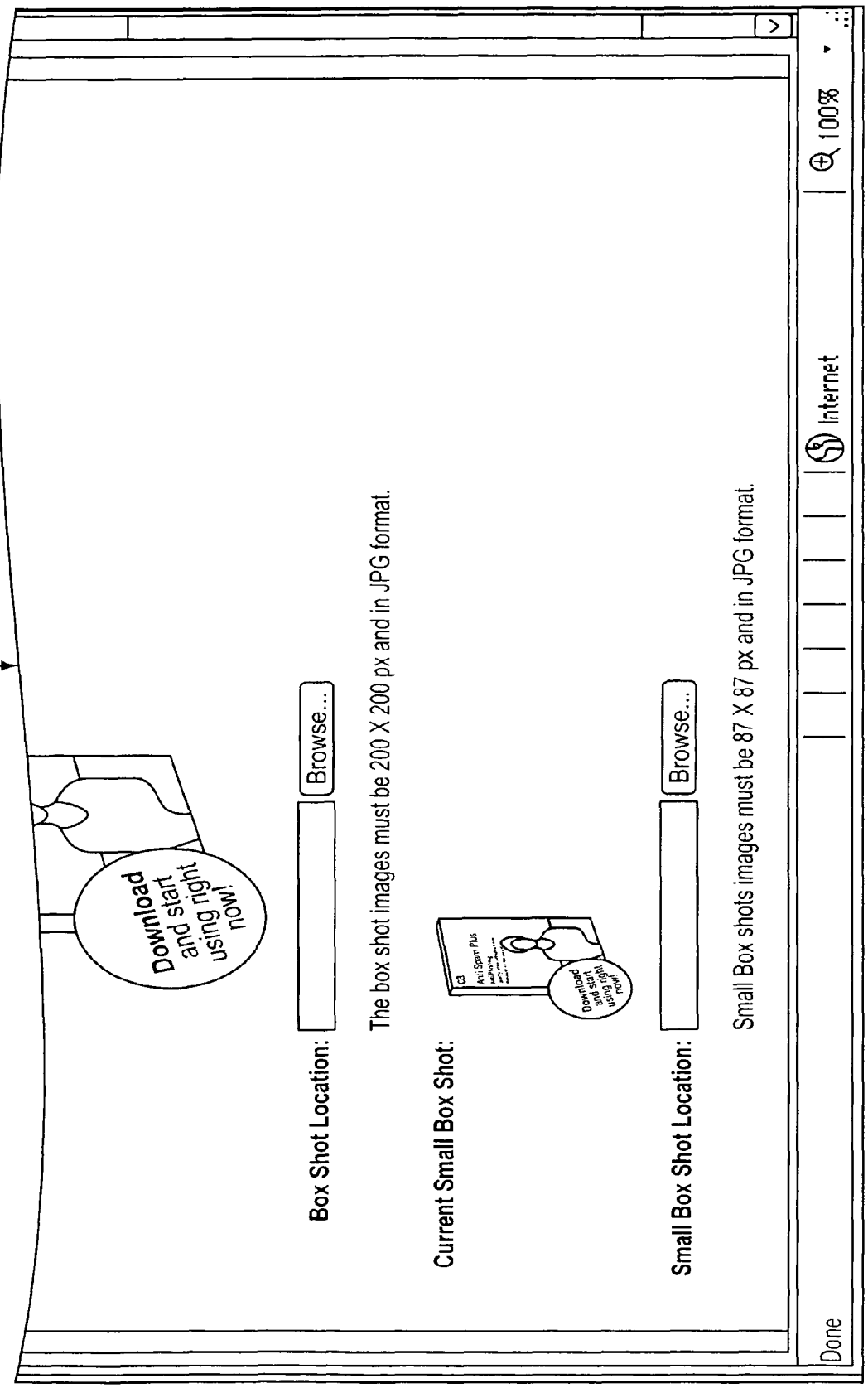
Figure 23:
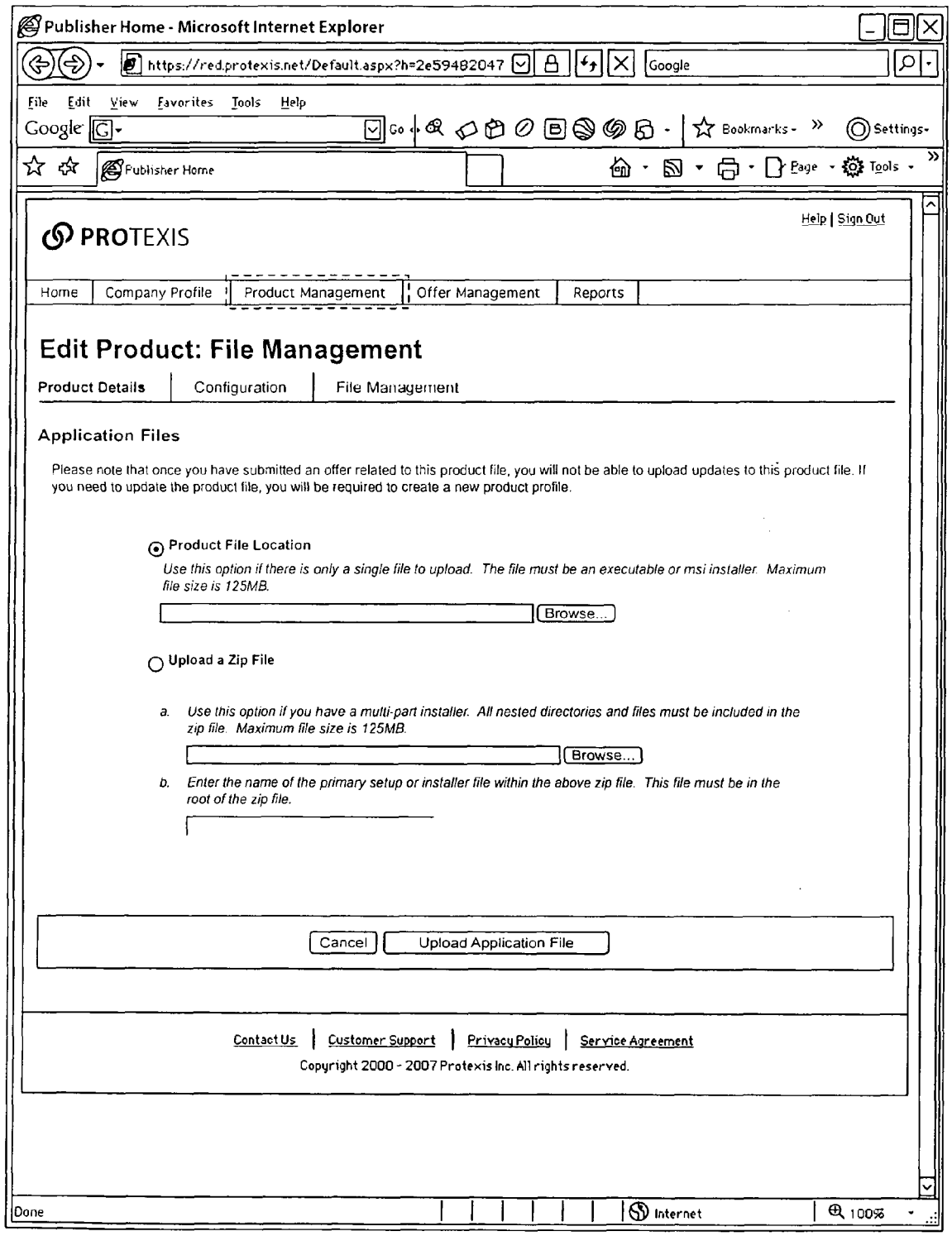
Figure 23A:
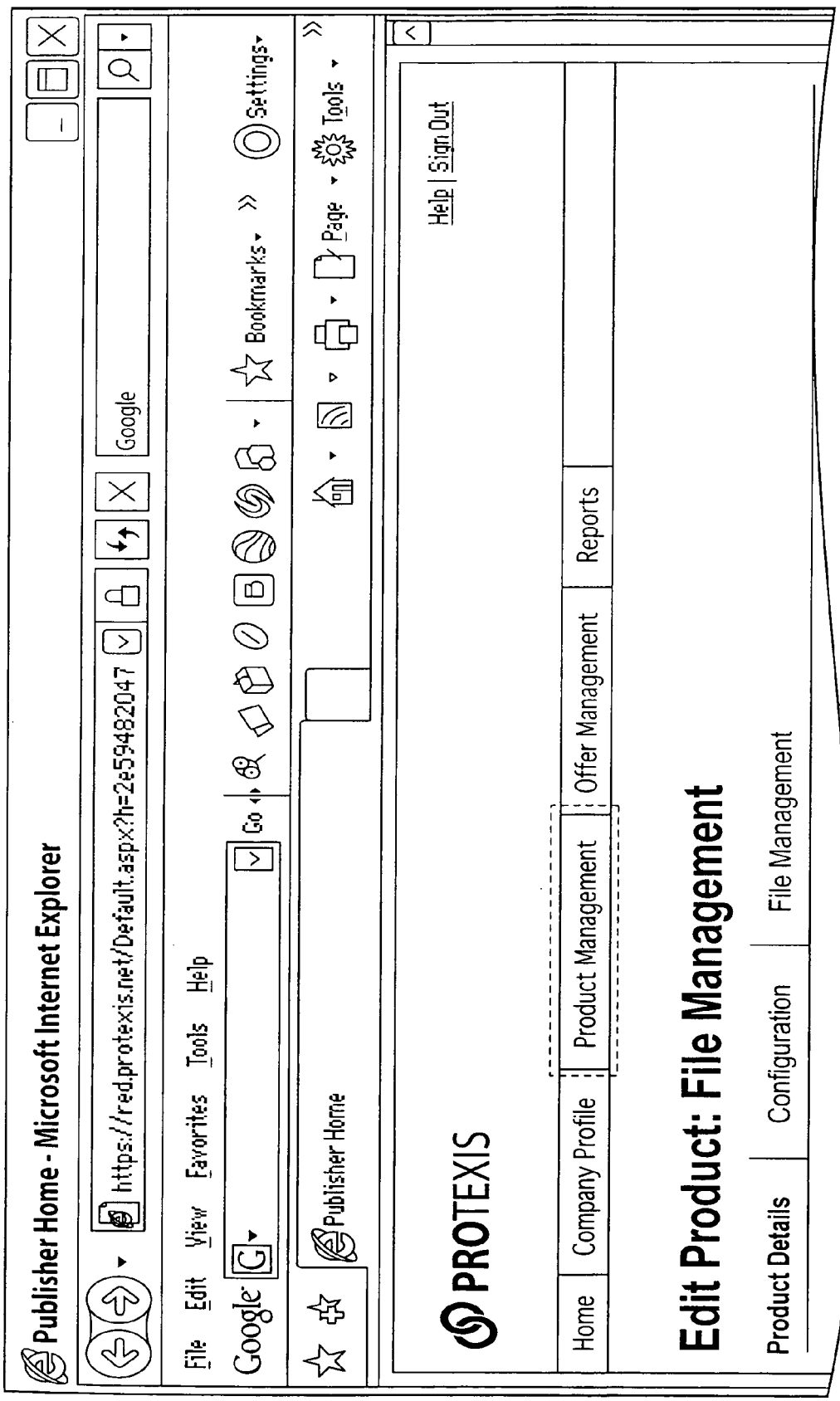
Figure 23C:
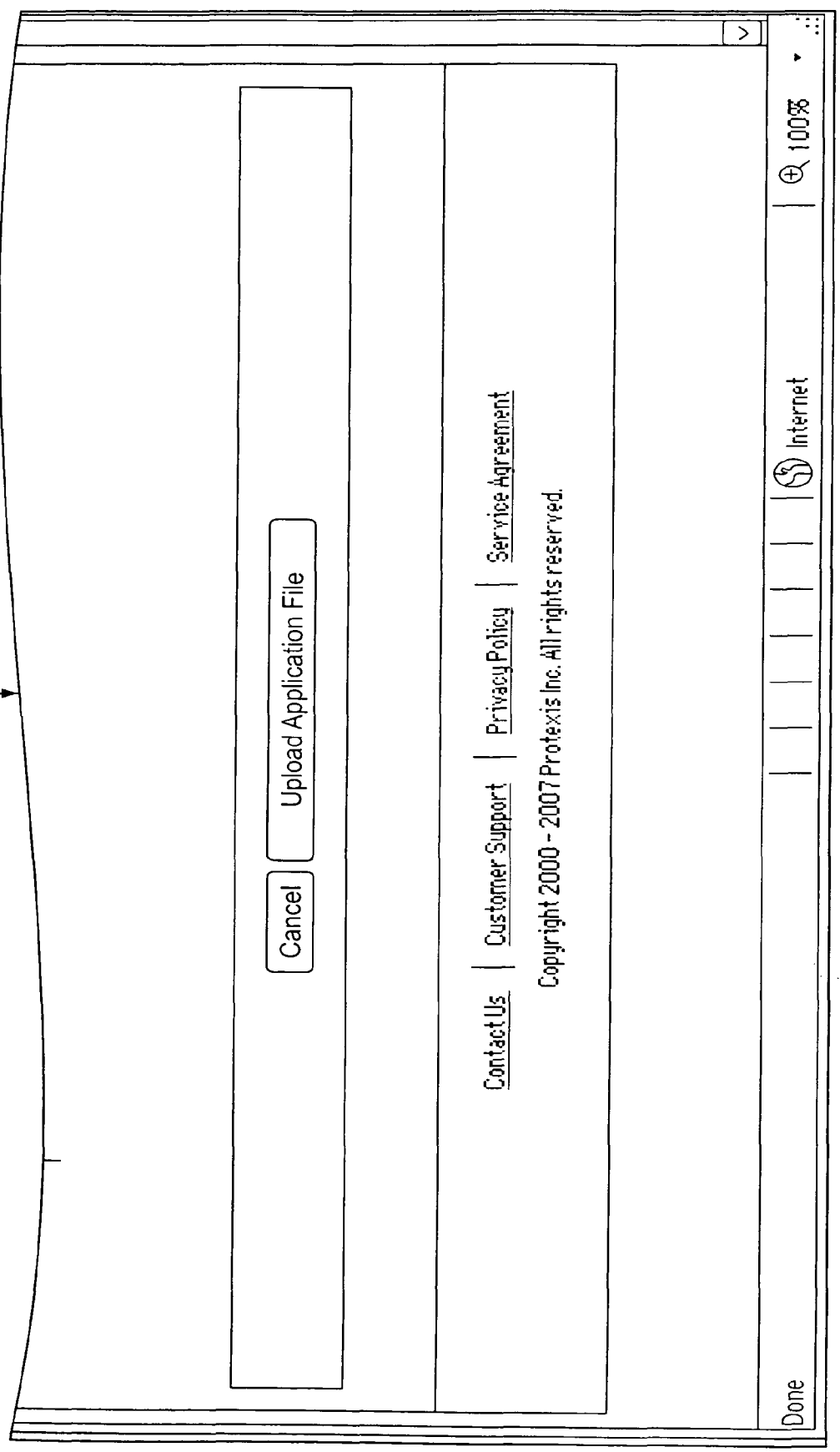
Figure 24:
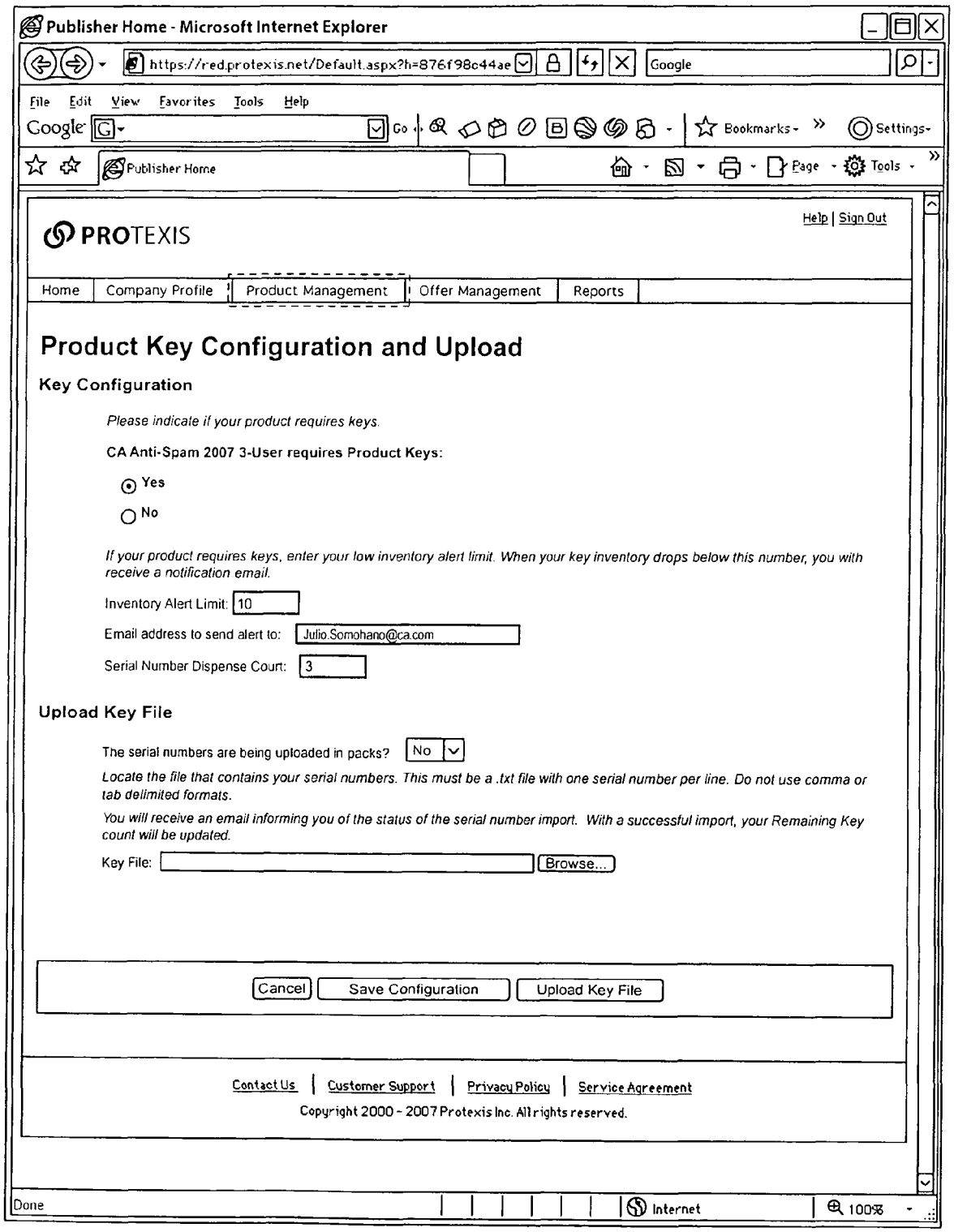
Figure 24A:
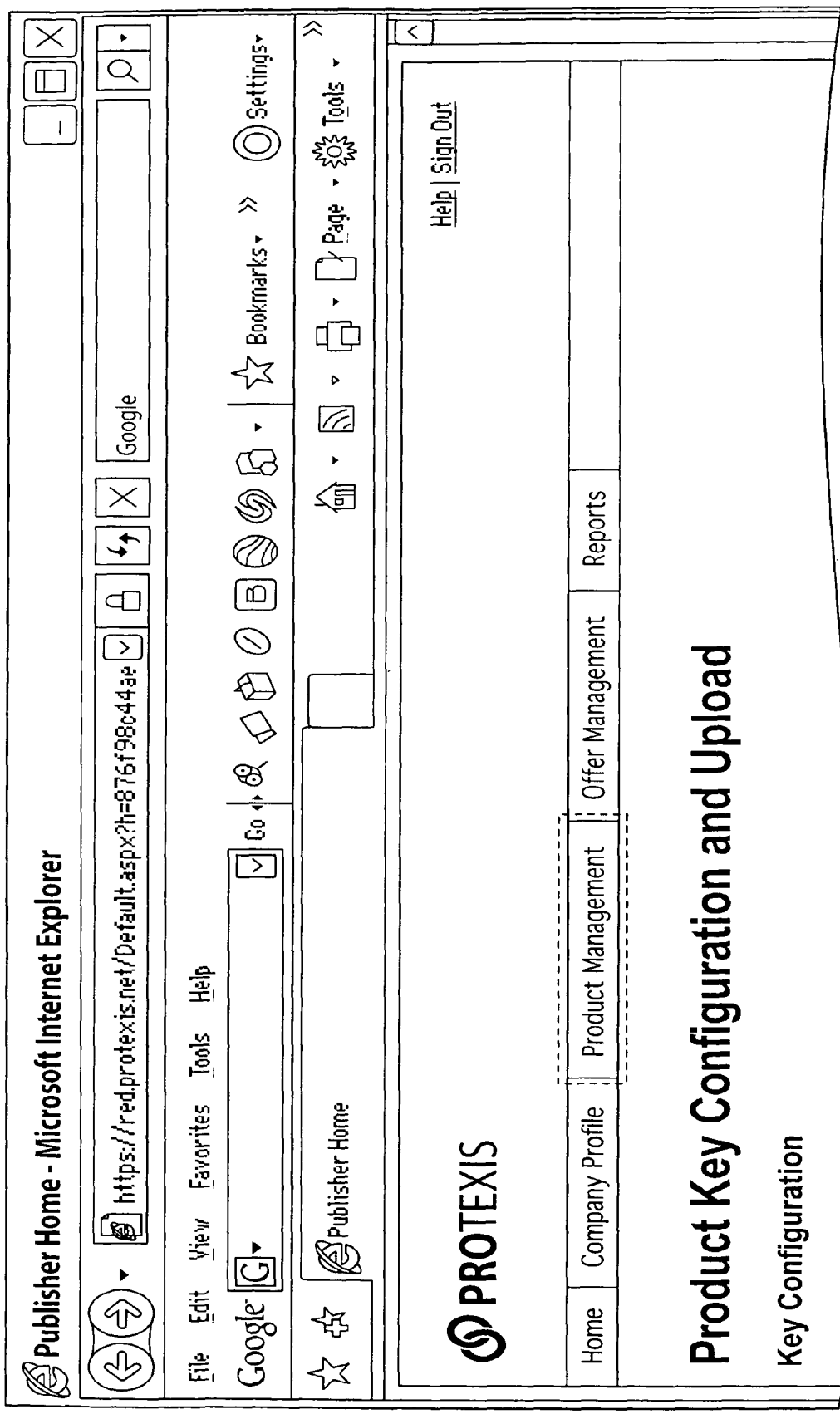
Figure 24C:
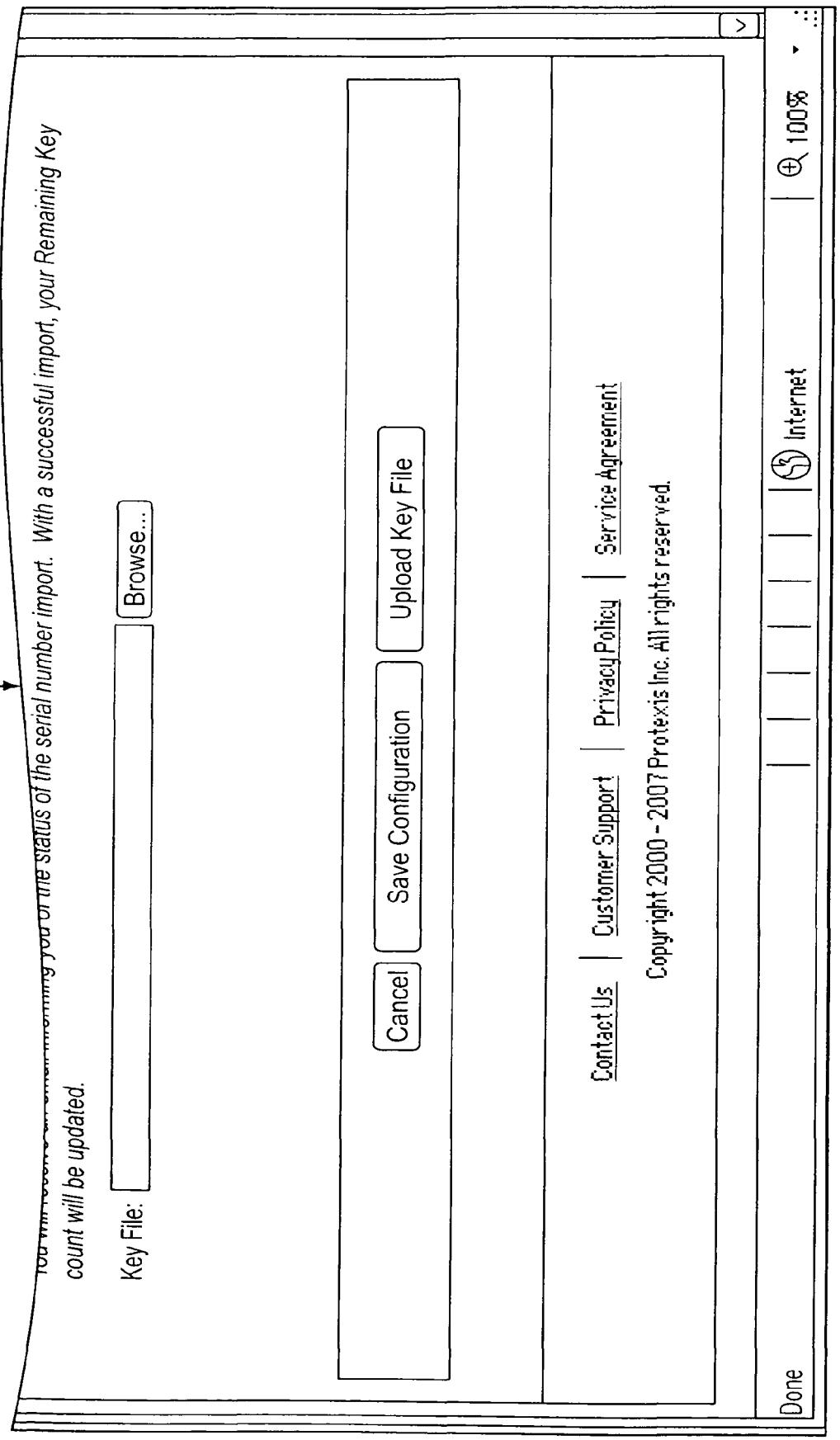
Figure 25A:
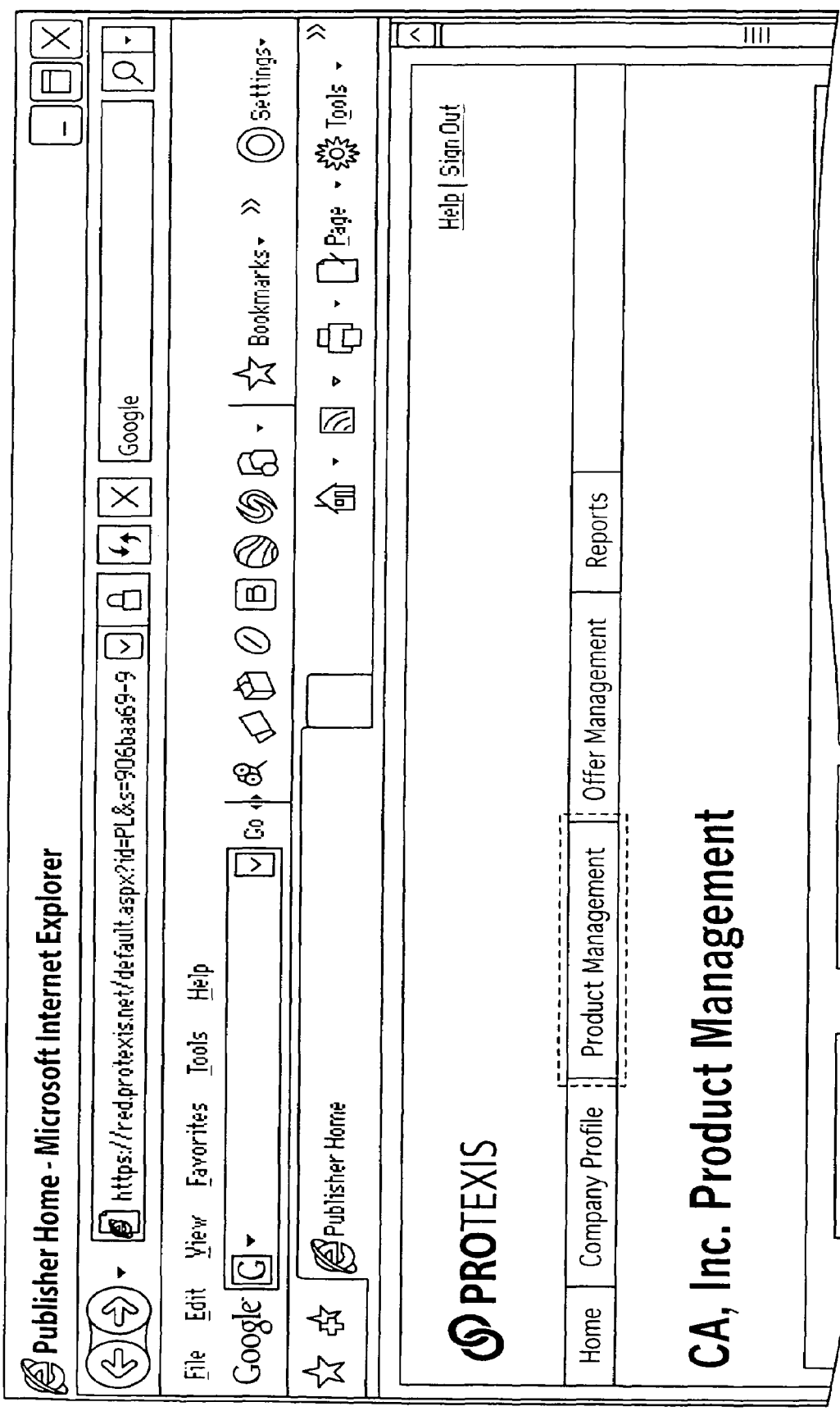
Figure 25C:

FIGS. 14-16 are additional views of an exemplary offer management page. FIG. 17 depicts an exemplary offer management page with a link to a retailer. FIG. 18 depicts an exemplary offer management main page. FIGS. 19-22 depict exemplary product management pages. FIG. 23 depicts an exemplary edit product: file management page. FIG. 24 depicts an exemplary product key management page. FIG. 25 depicts an exemplary product management main page used by a publisher 12.

The RED platform 18 also provides a unique interaction with retailers 14 in regard to the catalogs sent to them. The server 18 asks for a catalog response file that echoes back to the server 18 and contains the retailer's product identifiers for each item it has imported. The server 18 also asks for a URL to each item's product page (or asks a retailer to tell the server 18 how to construct the product page URLs, which usually consists of a base URL and the retailer product ID). The catalog response file is a critical part of the RED platform's ability to direct trial software purchases back to the same retailer that dispensed the trial product. Trial products have a "nag" screen that encourages the user to purchase a license. The RED platform 18 brands the nag screen with the retailer logo, and most importantly, the retailer's ID in RED. When the user does hit the "buy now" button, the user's browser is opened and directed to a web service on the RED system which looks up the product-offer for that product to the specified retailer. This product-offer record has the URL to the retailer's product page, which is used to redirect the user's browser to this page. From there the purchase process is identical to other products from RED, although the user may not need to download any new 'content'.

It is to be understood that the RED system 10 performs both content distribution and license (or rights) distribution. For content distribution, the RED platform 18 confers the right to download, decrypt and receive the original content as supplied by the publisher. In the case of software distribution, this means that a user 16 receives the product installer, but it doesn't mean that he/she has rights to successfully and legally install. The rights to install are normally delivered in the form of a product key. The RED platform 18 also collects these product install keys from publishers 12 and dispenses them to fulfill orders from retailers 14. Rights can also be the right to continue doing something such as using a product. As an example, consider a consumer 16 that is purchasing a second year license for his anti-virus software. In this case, the content is already installed on the user's system, so there may be no content to deliver other than an a order confirmation, or perhaps a publisher-supplied license key that the consumer 16 will be asked to enter into their already installed product.

The RED platform 18 also provides "notification of rights delivered" to publishers, and this can be done in real-time. In the case of someone extending their anti-virus license for another year, the server 18 provides a notification that includes either a reference to the original order, or the license key dispensed. The publisher 12 uses this notification to update its own systems. In this example, the publisher extends the expiration date of the existing license. Some additional examples of the types of rights that the RED platform 18 can aggregate from publishers are: a) the right to login and use a secured web service (e.g. delivery of a first-use login code and the site URL); (b) the right to download and use content that is not delivered by the RED platform (e.g. an iTunes code allowing a user to receive a song or album); (c) the right to end a software trial and continue using the (already installed) product (e.g. delivery of a License Key). To most publishers, the install keys, or activation codes, are effectively the item that is bought and sold. The RED server 18 aggregates these rights (install rights) and manages them separately from content download rights.

The RED system 10 is a technology-rich platform that invisibly, yet powerfully, enables publishers 12 to securely package and deliver digital inventory directly through major online retailers 14 so that retailers 14 can do what they do best, that is, up-sell, cross-sell and merchandise publisher's titles to their customers. The RED system 10 allows publishers 12 to:

Expand the reach of their titles to millions of consumers shopping at online retailers 14;

Enjoy better margins than traditional boxed goods or even other e-commerce options;

Easily manage their titles with an efficient "build-once sell-to-many" online process;

Have visibility and control of their products and transactions in real-time;

Rely upon a trusted third-party for secure content delivery and transaction verification; and Maximize their revenue potential through retailers who know how to up-sell, cross-sell and merchandise their titles.

The RED system 10 offers advantages to publishers 12. RED's open, neutral and efficient distribution system allows publishers to finally fully leverage electronic software distribution (ESD) by efficiently and securely increasing their reach directly through RED online retailers 14. Advantages of the RED system include but are not limited to the following.

1. Increased Reach and Revenue

80% of consumers shop at online retailers 14 and they want the immediate gratification of downloadable content. Publishers 12 can leverage the RED system 10 to reach these masses of consumers 16 shopping through indirect online channels.

Increased reach means increased revenue. But revenue is further maximized by the RED system's seamless integration into the online retailers' shopping experience. The RED system 10 allows the retailers to do what they do best to cross-sell, up-sell, and merchandise their digital content, which is an improvement over ineffective existing methods of placing titles indiscriminately into large catalogs of digital software. Publishers 12 realize enjoy more points of exposure, fewer abandoned shopping carts, and greater revenue potential for their titles.

2. Build-Once Efficiency

When a publisher 12 enrolls a product in the RED catalog, the publisher only has to enroll the product once to be able to offer it to any of the retailers 14 participating in the RED system 10. Publishers are able to manage their software offerings online, ensuring the product and marketing information is always current. The product is then selected and dynamically branded for sale on individual retail sites.

3. Visibility and Control

RED puts the publishers 12 back in control of their ESD businesses. The publishers 12 can review and choose which retailers 14 can offer their products and at which margins. The publishers control versioning and merchandise information that keeps pace with their strategies. And, the publishers 12 have the trusted technology-based audit trail and real-time reporting that allows the publishers 12 to have visibility and control of their digital sales.

4. Better Margins

The publishers 12 will enjoy margins traditionally associated with boxed distribution, without the costs of physical fulfillment. In addition, the RED system 10 lets the publisher enjoy better margins than existing outsourced e-commerce providers.

5. Easy-to-use Management Interface

With a central platform, the RED system 10 fosters stronger working relationships between the publishers 12 and online retailers 14. This not only offers flexibility (e.g., allowing a publisher 12 to choose the retailers 14 the publisher 12 wishes to carry its products) but also allows the efficiency and transparency for publishers 12 to manage their digital content easily and in real-time. Also, digital inventory is managed just as easily by the retailers 14, assuring that the publishers 12 are maximizing their distribution and reach.

6. Trusted & Neutral Provider

The RED system 10 does not create or have its own online store, nor does it compete in any way with the publisher 12 or the online retailer 14. The systems 10 simply offers a robust technology-based platform 18 to connect the publisher 12 with online retailers 14 while sitting invisibly, yet powerfully, as a trusted third-party for transaction verification.

The RED system 10 is different from other ESD providers. First, the RED system 10 is neutral. The RED system 10 is not a store, nor a merchant of record. The RED system 10 comprises a platform 18 that sits in the background and provides a technology-rich system transparently to publishers 12 and retainers 14 that enables trusted secure distribution of a publisher's digital content to the masses of consumers shopping at online retailers 14. Neutral third-party transaction verification is critical so that the publishers 12 are aware of, have control over, and get paid for their products sold.

Second, the RED system 10 is efficient. The publishers 12 only have to upload or change their content once to be able to offer it to any of the retailers 14 participating in the RED system 10 in real-time.

Third, the RED system 10 expands publishers 12 reach. Unlike outsourced e-commerce models, in which publisher's titles are indiscriminately thrown into a large digital catalog, the RED system 10 allows online retailers 14 to merchandise publishers' titles to the retailers' customers 16 for maximum revenue potential.

The RED system 10 places the publishers 12 in control, that is, a publisher 12 selects which retailers 14 can sell its titles. When any new retailer 14 joins the network 10, the publishers 12 are notified of the new retailer's participation and then the publishers 12 choose whether they want to make their title available for sale on the new retailer's site.

Other forms of digital content like music or videos can be supported by the RED system 10. The RED system 10 is very robust and scalable to all types of digital content.

As stated above, publishers 12 select which retailers 14 carry their products in the RED system 10. Because the RED system 10 is not one-size-fits-all, the publisher 12 can select which retailers 14 the publisher would like to carry their products. Also, the system 10 provides an easy-to-use interface through which the publishers 12 can login anytime and update product offerings and their distribution mix.

The RED system 10 is uniquely configured to offer this solution for improving distribution channel support between publishers or content providers 12 and retailers or resellers 14. As a neutral party that does not retail or distribute software ourselves, the RED system 10 does not compete with its retail partners but rather enables retailers 14 with custom inventory that is seamlessly integrated into their shopping carts and not a shopping cart of RED or third party. Neutrality is thus achieved.

The present invention provides a solution long sought after by publishers 12, that is, a digital commerce platform that gives technology-based confidence from a trusted third-party to make publishers' valuable gold masters available for download across retailers 14 on the web. Publishers 12 therefore have a source of real-time global audit for payments received from the distribution channel. No digital package is fulfilled from any retailers 14 without the publisher's knowledge of the transaction.

The RED system is fast in getting retail partners operational. Participation in the RED system 10 can literally take just minutes (e.g., however long it takes for a publisher to upload its product files and fill out the product marketing information). If the publisher 12 needs to add any trial capabilities or copy protection to its product (e.g., software), this can also be implemented very quickly through an online service provided by the server 18 within a matter of minutes.

Publishers 12 do not have to make any changes to their applications. As long as a publisher's product is packaged into a single compressed file set, the publisher 12 can simply upload it to the RED system 10. If the publisher 12 needs to add trial capabilities or copy protection to their software, the publisher need only make some minor adjustments to the installer package.

Each retailer 14 functions as its own merchant of record. It is from within the retailer's shopping environment and shopping cart that publishers' titles will be purchased and fulfilled. A publisher 12 does not need to have a merchant of record account to participate in the RED system 10.

Publishers 12 get paid for sales by a trusted neutral party that verifies transactions. The RED system 10 preferably pays the publisher 12 monthly for the previous month's sales. The publisher 12 receives payment via its choice of ACH (direct deposit), PayPal or wire transfer.

There is no need to charge a fee for publishers to join the RED system 10. Each retailer 14 can simply withhold a percentage of each completed transaction, which is outlined in each retailer agreement. The publisher 12 enjoys margins similar to those of traditional distribution and markedly better than outsourced e-commerce options. Plus, the publisher 12 will enjoy the cost savings of not having to fulfill physical products.

Retailers

Retailers 14 have not had an effective method for participating in ESD. There have only been two ways for retailers 14 to engage in the ESD growth market. The retailer 14 has had to negotiate complex digital fulfillment arrangements with multiple publishers 12 individually, which is inefficient and difficult to manage. Or, the retailers 14 have been forced to use outsourced digital distribution processes that move their customers to a competitive site. Neither of these options is good for the retailers 14 or their customers 16.

The RED system 10 enables non-competitive, secure distribution networks that allow the retailers 14 to efficiently access a growing and custom digital inventory, while offering the their valued customers a seamless, integrated shopping experience.

The RED system 10 is not an online store or outsourced distribution catalog. This means the content is purchased and fulfilled from within the retailer's shopping cart and not from an outsourced competitor's cart. All necessary product merchandising and catalog metadata is customized and ready for the retailer 14 without any work on its part. The RED system 10 provides a platform 18 that transparently and powerfully enables the retailer 14 to build and dynamically brand digital inventory directly from publishers 12 and offer it on the retailer's website.

Retailers 14 wish to maintain their customer relationships and brand integrity. The RED system 10 allows the retailer 14 to do that and more. The RED system 10 allows the retailer to:

Plug into a maintained catalog of digital inventory.

Have current product-level merchandising information.

Dynamically brand inventory for competitive differentiation.

Maintain control of their customers at all times.

Maximize their revenue potential with up-sell and cross-sell opportunities.

Take advantage of the extra touch points provided by the 'try before the publisher buy' environment.

Offer their customers a seamless shopping experience.

The RED system 10 offers several advantages for retailers 14. The RED system's open, neutral and efficient distribution system allows the retailer to finally participate in ESD by building digital inventory directly via RED publishers. Advantages of RED include the following.

1. Increased Revenue

Consumers are demanding digital content delivery, driving the ESD market to a projected annual growth rate of 34%. Now the retailer 14 can leverage RED to take advantage of this incremental revenue. RED also allows the retailer to keep customers on their site so that there are fewer abandoned shopping carts and so that the retailer can maximize up-sell and cross-sell opportunities.

2. Lower Costs and No Physical Inventory

With all content being stored and delivered digitally, there are no physical goods to inventory or ship. Retailer customers also enjoy cost savings of no shipping fees in addition to the immediate gratification a download offers.

3. Seamlessly Integrated Shopping Experience

Retailer customers purchase digital content within the retailer's online store, as opposed to an interrupted shopping experience with a different catalog and shopping cart for downloadable content. This allows the retailer to maintain and leverage the customer relationship for cross-sell and up-sell opportunities throughout the buying process. In addition, consumers are secure in knowing that they are being continuously serviced by the retailer they selected and trust. This could lead to fewer abandoned shopping carts and larger revenue per transaction.

4. Dynamic Branding

The retailer can easily select the products the retailer would like to sell. These products are supplied digitally, instantaneously packaged with the retailer's online brand. They are also fully integrated into the retailer shopping environment. This allows the retailer to differentiate their digital offerings to their customers.

5. Easy-to-use Management Interface

With a central platform, RED fosters stronger working relationships between the retailer 14 and content publishers 12. This not only offers flexibility (e.g., allowing the retailer to choose the products the retailer wishes to carry) but also allows the efficiency and transparency to manage their digital content easily and in real-time. Also, product updates are managed just as easily for the publishers, assuring that the retailer always have the most up-to-date product version and merchandising information.

6. Trusted & Neutral Provider

The RED server 18 does not create or have its own online store; nor do it compete in any way with the publisher. It simply offers a robust technology-based platform to connect the retailer 14 with publishers 12 while working invisibly as a trusted third-party for transaction verification.

7. Easy Integration with the Retailer's Existing Systems

RED provides a simple integration process that works with the retailer's systems. The system 10 catalog enablement structure fits into the retailer's existing schema, ensuring minimal integration work, as well as content and products that fit with the retailer's consumer experience.

The internet is naturally evolving to be recognized as an open and efficient network for multi-channel distribution of digital content. This present invention can be a catalyst in this evolution. The retail electronic distribution (RED) platform or system enables networks for open, neutral and efficient online digital content distribution. The RED system connects content publishers with online retailers and fosters stronger working relationships. Its non-competitive, hosted platform offers real-time inventory management, extended reach, and neutral third party verification for the secure packaging and delivery of digital content.

Product Benefits Generally a. Product Exposure to Aggregate Online Shoppers

Publishers gain access to large numbers of consumers who already shop at popular online stores. This expands the publishers' market reach by opening their sales to indirect channels and on-demand digital content.

b. Seamlessly Integrated Shopping Experience

Consumers are able to purchase downloadable content from within the retailer's online store, as opposed to an interrupted shopping experience with a different catalog and shopping cart for downloadable content. This allows the retailer to maintain and leverage their customer relationship for cross-sell and up-sell opportunities throughout the buying process. In addition, consumers are secure in knowing that they are being continuously serviced by the retailer they trust and selected. This could lead to fewer abandoned shopping carts and larger revenue per transaction.

c, Lower Costs and No Inventory

With all content being stored and delivered digitally, there are (is) no physical goods to inventory or ship. Both publishers and retailers realize these cost savings, which can also be passed along to consumers who can choose to download a product rather than pay for shipping.

d. Hosted Centralized Platform

With a central platform, the system of the present invention fosters stronger working relationships between retailers and content publishers. This offers flexibility, allowing retailers to choose the products they wish to carry, and letting publishers decide the retail sites on which they will offer their product for sale. A centralized platform allows the efficiency and transparency to manage digital content in real-time.

5. Build-Once Efficiency

When publishers enroll a product into RED, they only have to enroll it once to be able to offer it to any number of retailers participating in RED. They are able to manage their software catalog online, ensuring the product and marketing information is always current. The software is then selected and dynamically branded for sale directly on individual retail sites.

6. Dynamic Branding

Retailers can easily select the products they would like to sell. These products are supplied digitally, already packaged with the retailers' online brand. This allows retailers to differentiate their digital offerings to their consumers.

7. Trusted & Neutral Provider

A system in accordance with an exemplary embodiment of the present invention does not create online stores for publishers or have its own online store; nor do we compete in any way with online retailers or publishers. Protexis simply offers a robust technology-based platform to connect publishers and retailers while sitting invisibly as a trusted third party for transaction verification.

Competitive Positioning

Unlike direct outsourced e-commerce providers, the RED system enables non-competitive, neutral digital content distribution networks so that content publishers can efficiently expand their reach online while receiving trusted, real-time third party verification; and online retailers can maintain their customer relationships through a seamless integrated shopping experience.

Some providers of retailer services for on-line content distribution exist but are the 'merchant of record' for the transaction. Some retailers consider these providers competitors and want to maintain their customer relationships. With these providers, the customer experience is broken. The customer must exit the retailers' shopping cart and fulfill digital content in a separate shopping cart, leading to abandoned shopping carts and decreased sales for the retailer Other direct outsourced selling models also do not have a complete solution. Some include standalone 'download' sites that mimic the retail site but are hosted by the ESD provider.

Publisher Positioning

The RED system enables neutral and efficient distribution networks that leverage online retailers to dramatically increase publishers' reach and revenue. For example, the RED platform or system provides a greater reach (e.g., Internet buyer communities reachable through indirect channels such as online retailers, attractive margin, audit trail and transaction verification via a trusted, neutral third party, real-time integration model and enablement, one-time upload yet ongoing online channel management (e.g., publisher enters metadata, selected retailer and terms of distribution, real-time packaging, and dynamically branded and offered at selected retailers), and interface for aggregate retail relationship.

Retailer Positioning

The RED system enables non-competitive, neutral and secure distribution networks that allow online retailers to increase their digital inventory while maintaining their customer relationship through a seamless integrated shopping experience. A single retailer shopping cart can be used for a seamlessly integrated customer experience with no loss of customer interaction, control or ownership. The RED system provides secure digital encryption, dynamic branding and real-time enablement It is to be understood that the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While certain exemplary embodiments of the invention have been shown and described herein with reference to certain preferred embodiments thereof, it will be understood by those skilled in the art that various changes in form and details may be made therein without departing from the spirit and scope of the invention as defined by the appended claims and their equivalents.

What is claimed is:

1. A method of retailer electronic distribution (RED) of digital content for building a digital inventory of products offered by publishers to retailers to sell comprising:
   uploading content from publishers to a RED server to offer as products for retailers to sell;
   enrolling the content via the RED server by storing publisher marketing metadata comprising any merchandizing and product information that is to be offered to consumers via retailers;
   providing a catalog feed from the RED server to retailers comprising a list of the enrolled content;
   receiving at the RED server retailer selection of at least one item of content from the catalog feed;
   storing retailer information specific to that retailer via the RED server to facilitate rebranding the at least one item of content; and
   performing abstract fulfillment with respect to publishers by dynamically rebranding via the RED server the at least one item of content when selected by a consumer from that retailer using the retailer-specific information corresponding to that retailer, the publisher only having to unload the content for that product one time.

2. A method as claimed in claim 1, further comprising:
   receiving a request to download at least one item of content from the retailer in response to a consumer request for that content;
   performing at least one of authentication and activation of the at least one item of content;
   rebranding via the RED server the at least one item of content with an identifier of the retailer; and
   transmitting a link to the consumer with which to download the rebranded item.

3. A method as claimed in claim 2, further comprising:
   performing third party verification of a transaction between the consumer and the retailer to acquire the rebranded item.

4. A method as claimed in claim 3, further comprising:
   providing the publisher with at least a portion of the transaction amount collected by the retailer.

5. A method of integrated electronic distribution and commerce for providing license transactions, product activation and distribution channel support among content providers or publishers, retailers or resellers, and consumers to facilitate electronic distribution of digital content comprising:
   generating at least one publisher interface screen via a retailer electronic distribution (RED) server to assist a publisher in selection of at least one retailer to electronically sell a product of the publisher to consumers, the publisher interface screen comprising at least one offer screen requesting entry of selected offer management information by the publisher, the offer management information comprising selection of at least one retailer from a list of retailers, and product information identifying the product the publisher wishes the selected retailer to offer to consumers;
   adding the product to a stored catalog via the RED server using the offer management information entered by the publisher in response to the publisher interface screen, the catalog providing a list of a plurality of products offered by different publishers to retailers to sell to consumers;
   providing an online catalog feed to retailers via the RED server that allows retailers to select from among the plurality of product offers therein from different publishers to build an inventory;
   generating at least one retailer interface screen via the RED server that lists products from the catalog to assist a retailer in selecting at least one of the products from the catalog to place in an inventory offered to consumers;
   generating at least one retailer interface screen via the RED server that requests a retailer to provide retailer information;
   storing via the RED server the retailer information for online catalog products which that retailer selects to sell; and
   dynamically rebranding via the RED server an online catalog product selected by a consumer from that retailer using the retailer information corresponding to that retailer, the publisher only having to upload the product one time.

6. A method as claimed in claim 5, further comprising providing the stored catalog with publisher metadata associated with marketing.

7. A method as claimed in claim 5, further comprising each retailer maintaining its merchant of record to allow purchase and fulfillment of requested products from the catalog via the retailers shopping cart.

8. A method as claimed in claim 5, wherein the offer management information further comprises selection of at least one category to which the product belongs from a list of different categories of products offered by publishers to assist retailers in locating different products to sell.

9. A method as claimed in claim 5, further comprising a retailer refusing to sell a product from a publisher that has selected that retailer via the publisher interface screen.

10. A method as claimed in claim 1, wherein the retailer information comprises that retailers online brand, and further comprising rebranding the at least one item of content using the retailers online brand for display to a consumer to enable the consumer to perceive the at least one item of content as originating from the retailer and not the corresponding one of the publishers.

11. A system for retailer electronic distribution of digital content comprising:
    a memory; and
    a processing device configured for building a digital inventory of products offered by publishers to retailers to sell, the processing device being programmed to
    upload, to the memory, content from publishers to offer as products for retailers to sell,
    enroll the content by storing, in the memory, publisher marketing metadata comprising any merchandizing and product information that is to be offered to consumers via retailers,
    generate and transmit a catalog feed to retailers comprising a list of the enrolled content,
    receive retailer selection of at least one item of content from the catalog feed, and
    store, in the memory, retailer information specific to that retailer to facilitate rebranding the at least one item of content; and
    perform abstract fulfillment with respect to publishers by dynamically rebranding the at least one time of content when selected by a consumer from that retailer using the retailer-specific information corresponding to that retailer, the publisher only having to upload the content for that product one time.

12. A method as claimed in claim 1, wherein the retailer-specific information comprises branding options for catalog products that retailer selects to sell, and further comprising:

performing abstract fulfillment with respect to publishers by dynamically rebranding via the RED server online catalog products selected by at least one consumer from that retailer using the retailer-specific information corresponding to that retailer, the publisher only having to upload the content for that product one time.

13. A method as claimed in claim 5, wherein the retailer information comprises the retailers rebranding preferences and retailer-specific product merchandizing and catalog metadata that is customized for that retailer transparently to a publisher.

14. A system as claimed in claim 11, wherein the retailer-specific information comprises branding options for catalog products which that retailer selects to sell, and the processing device is further programmed to perform abstract fulfillment with respect to publishers by dynamically rebranding online catalog products selected by at least one consumer from that retailer using the retailer-specific information corresponding to that retailer, the publisher only having to upload the content for that product one time.

* * * * *